United States Patent
Gomez et al.

(10) Patent No.: US 8,718,589 B2
(45) Date of Patent: May 6, 2014

(54) COMPENSATING FOR UNWANTED DISTORTION IN A COMMUNICATIONS RECEIVER

(75) Inventors: Ramon Alejandro Gomez, San Juan Capistrano, CA (US); Bruce J. Currivan, Dove Canyon, CA (US); Massimo Brandolini, Irvine, CA (US); Young Shin, Irvine, CA (US); Francesco Gatta, Laguna Niguel, CA (US); Hanli Zou, Rancho Santa Margarita, CA (US); Loke Kun Tan, Newport Coast, CA (US); Lin He, Irvine, CA (US); Thomas Joseph Kolze, Phoenix, AZ (US); Leonard Dauphinee, Irvine, CA (US); Robindra Joshi, Irvine, CA (US); Binning Chen, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 133 days.

(21) Appl. No.: 13/174,471

(22) Filed: Jun. 30, 2011

(65) Prior Publication Data

US 2012/0083235 A1   Apr. 5, 2012

Related U.S. Application Data

(60) Provisional application No. 61/388,294, filed on Sep. 30, 2010.

(51) Int. Cl.
    *H04B 1/10* (2006.01)
(52) U.S. Cl.
    USPC .......................... 455/296; 455/284; 455/303
(58) Field of Classification Search
    USPC .................. 455/208, 226.1, 283, 284, 296, 455/303–308, 310–312
    See application file for complete search history.

(56) References Cited

U.S. PATENT DOCUMENTS

| | | | |
|---|---|---|---|
| 6,052,420 A | 4/2000 | Yeap et al. | |
| 6,131,013 A | 10/2000 | Bergstrom et al. | |
| 7,308,050 B2 | 12/2007 | Kolze et al. | |
| 7,952,502 B2 | 5/2011 | Kolze et al. | |
| 7,961,823 B2 | 6/2011 | Kolze et al. | |
| 2005/0074079 A1* | 4/2005 | Jin | 375/346 |
| 2006/0002570 A1 | 1/2006 | Vaudrey et al. | |
| 2006/0067446 A1 | 3/2006 | Maeda et al. | |
| 2009/0103669 A1 | 4/2009 | Kolze et al. | |
| 2010/0067602 A1* | 3/2010 | Noel et al. | 375/267 |
| 2010/0159865 A1* | 6/2010 | Fudge | 455/296 |
| 2011/0021170 A1 | 1/2011 | Kolze et al. | |
| 2012/0082272 A1 | 4/2012 | Gomez et al. | |
| 2012/0082276 A1 | 4/2012 | Gomez et al. | |
| 2012/0082277 A1 | 4/2012 | Gomez et al. | |
| 2012/0082278 A1 | 4/2012 | Gomez et al. | |

OTHER PUBLICATIONS

Jeong, Byung-Jang, et al., "Digital RFI canceller for DMT based VDSL," Electronics Letter, vol. 34, Issue 17, 1998, pp. 1640-1641.

* cited by examiner

*Primary Examiner* — Christian Hannon
(74) *Attorney, Agent, or Firm* — Sterne, Kessler, Goldstein & Fox P.L.L.C.

(57) ABSTRACT

Method and apparatuses are disclosed to substantially compensate for various unwanted interferences and/or distortions within a communications receiver. Each of these apparatuses and methods estimate the various unwanted interferences and/or distortions within the communications receiver. Each of these apparatuses and methods remove the estimates of the various unwanted interferences and/or distortions within the communications receiver from one or more communications signals within the communications receiver to substantially compensate for the various unwanted interferences and/or distortions.

18 Claims, 42 Drawing Sheets

COMPENSATING FOR UNWANTED DISTORTION IN A COMMUNICATIONS RECEIVER

CROSS-REFERENCE TO RELATED APPLICATIONS

The present application claims the benefit of U.S. Provisional Patent Appl. No. 61/388,294, filed Sep. 30, 2010, which is incorporated by reference herein in its entirety.

BACKGROUND

1. Field of Invention

The present invention relates generally to a communication system and specifically to compensation of unwanted interference and/or distortion embedded within a communications receiver.

2. Related Art

A conventional communications receiver typically includes an analog or radio frequency (RF) front end to pre-process the analog signal transmitted across the communication channel for conversion to a digital form using a suitable analog-to-digital converter (ADC). This pre-processing may include amplification, filtering, frequency conversion or mixing, gain control and other analog operations. The principal goal of this pre-processing in the conventional receiver is to minimize the dynamic range and bandwidth of the processed signal presented to the ADC which, in turn, simplifies the design of the ADC. Tradeoffs are usually made between the amount of pre-processing and the ADC complexity to minimize the cost and power dissipation of the conventional communication receiver.

Continuous advances in integrated circuit (IC) technology have often made it advantageous to allocate more of the signal processing burden to the ADC and digital circuitry. Nevertheless, conventional receiver design continues to rely on many precision RF and analog techniques. One problem common to the conventional receiver is the indirect coupling of noise and interference from other circuits in the vicinity of the receiver. These circuits may be on the same integrated circuit (IC) substrate, or may be other circuits on the printed circuit board (PCB) or elsewhere in the overall electronic system. The noise and interference may even arise from pickup of background noise such as other electronic systems sharing the same frequency spectrum. The conventional methods of compensating for the noise and interference include electromagnetic shielding, differential signal routing, and pre-amplification to boost the signal above the interference.

Another common problem is distortion in the conventional receiver. Real-world circuits cannot be made perfectly linear, and highly linear circuit designs often require high power dissipation. Distortion not only affects the fidelity of the desired signal, but also may result in distortion products of other signals and/or interference coexisting with the desired signal to appear in the desired frequency band. There are a number of problems which arise due to imperfect local oscillators or sampling clocks used in the conventional receiver. Phase noise, jitter, and spurious tones in the oscillator or clock spectra degrade the quality of the desired signal and may also fold unwanted signals into the desired frequency range.

Thus, there is a need for an apparatus and/or a method to substantially compensate for nonlinear impairments in a communication receiver that overcomes the shortcomings described above. Further aspects and advantages of the present invention will become apparent from the detailed description that follows.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

Figure 1:
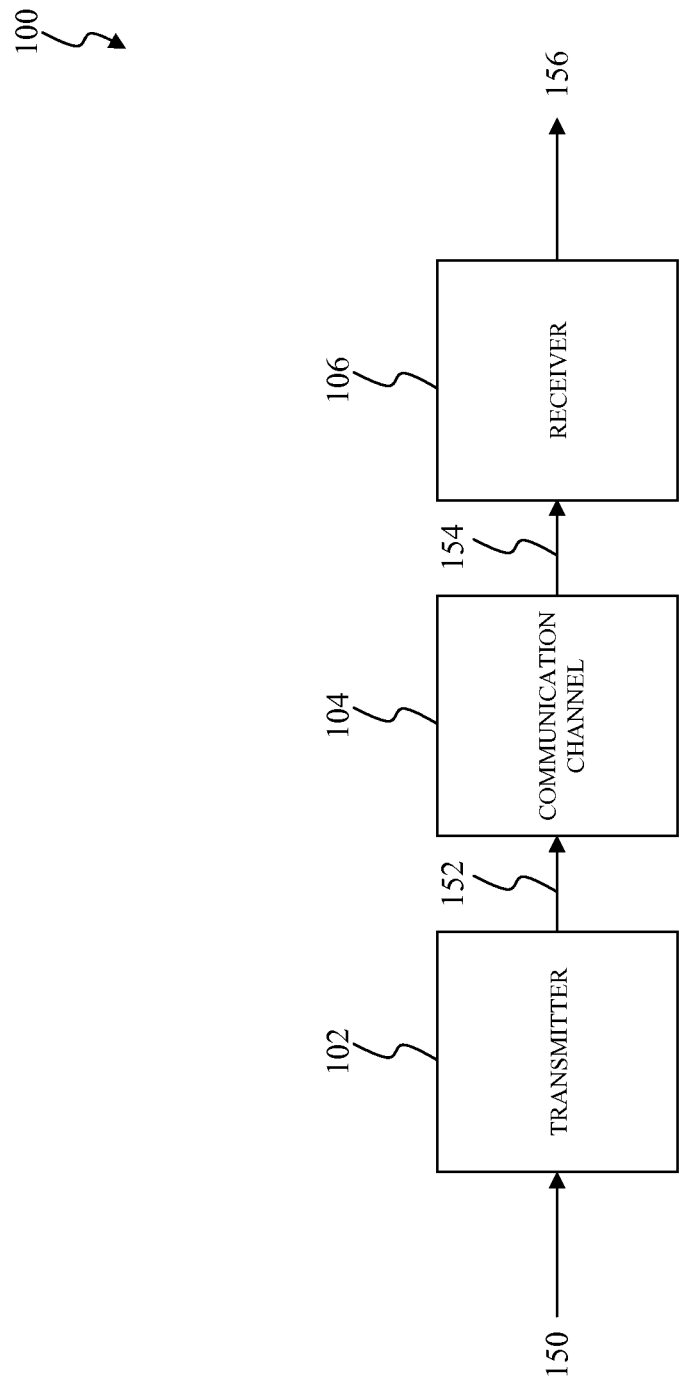
FIG. 1 illustrates a block diagram of communications environment according to an exemplary embodiment of the present invention.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment.

Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the present invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

The following Detailed Description describes various apparatuses and methods to substantially compensate for various unwanted interferences and/or distortions within a communications receiver. Each of these apparatuses and methods estimate the various unwanted interferences and/or distortions within the communications receiver. Each of these apparatuses and methods remove the estimates of the various unwanted interferences and/or distortions within the communications receiver from one or more communications signals within the communications receiver to substantially compensate for the various unwanted interferences and/or distortions.

Communications Environment

FIG. 1 illustrates a block diagram of communications environment according to an exemplary embodiment of the present invention. The communications environment 100 includes a communications transmitter 102 to transmit one or more information signals 150 as received from one or more transmitter user devices to a communications receiver 106 via a communications channel 104. The transmitter user devices may include, but are not limited to, personal computers, data terminal equipment, telephony devices, broadband media players, personal digital assistants, software applications, and/or any other device that is capable of transmitting data that will be apparent to those skilled in the relevant art(s) without departing from the spirit and scope of the present invention.

The transmitted communications signal 152 passes through the communications channel 104 to provide a received communications signal 154. The communications channel 104 may include, but is not limited to, a microwave radio link, a satellite channel, a fiber optic cable, a hybrid fiber optic cable system, a copper cable, or a concatenation of any combination of these, and including relays and frequency translations, to provide some examples.

The communications receiver 106 observes the received communications signal 154 after it passes through the communications channel 104. The communications receiver 106 estimates the transmitted communications signal 152 from the received communications signal 154 to provide one or more recovered information signals 156, for one or more receiver user devices. The receiver user devices may include, but are not limited to, personal computers, data terminal equipment, telephony devices, broadband media players, personal digital assistants, software applications, or any other device that is capable of receiving data that will be apparent to those skilled in the relevant art(s) without departing from the spirit and scope of the present invention.

Figure 2:
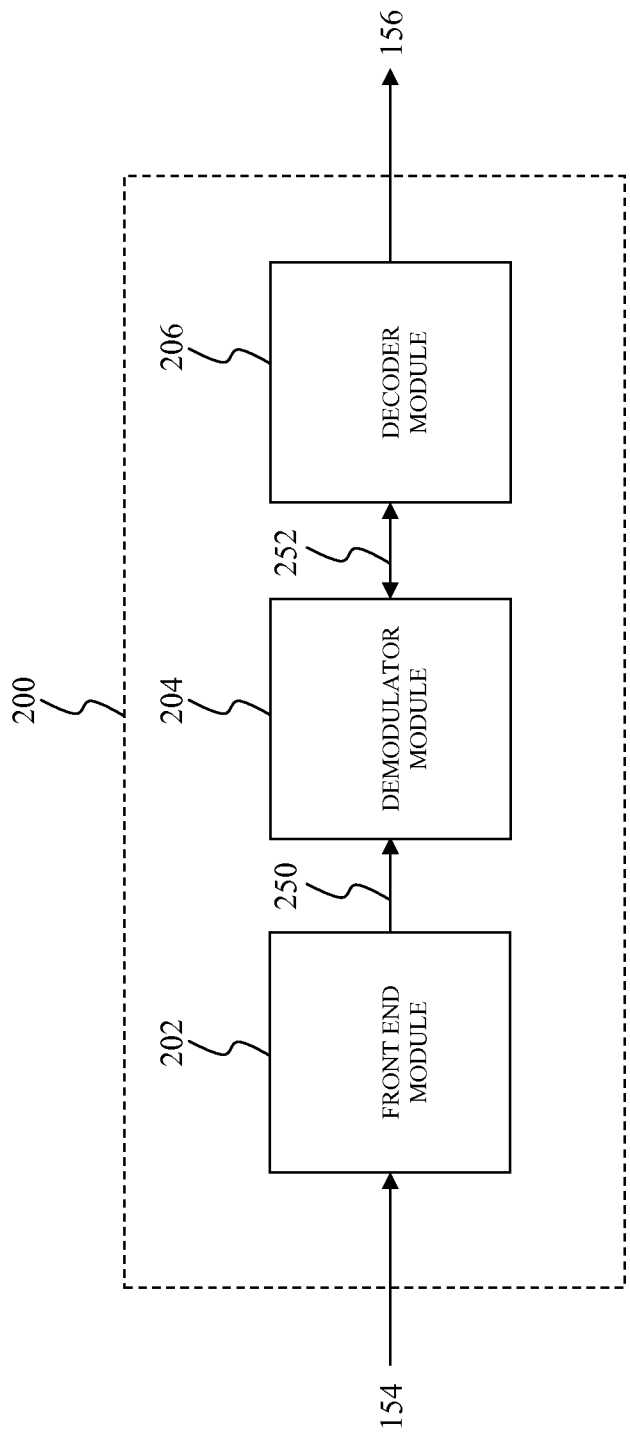
FIG. 2 illustrates a block diagram of a first communications receiver implemented as part of the communications environment according to an exemplary embodiment of the present invention.

First Exemplary Communications Receiver that May be Implemented as Part of the Communications Environment FIG. 2 illustrates a block diagram of a first communications receiver implemented as part of the communications environment according to an exemplary embodiment of the present invention. The communications receiver 200 observes the received communications signal 154 after it passes through the communications channel 104. Unwanted electromagnetic radiation propagating within a communications environment, such as the communications environment 100 to provide an example, may be coupled onto the received communications signal 154 as well as onto other signals within the communication receiver 200. Additionally, the communications receiver 200 may distort the received communications signal 154, as well as other signals within the communication receiver 200, as they are being processed. The communication receiver 200 substantially compensates for the unwanted electromagnetic radiation and/or distortion to increase its ability to reliably estimate the transmitted communications signal 152. The communication receiver 200 may represent an exemplary embodiment of the communications receiver 106.

The communications receiver 200 includes a front end module 202, a demodulator module 204, and a decoder module 206. The front end module 202 provides a digital sequence of data 250 based upon the received communications signal 154. The digital sequence of data 250 may include a single digital sequence of data 250 or multiple digital sequences of data 250.1 through 250.n. The front end module 202 observes the received communications signal 154 after it passes through the communications channel 104 using one or more receiving antenna or any other suitable means that will be apparent to those skilled in the relevant art(s) without departing from the spirit and scope of the present invention. The front end module 202 may amplify the received communications signal 154. Additionally, the front end module 202 may convert the received communications signal 154 or, alternatively, an amplified representation of the received communications signal 154, from an analog representation to a digital representation to provide the digital sequence of data 250. Further, the front end module 202 may frequency translate the received communications signal 154 or, alternatively, the amplified representation of the received communications signal 154 to approximately baseband or a suitable intermediate frequency (IF) that will be apparent to those skilled in the relevant art(s) without departing from the spirit and scope of the present invention.

The demodulator module 204 demodulates the digital sequence of data 250 using any suitable analog or digital demodulation technique for any suitable modulation technique such as amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable demodulation technique that will be apparent to those skilled in the relevant art(s) without departing from the spirit and scope of the present invention to provide a recovered sequence of data 252. The demodulated sequence of data 252 may include a single recovered sequence of data 252 or multiple recovered sequences of data 252.1 through 252.*n*. Alternatively, the demodulator module 204 may demodulate and/or decode the digital sequence of data 250 according to a multiple access transmission scheme such as code division multiple access (CDMA), synchronous CDMA (S-CDMA), frequency division multiple access (FDMA), time division multiple access (TDMA), discrete multi-tone (DMT) modulation, orthogonal frequency division multiple access (OFDMA) and/or any other suitable multiple access scheme that will be apparent by those skilled in the relevant art(s).

The decoder module 206 performs error correction decoding upon the recovered sequence of data 252 to provide the one or more recovered information signals 156 using any suitable decoding scheme that will be apparent to those skilled in the relevant art(s) without departing from the spirit and scope of the present invention to provide the one or more recovered information signals 156. The decoding scheme may include a block decoding scheme, such as Reed-Solomon decoding, a convolutional decoding scheme, such as the Viterbi algorithm, a concatenated decoding scheme involving inner and outer codes, decoding schemes using iterative decoding, partial decoding, iterative decoding involving iterations between channel estimation and partial decoding and full decoding with impulse or burst noise and/or noise unequally distributed among the signaling dimensions such as colored noise, and/or any other suitable decoding scheme that will be apparent to those skilled in the art(s). The decoder module 206 may also iterate with the demodulator module 204 to pass information such as results, intermediate results, estimated error positions, channel fidelity metric, and other metrics, from partial decoding and/or iterations of the recovered sequence of data 252 to the demodulator module 204. This iterative feature of the decoder module 206 is further described in U.S. patent application Ser. No. 10/000,415, filed on Nov. 2, 2001, now U.S. Pat. No. 7,308,050, which is incorporated by reference herein in its entirety.

First Exemplary Embodiment of the Front End Module that May be Implemented as Part of the Communication Receiver Unwanted electromagnetic radiation propagates throughout the communications environment. The unwanted electromagnetic radiation may include internal electromagnetic radiation that is generated by a communication receiver, such as the communications receiver 200 to provide an example, which is propagating within the communication receiver. The internal electromagnetic radiation may be imposed onto signals within the communication receiver. In an exemplary embodiment, the communications receiver may be placed within a mechanical housing along with other electronic circuits. In another exemplary embodiment, the communications receiver may be implemented on one or more chips or semiconductor wafers along with other electronic circuits. In a further exemplary embodiment, the communications receiver may be implemented as part of a printed circuit board (PCB) along with other electronic circuits. In these exemplary embodiments, unwanted electromagnetic radiation that is generated by the communications receiver and/or these other electronic circuits may represent the internal electromagnetic radiation that may be imposed onto signals within the mechanical housing, the one or more chips or semiconductor wafers and/or the PCB.

The unwanted electromagnetic radiation may also include external electromagnetic radiation that is generated within the communications environment that originates outside or external to the communication receiver. In an exemplary embodiment, the received communications signal 154 may include one or more desired communications signals. In this exemplary embodiment, another communications device may transmit a communications signal which occupies a substantially similar frequency spectrum, or a portion thereof, that is occupied by at least one of the one or more desired communications signals. In this situation, the communications signal from this other communications device may be imposed onto the signals within the communication receiver. Typically, the communications signal from this other communications device may be characterized as having sufficient electromagnetic energy to impede the ability of the communications receiver to reliably estimate a transmitted communications signal, such as the transmitted communications signal 152 to provide an example, from a received communications signal, such as the received communications signal 154 to provide an example.

Additionally, one or more components of the communications receiver may be configured and arranged to form a signal processing path. Some of the one or more components may introduce unwanted distortion by unintentionally altering or distorting the signals within the communication receiver as they are being processed. For example, the signal processing path may introduce linear distortion such as amplitude, phase, and/or group delay, and/or nonlinear distortion, including harmonic distortion and inter-modulation distortion, into the signals within the signal processing path. Further, the unwanted electromagnetic radiation may cause some of the one or more components to distort the signals within the communication receiver.

The unwanted electromagnetic radiation and/or the unwanted distortion imposed onto the signals within the communications receiver may degrade the ability of the communications receiver to reliably estimate the transmitted communications signal from the received communications signal.

The present invention estimates the unwanted electromagnetic radiation and/or the unwanted distortion imposed onto one or more signals within the communications receiver. The present invention substantially removes or cancels this estimate of the unwanted electromagnetic radiation and/or the distortion from the one or more signals within the communication receiver to increase the ability of the communications receiver to reliably estimate the transmitted communications signal from the received communications signal.

Figure 3A:
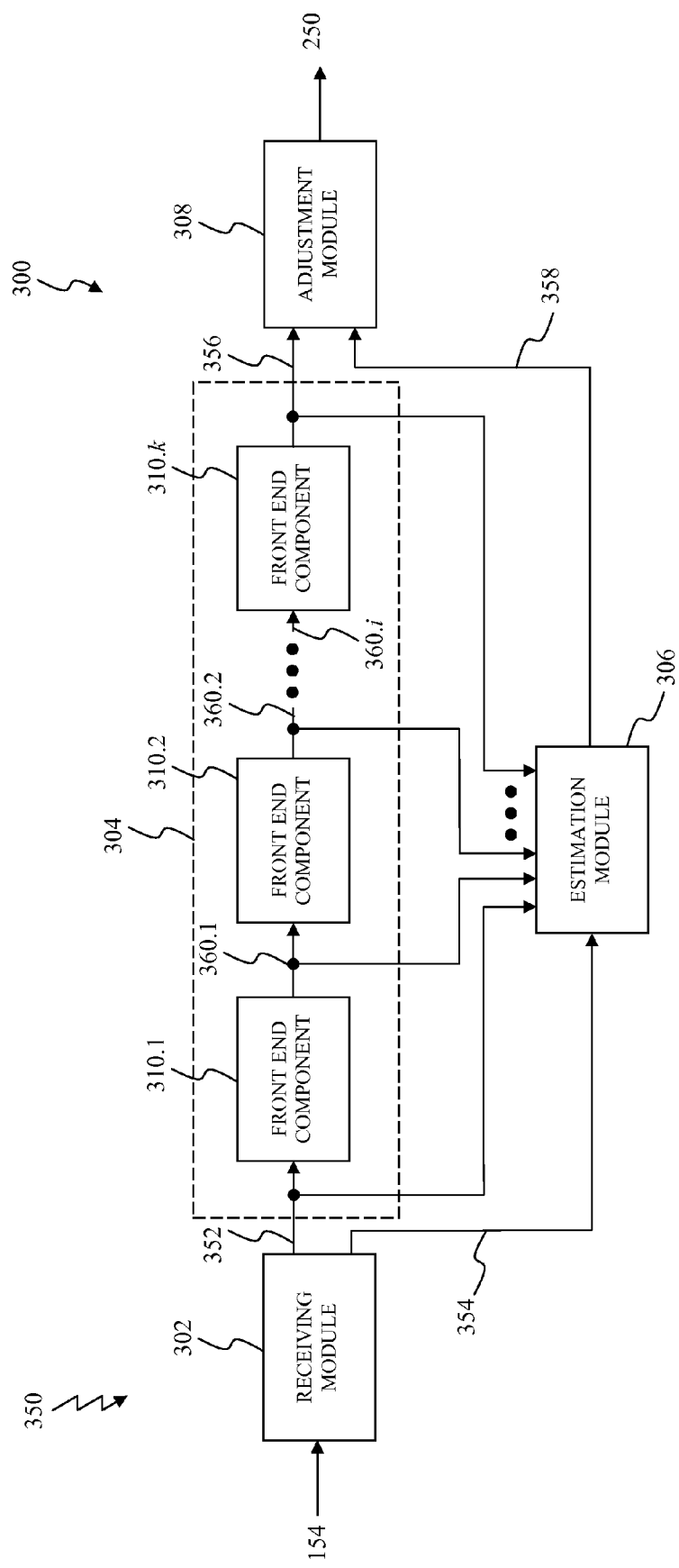
FIG. 3A illustrates a block diagram of a first front end module that may be implemented as part of the communications receiver according to an exemplary embodiment of the present invention.

First Exemplary Embodiment of the Front End Module that May be Implemented as Part of the Communication Receiver FIG. 3A illustrates a block diagram of a first front end module that may be implemented as part of the communications receiver according to an exemplary embodiment of the present invention. A front end module 300 includes a receiving module 302, a front end processor 304, an estimation module 306, and an adjustment module 308 to substantially compensate for unwanted interference 350, such as the internal electromagnetic radiation and/or the external electromagnetic radiation to provide some examples, that is propagating within a communications receiver, such as the communication receiver 200 to provide an example, and/or a communications environment, such as the communications environment 100. Additionally, the front end module 300 may use these modules to substantially compensate for unwanted distortion that is imposed onto one or more signals within the communications receiver. The front end module 300 may represent an exemplary embodiment of the front end module 202.

The receiving module 302 observes the received communications signal 154 and the unwanted interference 350 to provide the primary received communications signal 352 and the secondary received communications signal 354. The receiving module 302 may include one or more desired signal receiving antennas and/or one or more desired signal receiving ports to observe the received communications signal 154 and the unwanted interference 350. Similarly, the receiving module 302 may include one or more undesired signal receiving antennas and/or one or more undesired signal receiving ports to observe the unwanted interference 350. Typically, the received communications signal 154 includes one or more desired communications signals and the unwanted interference 350, the unwanted interference 350 being substantial enough to decrease the ability of the communications receiver 200 to reliably estimate the one or more desired communications signals. The primary received communications signal 352 and the secondary received communications signal 354 may include the one or more desired communications signals and the unwanted interference 350. However, the one or more desired communications signals included within the secondary received communications signal 354 are greatly attenuated leaving the unwanted interference 350 to dominate. Additionally, the receiving module 302 may introduce unwanted distortion into the primary received communications signal 352 and/or the secondary received communications signal 354 by unintentionally altering or distorting the received communications signal 154 and/or the unwanted interference 350.

The front end processor 304 processes the primary received communications signal 352 to provide an observed sequence of data 356. The front end processor 304 may include one or more front end components 310.1 through 310.$k$ that are configured and arranged to form a signal processing path for processing the primary received communications signal 352. It should be noted that the front end processor 304 may include as few as a single front end component 310.1. Each of the one or more front end components 310.1 through 310.$k$ may include one or more electrical, mechanical, and/or electro-mechanical components that are configured and arranged to form one or more electrical, mechanical, and/or electro-mechanical circuits.

As shown in FIG. 3A, a first front end component 310.1 processes the primary received communications signal 352 to provide a processed communications signal 360.1. Likewise, a second front end component processes the processed communications signal 360.1 to provide a processed communications signal 360.2. Similarly, a $k^{th}$ front end component 310.$k$ processes the processed communications signal 360.$i$ to provide the observed sequence of data 356. Additionally, the front end components 310.1 through 310.$k$ may introduce unwanted distortion onto signals within the front end processor 304 during processing of their corresponding signals. For example, the first front end component 310.1 may introduce unwanted distortion into the processed communications signal 360.1 by unintentionally altering or distorting the primary received communications signal 352.

The estimation module 306 generates an estimate of residual noise 358 that corresponds to the unwanted interference 350 and/or the unwanted distortion remaining within the observed sequence of data 356. The estimation module 306 may include one or more replica components that are configured and arranged to form an estimation path. The one or more replica components may have a similar or a dissimilar configuration and arrangement as the one or more front end components 310.1 through 310.$k$.

The estimation module 306 processes one or more of the primary received communications signal 352, the secondary received communications signal 354, the observed sequence of data 356, and the processed communication signals 360.1 through 360.$i$ to estimate the unwanted interference 350 and/or the unwanted distortion remaining within the observed sequence of data 356 to provide the estimate of residual noise 358. For example, the estimate of residual noise 358 may represent an estimate of the unwanted interference 350 and/or the unwanted distortion remaining within the observed sequence of data 356.

For example, the estimation module 306 may process the primary received communications signal 352 to estimate the unwanted interference 350 that is imposed onto and/or the unwanted distortion that is introduced into the primary received communications signal 352. As another example, the estimation module 306 may process the secondary received communications signal 354 to estimate the unwanted interference 350 that is imposed onto and/or the unwanted distortion that is introduced into the secondary received communications signal 354. As a further example, the estimation module 306 may process the observed sequence of data 356 and/or the processed communication signals 360.1 through 360.$i$ to estimate the unwanted interference 350 that remains within the processed communication signals 360.1 through 360.$i$ after processing by their corresponding front end components 310.1 through 310.$k$. In this example, the estimation module 306 may also estimate the unwanted distortion that is introduced into the observed sequence of data 356 and/or the processed communication signals 360.1 through 360.$i$ by their corresponding front end components 310.1 through 310.$k$. The estimation module 306 may estimate any combination of the primary received communications signal 352, the secondary received communications signal 354, the observed sequence of data 356, and one or more of the processed communication signals 360.1 through 360.$i$ to estimate effects of the unwanted interference 350 and/or the unwanted distortion on any signal of the signal processing path of the front end processor 304.

The adjustment module 308 substantially removes or cancels the estimate of residual noise 358 from the observed sequence of data 356 to provide the digital sequence of data 250. The adjustment module 308 substantially aligns the estimate of residual noise 358 with the unwanted interference 350 and/or the unwanted distortion remaining within the observed sequence of data 356. For example, the adjustment module 308 adjusts a phase and/or an amplitude of the estimate of residual noise 358 such that the amplitude and/or the phase approximates a phase and/or an amplitude of the unwanted interference 350 and/or the unwanted distortion remaining within the observed sequence of data 356.

The adjustment module 308 subtracts this phase and/or amplitude adjusted estimate of residual noise 358 from the observed sequence of data 356 to substantially reduce the unwanted interference 350 and/or the unwanted distortion remaining within the observed sequence of data 356 to provide the digital sequence of data 250. It should be noted that the estimation module 306 and the adjustment module 308 may be combined to performing block processing or recursive processing using the secondary received communications signal 354 and the observed sequence of data 356 to effectively cancel specific distortion terms generated within the signal processing path of the front end processor 304 to create a Least Squares solution that minimizes specific unwanted interference terms arising. An example of such processing is further described in U.S. patent application Ser. No. 12/949,752, filed on Nov. 18, 2010, now U.S. Pat. No. 7,952,502, which is incorporated by reference herein in its entirety. The estimation module 306 and the adjustment module 308 may be combined to create an approximate Least Squares solution that approximately minimizes specific unwanted interference terms arising, using dithering techniques as described in U.S. patent application Ser. No. 10/879,673, filed on Jun. 29, 2004, now U.S. Pat. No. 7,961,823, which is incorporated by reference herein in its entirety. The estimation module 306 may receive information, such as total power, error power and/or decoder error statistics and metrics, from the demodulator module 204 and the decoder module 206 to guide tap coefficient adjustment decisions associated with dithering techniques.

The adjustment module 308 may delay one or more samples of the estimate of residual noise 358, the one or more samples having their own phase and/or amplitude adjustment. For example, the adjustment module 308 may be implemented using one or more adaptive filters, such as one or more finite impulse response (FIR) filters having adjustable coefficients, to delay and adjust the phase and/or the amplitude of the one or more samples. The adjustment module 308 may combine these adjusted samples with one or more samples of the observed sequence of data 356 to provide the digital sequence of data 250.

Figure 3B:
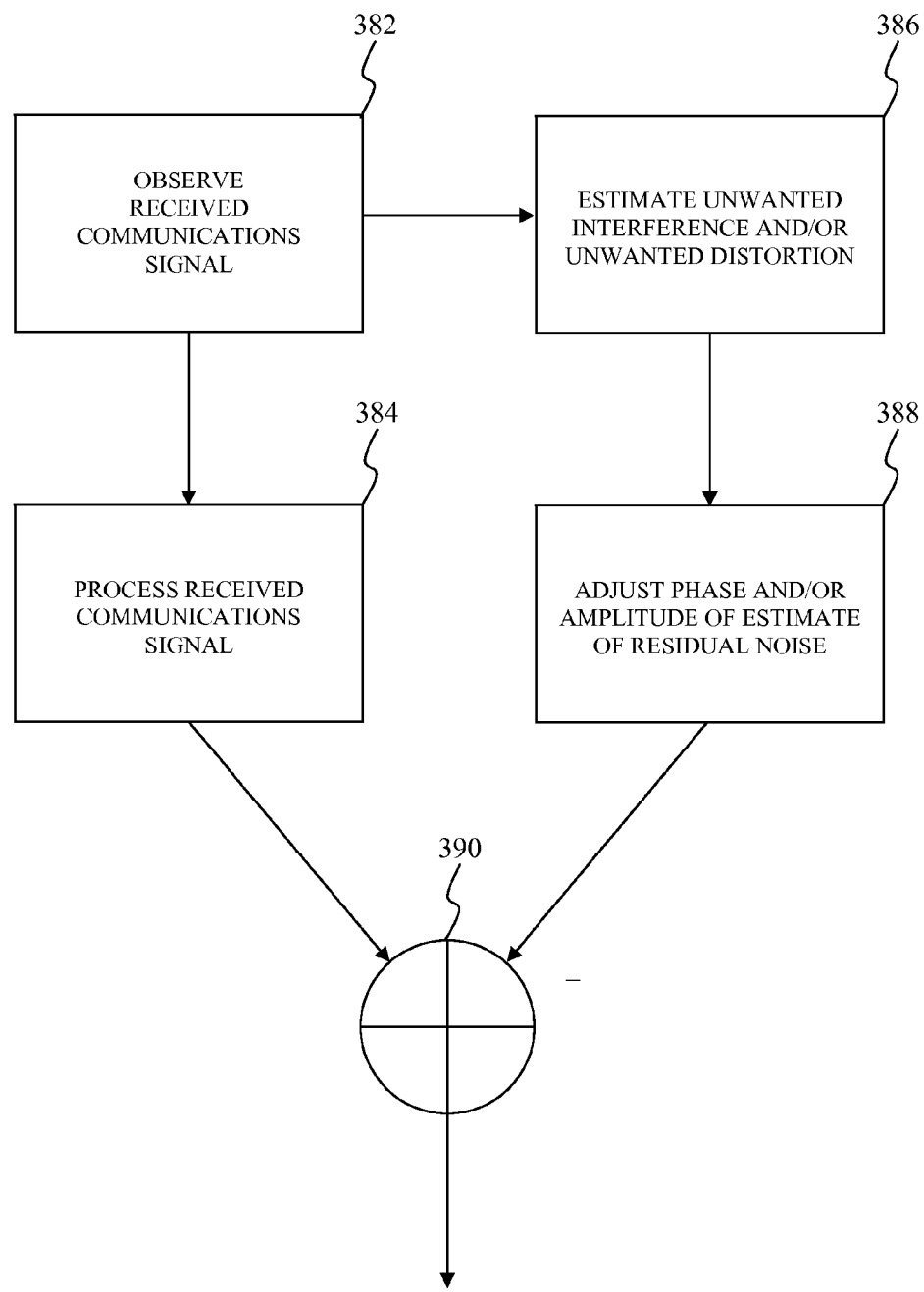
FIG. 3B is a flowchart of exemplary operational steps of the front end module that may be implemented as part of the communications receiver according to an exemplary embodiment of the present invention.

FIG. 3B is a flowchart of exemplary operational steps of the front end module that may be implemented as part of the communications receiver according to an exemplary embodiment of the present invention. The invention is not limited to this operational description. Rather, it will be apparent to persons skilled in the relevant art(s) from the teachings herein that other operational control flows are within the scope and spirit of the present invention. The following discussion describes the steps in FIG. 3B.

At step 382, the operational control flow observes a received communication signal, such as the received communications signal 154 to provide an example, after it propagates through a communication channel, such as the communication channel 104 to provide an example. Typically, the received communications signal may include one or more desired communications signals and unwanted electromagnetic radiation, such as the unwanted interference 350 to provide an example.

At step 384, the operational control flow processes the received communications signal from step 382 to recover one or more samples of the one or more desired communications signals to provide one or more samples of an observed sequence of data, such as the observed sequence of data 356 to provide an examples. The operational control flow may introduce unwanted distortion by unintentionally altering or distorting the one or more desired communications signals and/or the unwanted interference during the processing in step 384. Specifically, the operational control flow processes the received communications signal from step 382 using one or more processes, such as amplification, filtering, frequency translation, analog to digital conversion, and/or any other suitable signal processing operation to recover the one or more desired communications signals from the received communications signal from step 382 that will be apparent to those skilled in relevant art(s) without departing from the spirit and scope of the present invention. Some of the one or more processes may unintentionally alter or distort the one or more desired communications signals and/or the unwanted interference while being processed.

At step 386, the operational control flow estimates the unwanted interference from step 382 and/or the unwanted distortion introduced in step 384 that remains in the one or more samples of the observed sequence of data after being processed in step 384 to provide one or more samples of an estimate of residual noise, such as the estimate of residual noise 358 to provide an example. The operation control may estimate the unwanted distortion introduced in step 384 from some of the processes from step 384, but need not estimate the unwanted distortion introduced in step 384 from all of the processes from step 384

At step 388, the operational control flow adjusts a phase and/or an amplitude of the one or more samples of the estimate of residual noise from step 386. For example, the operational control flow may delay the one or more samples of the estimate of residual noise from step 386. The operational control flow adjusts the phase and/or the amplitude of the one or more samples such that their phases and/or their amplitudes approximate phases and/or amplitudes of the unwanted interference from step 382 and/or the unwanted distortion from step 384 remaining within the one or more samples of the observed sequence of data from step 384.

At step 390, the operational control flow substantially removes the adjusted estimate from step 388 from the one or more samples of the one or more observed sequences of data from step 384 leaving the one or more samples of the desired communications signals to effectively compensate for the unwanted interference 350 from step 382 and/or the unwanted distortion from step 384 remaining within the observed sequence of data from step 384.

Figure 4A:
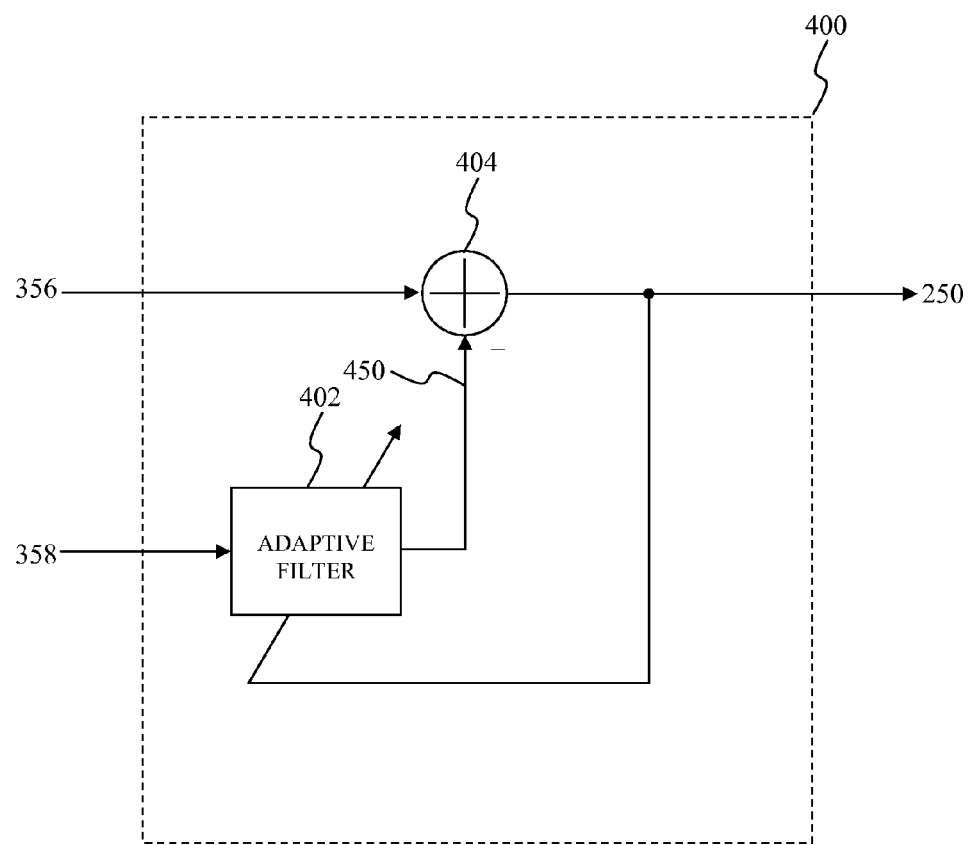
FIG. 4A illustrates a block diagram of a first adjustment module that may be implemented as part of the first front end module according to an exemplary embodiment of the present invention.

Exemplary Embodiments of the Adjustment Module that is Implemented as Part of the First Front End Module FIG. 4A illustrates a block diagram of a first adjustment module that may be implemented as part of the first front end module according to an exemplary embodiment of the present invention. An adjustment module 400 adjusts the phase and/or the amplitude of the estimate of residual noise 358 such that the amplitude and/or the phase approximates the phase and/or the amplitude of the unwanted interference 350 and/or the unwanted distortion remaining within the observed sequence of data 356. The adjustment module 400 substantially removes this phase and/or amplitude adjusted estimate from the observed sequence of data 356 to provide the digital sequence of data 250. The adjustment module 400 includes an adaptive filter module 402 and a combination module 404. The adjustment module 400 may represent an exemplary embodiment of the adjustment module 308.

The adaptive filter module 402 may be implemented using an adaptive filter having one or more adaptive filtering taps that adaptively adjusts its own impulse response using the digital sequence of data 250. The adaptive filter module 402 may adjust its own impulse response by adjusting one or more filtering coefficients using an adaptive filtering algorithm such as the Least Mean Squared (LMS), the Recursive Least Squares (RLS), the Minimum Mean Squared Error (MMSE) algorithms or any other equivalent algorithm that will be apparent to those skilled in the relevant art(s) without departing from the spirit and scope of the present invention. Typically, the one or more desired communications signals that are embedded within the observed sequence of data 356 are uncorrelated with the unwanted interference 350 and/or the unwanted distortion remaining within the observed sequence of data 356. However, the unwanted interference 350 and/or the unwanted distortion remaining within the observed sequence of data 356 are substantially correlated with the estimate of residual noise 358. The adaptive filter module 402 adaptively adjusts its own impulse response to adjust the phase and/or the amplitude of the estimate of residual noise 358 such that the phase and/or the amplitude approximates the phase and/or the amplitude of the unwanted interference 350 and/or the unwanted distortion remaining within the observed sequence of data 356 to provide a replica of residual noise 450.

The combination module 404 combines the observed sequence of data 356 and the replica of residual noise 450 to provide the digital sequence of data 250. Specifically, the replica of residual noise 450 is substantially aligned in phase and/or amplitude with the unwanted interference 350 and/or the unwanted distortion remaining within the observed sequence of data 356. The combination module 404 substantially removes the replica of residual noise 450 from the observed sequence of data 356 leaving the one or more desired communications signals as the digital sequence of data 250.

Figure 4B:
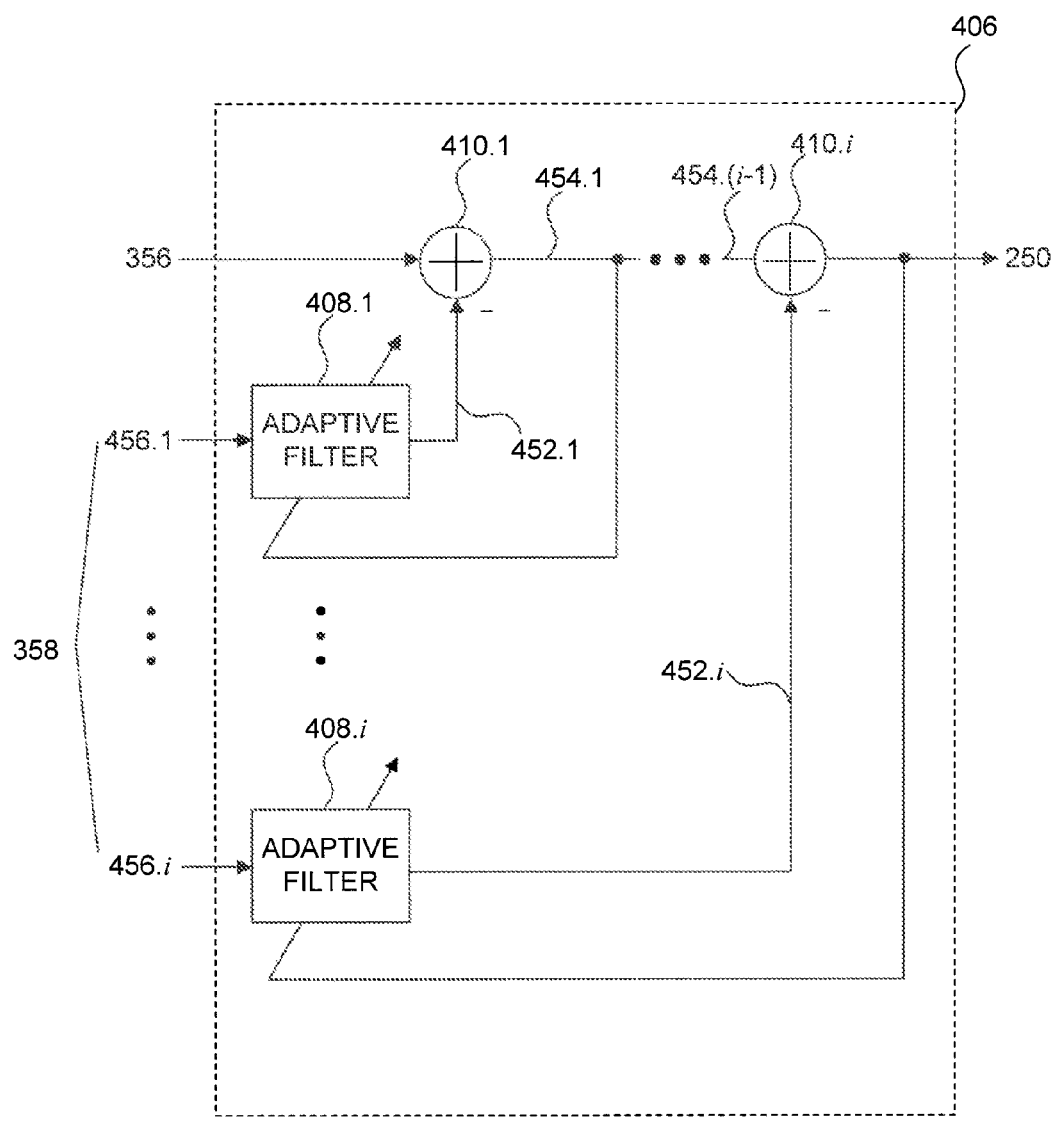
FIG. 4B illustrates a block diagram of a second adjustment module that may be implemented as part of the first front end module according to an exemplary embodiment of the present invention.

FIG. 4B illustrates a block diagram of a second adjustment module that may be implemented as part of the first front end module according to an exemplary embodiment of the present invention. In this exemplary embodiment, an estimation module, such as the estimation module 306 to provide an example, provides estimates of residual noise 456.1 through 456.i as the estimate of residual noise 358. Each of the estimates of residual noise 456.1 through 456.i may correspond to a frequency spectrum that is occupied by at least some of the unwanted interference 350 and/or the unwanted distortion remaining within the observed sequence of data 356, that is not presently occupied by at least some of the unwanted interference 350 and/or the unwanted distortion remaining within the observed sequence of data 356 but may so to in the future, that is occupied by at least one of the one or more desired communications signals and/or that is not presently occupied by at least one of the one or more desired communications signals but may so be in the future.

An adjustment module 406 may adjust phases and/or amplitudes of the estimates of residual noise 456.1 through 456.i individually using multiple adaptive filter modules instead of adjusting the phase and/or the amplitude of the estimate of residual noise 358 as a whole. In an exemplary embodiment, the unwanted interference 350 and/or the unwanted distortion remaining within the observed sequence of data 356 may include dominant interference and/or distortion that may be characterized as being much larger than other non-dominant interference and/or distortion remaining within the observed sequence of data 356. In this exemplary embodiment, the adjustment module 400 may be able to align the phase and/amplitude of the estimate of residual noise 358 with a phase and/amplitude of the dominant interference and/or distortion. However, the adjustment module 400 may not be able to align the phase and/amplitude of the estimate of residual noise 358 with phases and/amplitudes of the non-dominant interference and/or distortion, and/or may not be able to align as rapidly as desired, possibly due to operating in the presence of the dominant interference and/or distortion. As a result, the adjustment module 400 may not be able to substantially remove the non-dominant interference and/or distortion from the observed sequence of data 356, and/or may not be able to remove the non-dominant interference and/or distortion from the observed sequence of data 356 and/or distortion as rapidly as desired.

The adjustment module 406 individually aligns the estimates of residual noise 456.1 through 456.i with one or more components within a portion of a frequency spectrum that is presently, or may be in the future, occupied by the unwanted interference 350 and/or the unwanted distortion remaining within the observed sequence of data 356. From the exemplary embodiment above, although the dominant interference and/or distortion is much larger than other non-dominant interference and/or distortion, the adjustment module 406 may adjust the phase and/or amplitude of the estimates of residual noise 456.1 through 456.i individually to align the phase and/amplitude of the estimate of residual noise 358 with phases and/amplitudes of the non-dominant interference and/or distortion.

The adjustment module 406 includes adaptive filter modules 408.1 through 408.i and combination modules 410.1 through 410.i. The adjustment module 406 may represent an exemplary embodiment of the adjustment module 308. The adaptive filter modules 408.1 through 408.(i−1) adaptively adjust their impulse response based upon digital sequences of data 454.1 through 454.(i−1) to adjust the phase and/or the amplitude of the estimates of residual noise 456.1 through 456.(i−1). The adaptive filter module 408.i adaptively adjusts its impulse response based upon the digital sequence of data 250 to adjust the phase and/or the amplitude of the estimate of residual noise 456.i. Each of adaptive filter modules 408.1 through 408.i operate in a substantially similar manner as the adaptive filter module 402 and will not be described in further detail, except to note that the convergence speed or bandwidth of each of the adaptive filter modules 408.1 through 408.i may be different from the convergence speed or bandwidth of other adaptive filter modules from among the adaptive filter modules 408.1 through 408.i. As an example, a gain term applied in an adaptive coefficient update adjustment for each of the adaptive filter modules 408.1 through 408.i may vary from one adaptive filter module to another. The bandwidth of the adaptive filter modules 408.1 through 408.i may vary temporally as well, with more rapid response (e.g., higher bandwidth adaptation) provided initially to facilitate substantially reducing the unwanted interference 350 and/or the unwanted distortion remaining within the observed sequence of data 356. In an exemplary embodiment, the adaptive filter module 408.1 is associated with the most dominant interference and/or distortion from among the unwanted interference 350 and/or the unwanted distortion remaining within the observed sequence of data 356, and, in a typical embodiment, would have an initial adaptation bandwidth larger (more rapid response) than the other adaptive filter modules from among the adaptive filter modules 408.2 through 408.i, and more rapid than even its own subsequent adaptation bandwidth.

The combination module 410.1 combines the observed sequence of data 356 and the replica of residual noise 452.1 to provide a digital sequence of data 454.1. The combination modules 410.2 through 410.(i−1) combine digital sequences of data 454.1 through 454.(i−2) and replicas of residual noise 452.2 through 452.(i−1) to provide next digital sequences of data 454.3 through 454.i. The combination module 410.i combines the digital sequence of data 454.(i−1) and the replica of residual noise 452.i to provide the digital sequence of data 250. Each of the combination modules 410.1 through 410.i operate in a substantially similar manner as the combination module 404 and will not be described in further detail. It should be noted that with a plurality of estimates of residual noise 456.1 through 456.i, as shown in FIG. 4B, another configuration for the combination modules 410.1 through 410.i may be used to concatenate a multiplicity of adjustment modules 400, with the digital sequence of data 250 of a first adjustment module from the multiplicity of adjustment modules 400 as the observed sequence of data 356 to a second adjustment module from the multiplicity of adjustment modules 400, but with the second adjustment module accepting residual noise estimate 456.2. The concatenation continues in this fashion until the estimate of residual noise 456.i is input to an $i^{th}$ adjustment module of the multiplicity of adjustment modules 400.

Figure 4C:
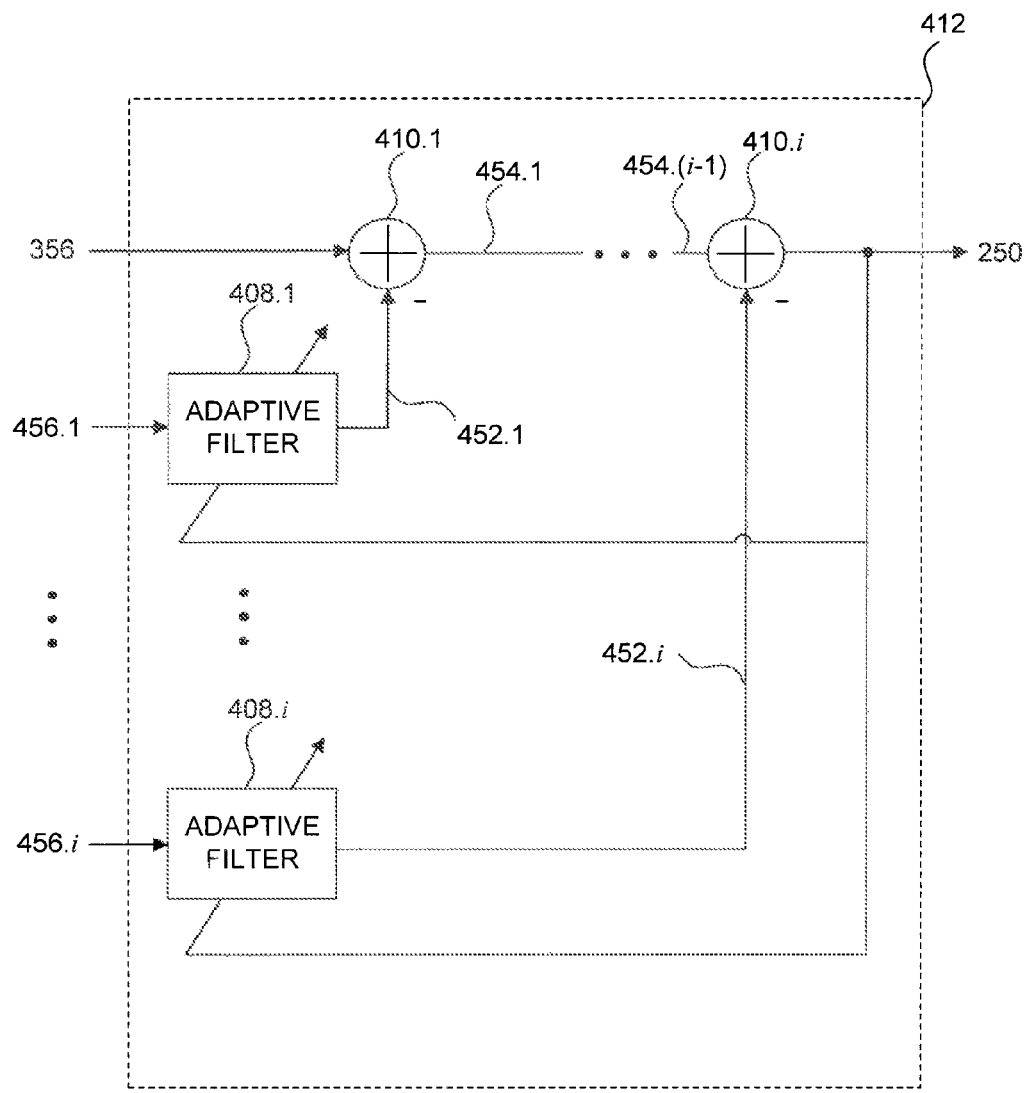
FIG. 4C illustrates a block diagram of a third adjustment module that may be implemented as part of the first front end module according to an exemplary embodiment of the present invention.

FIG. 4C illustrates a block diagram of a third adjustment module that may be implemented as part of the first front end module according to an exemplary embodiment of the present invention. An adjustment module 412 shares many substantially similar features as the adjustment module 406; however, the adaptive filter modules 408.1 through 408.i adaptively adjust their own impulse response based upon the digital sequence of data 250 to adjust the phase and/or the amplitude of the estimates of residual noise 456.1 through 456.i.

Figure 4D:
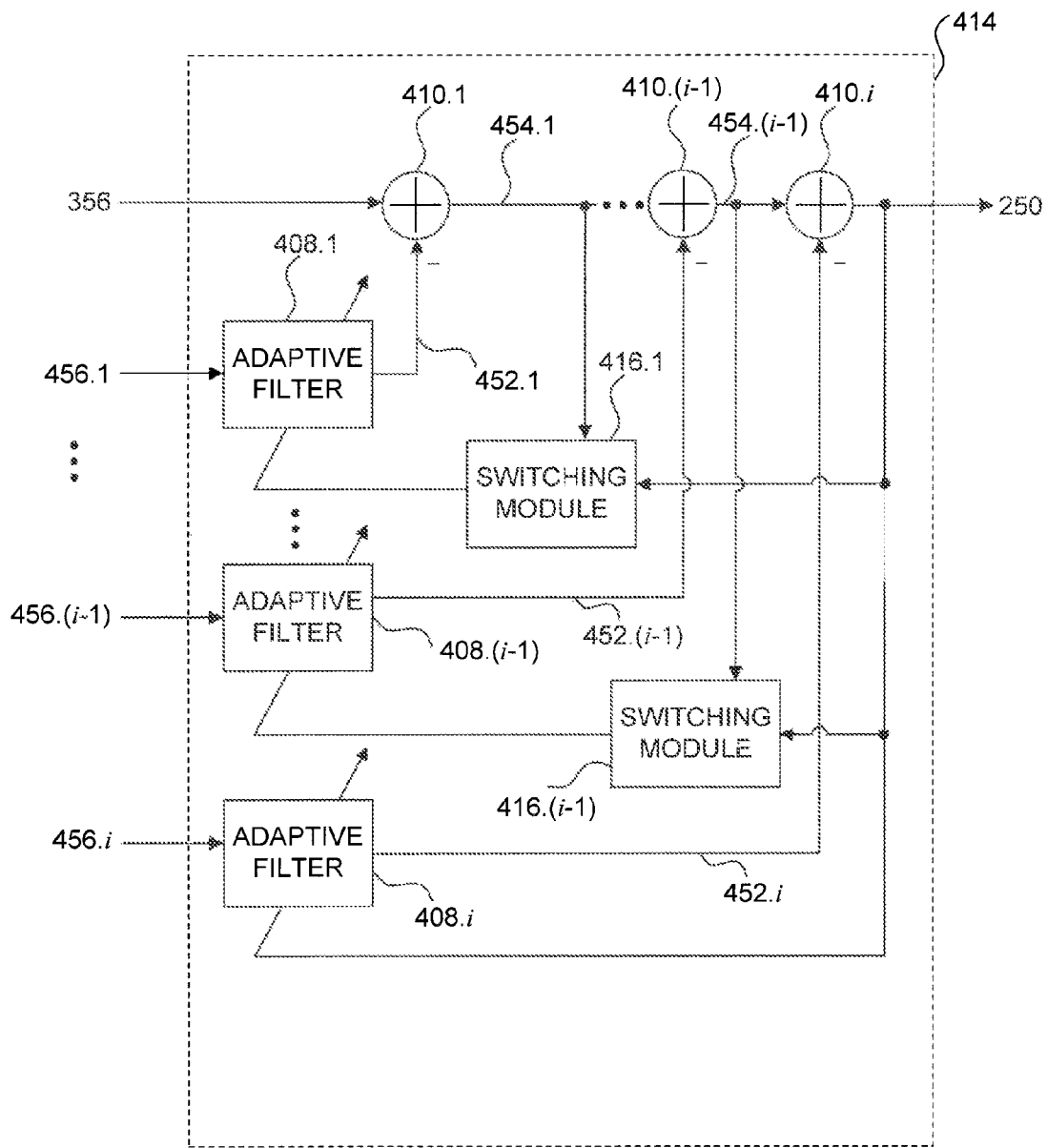
FIG. 4D illustrates a block diagram of a fourth adjustment module that may be implemented as part of the first front end module according to an exemplary embodiment of the present invention.

FIG. 4D illustrates a block diagram of a fourth adjustment module that may be implemented as part of the first front end module according to an exemplary embodiment of the present invention. An adjustment module 414 shares many substantially similar features as the adjustment module 406; however, the adaptive filter modules 408.1 through 408.(i−1) are coupled to switching modules 416.1 through 416.(i−1) to allow the adaptive filter modules 408.1 through 408.(i−1) to adjust their impulse responses based upon either the digital sequence of data 250 or the digital sequences of data 454.1 through 454.(i−1), providing the flexibility of the adjustment module 414 to select for each of the adaptive filter modules 408.1 through 408.(i−1) to be operated either in accordance with adjustment module 406 or with adjustment module 412.

Typically, the switching modules 416.1 through 416.(i−1) may be initially configured to allow the adaptive filter modules 408.1 through 408.(i−1) to adjust their impulse responses based upon the digital sequences of data 454.1 through 454.(i−1), especially in the presence of a dominant interference and/or distortion that may be characterized as being much larger than other non-dominant interference and/or distortion remaining within the observed sequence of data 356. As discussed above, the adaptive filter modules 408.1 through 408.(i−1) converge their respective filtering coefficients in accordance with the adaptive filtering algorithm. Typically, the filtering coefficients converge faster to their optimal, or near optimal solution, when using the digital sequence of data 454.1 through 454.(i−1) when compared to using the digital sequence of data 250 in this initial state. Using the corresponding digital sequence of data 454.1 through 454.(i−1) in this manner allows its corresponding adaptive filter module 408.1 through 408.(i−1) to converge without being influenced by the interference and/or distortion removed by the previous adaptive filter modules from among the corresponding adaptive filter module 408.1 through 408.(i−1) and without having to operate in the presence of the tap noise and convergence associated with following adaptive filter modules from among the corresponding adaptive filter modules 408.1 to 408.(i−1).

The switching modules 416.1 through 416.(i−1) may switch from the digital sequences of data 454.1 through 454.(i−1) to the digital sequence of data 250 after the respective filtering coefficients have sufficiently converged to their optimal, or near optimal solution. For example, the adjustment module 414 may monitor a power level in one or more of the digital sequences of data 454.1 through 45.(i−1) for a reduction and/or a stabilization indicating that the filtering coefficients used to generate the one or more of the digital sequences of data 454.1 through 45.(i−1) have sufficiently converged. As another example, the adjustment module 414 may monitor a power level in the digital sequence of data 250 for a reduction and/or a stabilization indicating that the filtering coefficients have sufficiently converged. As a further example, the adjustment module 414 may monitor adjustments to the filtering coefficients as they converge. Typically, the filtering coefficients are usually adjusted in increments referred to as Δ. As an adaptive filter converges upon the optimal solution, or the near-optimal solution, over some span of time, a power level of the Δ will be reduced and/or stabilized. Initially, the filtering coefficients will be changing more rapidly in a given amount of time. The adjustment module 414 measures this change in the filtering coefficients by squaring the Δ, and averaging over all of the filtering coefficients for a corresponding adaptive filter module 408.1 through 408.(i−1) for a given amount of time.

Typically, the digital sequence of data 250 offers a signal with less interference and/or distortion after the filtering coefficients have sufficiently converged using the one or more of the digital sequences of data 454.1 through 454.(i−1). As a result, the optimal solution, or the near-optimal solution, for the filter coefficients is better maintained using the digital sequence of data 250 when compared to the digital sequences of data 454.1 through 454.(i−1). Additionally, less noise resulting from the convergence of the filtering coefficients, sometimes referred to as tap noise, is introduced into the digital sequence of data 250 when using the digital sequence of data 250. However, the switching modules 416.1 through 416.(i−1) may revert to back to the digital sequences of data 454.1 through 454.(i−1) when one or a combination of the following occurs: the power level of the one or more of the digital sequences of data 454.1 through 454.(i−1), increases and/or destabilizes, b) the power level of the digital sequence of data 250 increases and/or destabilizes, and/or c) the power level of the Δ increases and/or destabilizes in one or some of the adaptive filter modules 408.1 through 408.(i−1).

In an exemplary embodiment, the adjustment module 414 additionally monitors correlation between the digital sequences of data 456.1 through 456.(i−1). The correlation between the digital sequences of data 456.1 through 456.(i−1) may cause a transient response in the filtering coefficients when switching to the digital sequence of data 250 that causes the taps to no longer maintain their optimal solution, or near-optimal solution. In this situation, the switching modules among 416.1 through 416.(i−1) do not switch when their associated input digital sequences 416.1 through 416.(i−1) share correlation with another of the input digital sequences 416.1 to 416.(i−1). For example, when the digital sequences of data 456.1 and 456.2 are correlated, switching modules 416.1 and 416.2, are typically not switched to select 250, to avoid a potential instability.

Figure 4E:
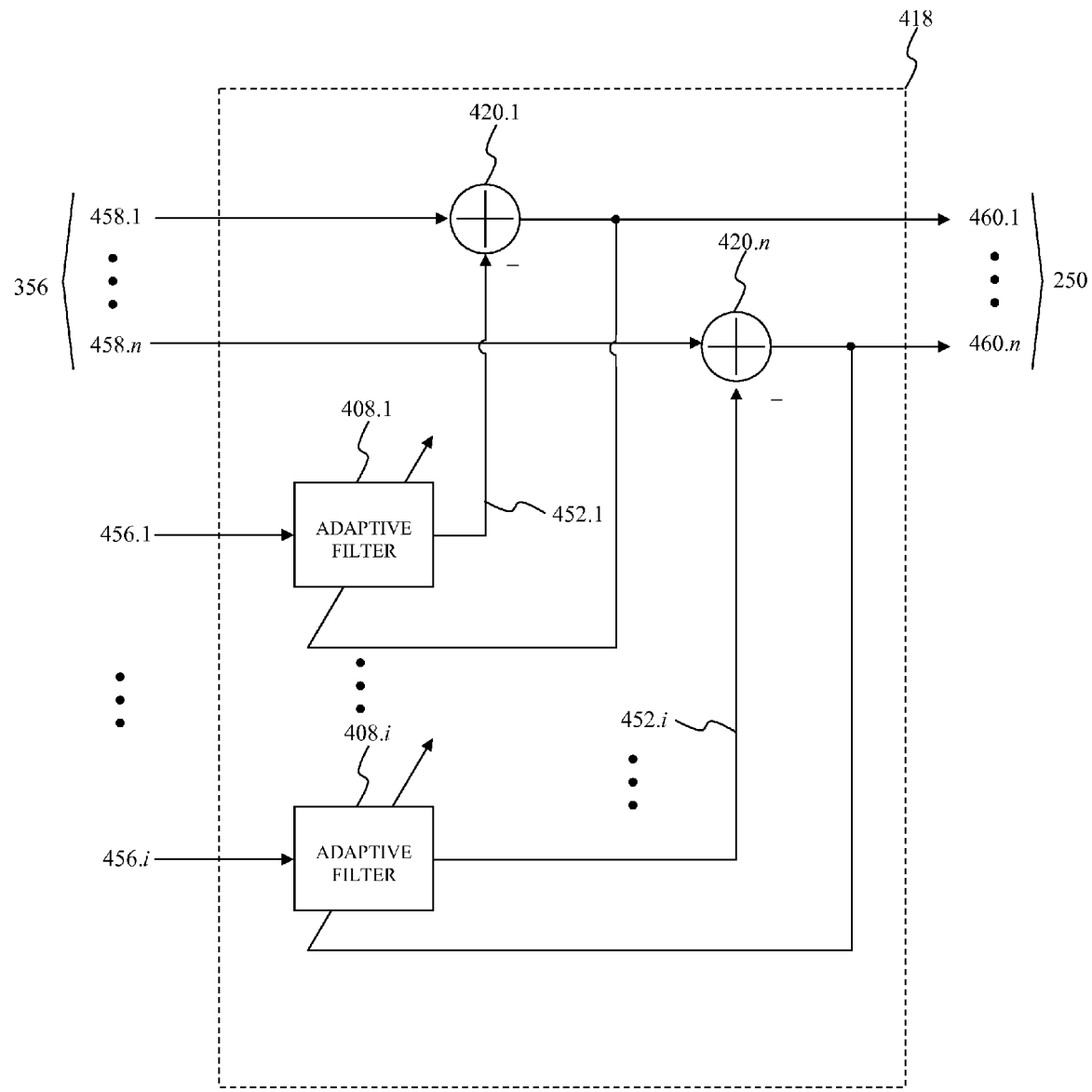
FIG. 4E illustrates a block diagram of a fifth adjustment module that may be implemented as part of the first front end module according to an exemplary embodiment of the present invention.

FIG. 4E illustrates a block diagram of a fifth adjustment module that may be implemented as part of the first front end module according to an exemplary embodiment of the present invention. In this exemplary embodiment, a front end processor, such as the front end processor 304 to provide an example, provides observed sequences of data 458.1 through 458.*n* as the observed sequence of data 356. Each of the observed sequences of data 458.1 through 458.*n* corresponds to a portion of a frequency spectrum that is occupied by a received communications signal, such as the received communications signal 154 to provide an example, and/or portion of the frequency spectrum that is not presently occupied by the received communications signal, but may so be in the future. For example, the observed sequences of data 458.1 through 458.*n* may correspond to one or more desired communications signals that are embedded with the received communications signal to provide an example.

Rather than compensating for the unwanted interference 350 and/or the unwanted distortion remaining within the observed sequence of data 356, as a whole, the adjustment module 418 compensates for the unwanted interference 350 and/or the unwanted distortion remaining within the observed sequences of data 458.1 through 458.*n*. In an exemplary embodiment, at least one of the one or more desired communications signals may dominate other desired communications signals. In this exemplary embodiment, the adjustment module 400, the adjustment module 406, the adjustment module 412 and/or the adjustment module 414 may be able to compensate for the unwanted interference 350 and/or the unwanted distortion remaining within the dominant desired communications signals. However, these adjustment modules may not be able to compensate for the unwanted interference 350 and/or the unwanted distortion remaining within these other non-dominant desired communications signals. In this exemplary embodiment, although some of the desired communications signals may dominate other desired communications signals, the adjustment module 418 may compensate for the unwanted interference 350 and/or the unwanted distortion remaining within these other non-dominant desired communications signals.

The adjustment module 418 adjusts the phases and/or the amplitudes of the estimates of residual noise 456.1 through 456.*i* such that the amplitudes and/or the phases approximate the phase and/or the amplitude of the unwanted interference 350 and/or the unwanted distortion remaining within the observed sequences of data 458.1 through 458.*n* to provide replicas of residual noise 452.1 through 452.*i*.

The combination modules 420.1 through 420.*n* combine the observed sequences of data 356.1 through 356.*n* with the replicas of residual noise 452.1 through 452.*i* to provide the one or more digital sequences of data 460.1 through 460.*n*. The digital sequences of data 460.1 through 460.*n* represent an exemplary embodiment of the digital sequence of data 250. Each of the combination modules 420.1 through 420.*n* operate in a substantially similar manner as the combination module 404 and will not be described in further detail.

Figure 5A:
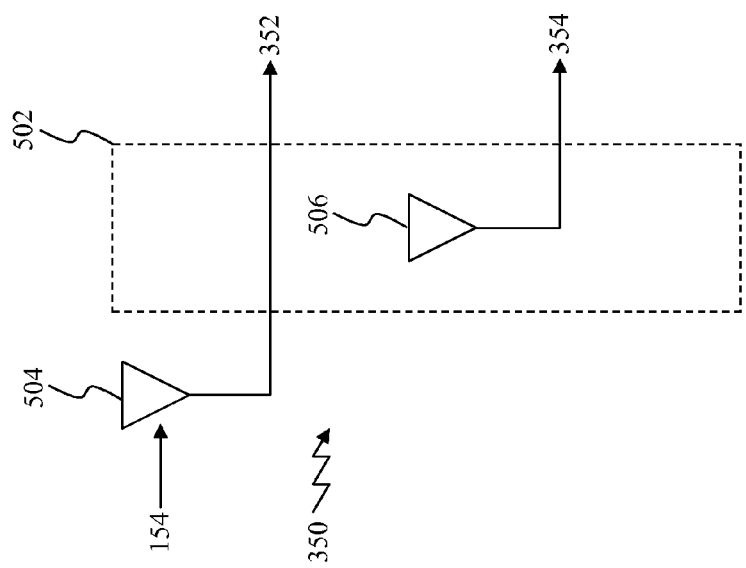
FIG. 5A illustrates a block diagram of a first receiving module that may be implemented as part of the first front end module according to an exemplary embodiment of the present invention.

Exemplary Embodiments of the Receiving Module that May be Implemented as Part of the First Front End Module FIG. 5A illustrates a block diagram of a first receiving module that may be implemented as part of the first front end module according to an exemplary embodiment of the present invention. A receiving module 502 includes one or more desired signal receiving antennas 504 and one or one or more undesired signal receiving antennas 506. The receiving module 502 may represent an exemplary embodiment of the receiving module 302.

The receiving module 502 observes the received communications signal 154 and the unwanted interference 350 using the one or more desired signal receiving antennas 504 to provide the primary received communications signal 352. Alternatively, the receiving module 502 may include one or more desired signal receiving ports to directly receive the received communications signal 154 from a communications cable, such as a fiber optical communications cable, a coaxial communications cable, or any other suitable communications cable that will be apparent to those skilled in the relevant art(s) without departing from the spirit and scope of the present invention. In another alternate, the one or more desired signal receiving antennas 504 may be coupled or connected to the one or more desired signal receiving ports.

The one or more desired signal receiving antennas 504 represent any suitable antenna that is capable of observing a communication signal, such as the received communications signal 154 to provide an example, after it passes through a communications channel, such as the communications channel 104 to provide an example. In an exemplary embodiment, the one or more desired signal receiving antennas 504 represent one or more external antennas, namely the one or more desired signal receiving antennas 504 may be coupled to receiving module 502 using a communications cable or may be connected to the receiving module 502 using a physical connector or any other suitable physical coupling that will be apparent to those skilled in the relevant art(s) without departing from the spirit and scope of the present invention.

The receiving module 502 observes the unwanted interference 350 using the one or more undesired signal receiving antennas 506 to provide the secondary received communications signal 354. The one or more undesired signal receiving antennas 506 represent any suitable antenna that is capable of observing signals that are propagating throughout a communications receiver, such as the communications receiver 200 to provide an example. In an exemplary embodiment, the one or more undesired signal receiving antennas 506 are implemented using one or more transmission line mediums, such as stripline or microstrip to provide some examples. For example, the receiving module 502, as well as other modules of the communications receiver, may be implemented on a common chip or die. In this example, the one or more undesired signal receiving antennas 506 may be directly fabricated onto the common chip or die. Alternatively, the receiving module 502 as well as the other modules of the communications receiver may be each implemented on a single chip or die. The one or more undesired signal receiving antennas 506 may be directly fabricated onto one of the single chips or dies or onto another single chip or die.

Additionally, the one or more desired signal receiving antennas 504 and/or the one or more undesired signal receiving antennas 506 may introduce unwanted distortion into the primary received communications signal 352 and the secondary received communications signal 354, respectively, by unintentionally altering or distorting the received communications signal 154 and/or the unwanted interference 350.

Figure 5B:
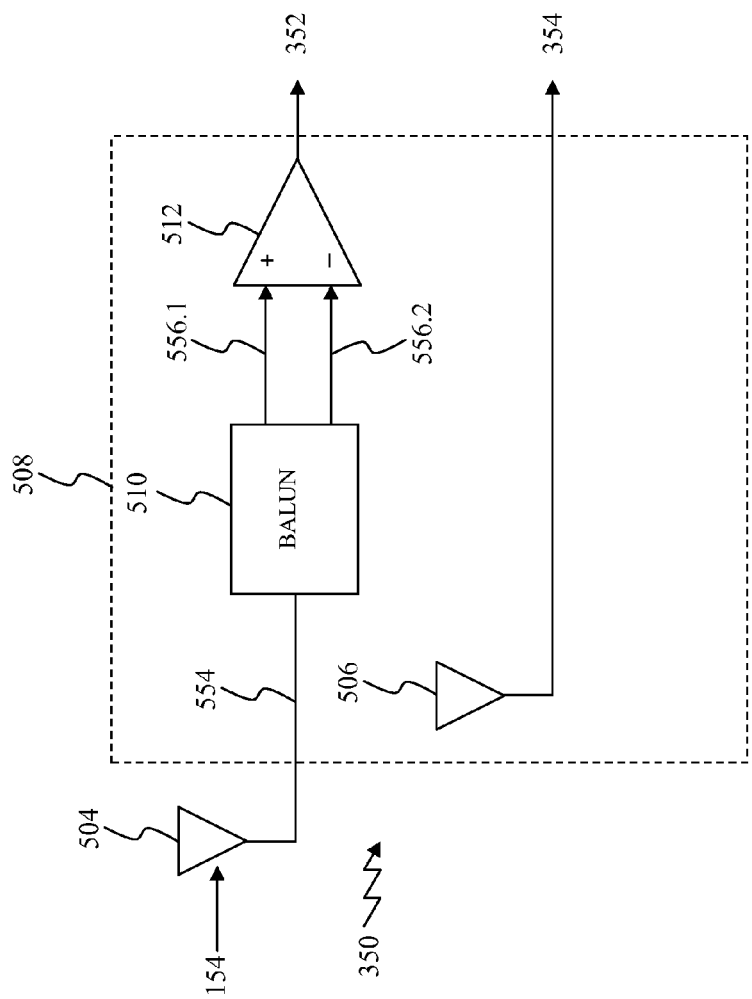
FIG. 5B illustrates a block diagram of a second receiving module that may be implemented as part of the first front end module according to an exemplary embodiment of the present invention.

FIG. 5B illustrates a block diagram of a second receiving module that may be implemented as part of the first front end module according to an exemplary embodiment of the present invention. A receiving module 508 includes the one or more desired signal receiving antennas 504, the one or more undesired signal receiving antennas 506, a balun module 510, and an amplifier module 512. The receiving module 508 may represent an exemplary embodiment of the receiving module 302. The receiving module 508 shares many substantially similar features with the receiving module 502; therefore, only differences between the receiving module 502 and receiving module 508 are to be discussed in farther detail.

The receiving module 508 observes the received communications signal 154 and the unwanted interference 350 using the one or more desired signal receiving antennas 504 to provide an observed communications signal 554.

The balun module 510 converts the observed communications signal 554 from an unbalanced or single-ended observed communications signal to a balanced or differential observed communications signal 556.1, 556.2. The unwanted interference 350 indirectly couples more strongly to the differential observed communications signal 556.1, 556.2 when compared to the received communications signal 154.

The amplifier module 512 converts the differential observed communications signal 556.1, 556.2 from differential to single-ended to provide the primary received communications signal 352.

Additionally, the one or more desired signal receiving antennas 504, the one or more undesired signal receiving antennas 506, the balun module 510, and/or the amplifier module 512 may introduce unwanted distortion into the primary received communications signal 352 and/or the secondary received communications signal 354 by unintentionally altering or distorting the received communications signal 154 and/or the unwanted interference 350.

Figure 5C:
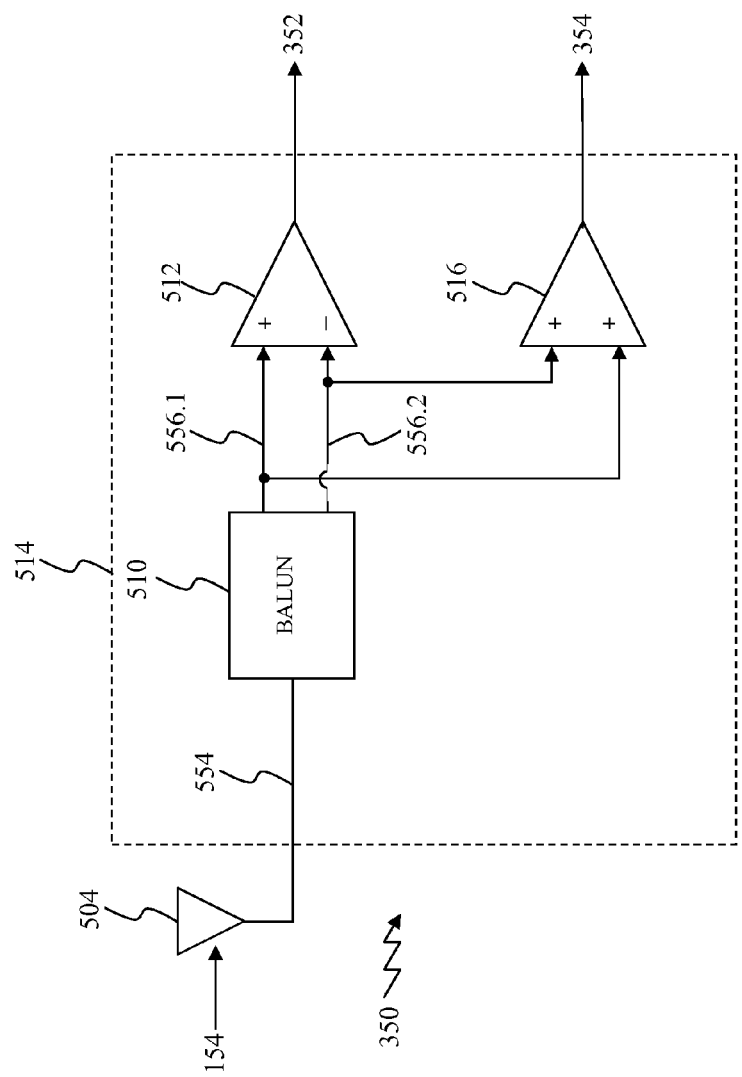
FIG. 5C illustrates a block diagram of a third receiving module that may be implemented as part of the first front end module according to an exemplary embodiment of the present invention.

FIG. 5C illustrates a block diagram of a third receiving module that may be implemented as part of the first front end module according to an exemplary embodiment of the present invention. A receiving module 514 includes the one or more desired signal receiving antennas 504, the balun module 510, the amplifier module 512, and an amplifier module 516. The receiving module 514 may represent an exemplary embodiment of the receiving module 302. The receiving module 514 shares many substantially similar features with the receiving module 508; therefore, only differences between the receiving module 508 and the receiving module 514 are to be discussed in farther detail.

The differential observed communications signal 556.1 and the differential observed communications signal 556.2 may include a common-mode component and a differential-mode component. Typically, the differential-mode component may include the received communications signal 154 and the unwanted interference 350 while the common-mode component may include the unwanted interference 350.

The amplifier module 516 combines the differential observed communications signal 556.1 and the differential observed communications signal 556.2 to substantially remove the differential-mode component leaving the common-mode component of the differential observed communications signal 556.1, 556.2 as the secondary received communications signal 354.

Additionally, the one or more desired signal receiving antennas 504, the one or more undesired signal receiving antennas 506, the balun module 510, the amplifier module 512 and/or the amplifier module 516 may introduce unwanted distortion into the primary received communications signal 352 and/or the secondary received communications signal 354 by unintentionally altering or distorting the received communications signal 154 and/or the unwanted interference 350.

Other exemplary embodiments of the front end module 300 are to be discussed in further detail below. These other exemplary embodiments demonstrate exemplary configurations and arrangements of the receiving module 302, the front end processor 304, the estimation module 306, and the adjustment module 308 that may be used to form other exemplary front end modules. However, the embodiments to be discussed in further detail below are not limiting, other embodiments are possible that will be apparent to those skilled in the relevant art(s) without departing from the spirit and scope of the present invention.

Figure 6:
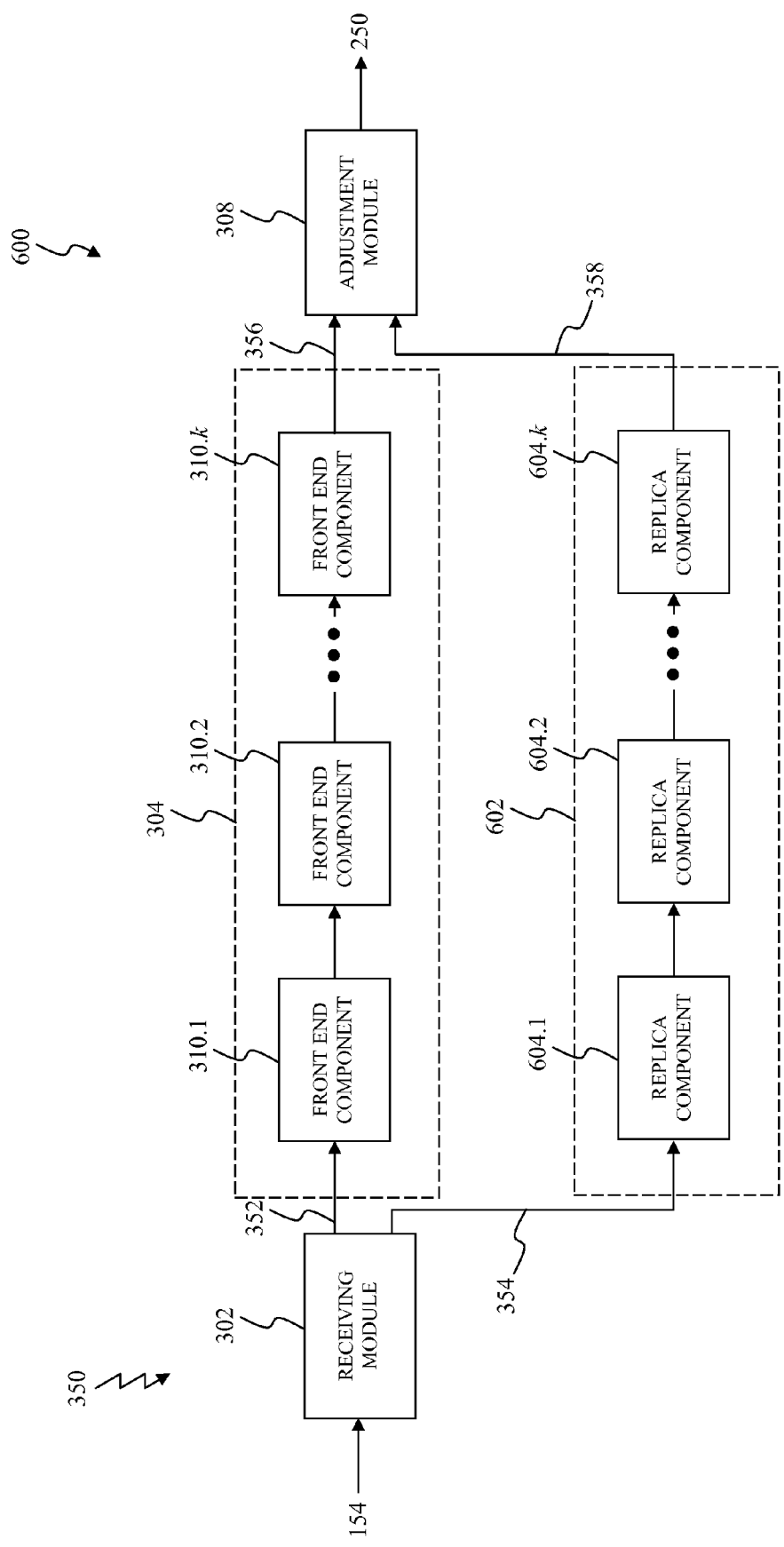
FIG. 6 illustrates a block diagram of a second front end module that may be implemented as part of the communications receiver according to an exemplary embodiment of the present invention.

Second Exemplary Embodiment of the Front End Module that May be Implemented as Part of the Communication Receiver FIG. 6 illustrates a block diagram of a second front end module that may be implemented as part of the communications receiver according to an exemplary embodiment of the present invention. As discussed above, the front end processor 304 may introduce unwanted distortion into the received communications signal 154 by unintentionally altering or distorting the received communications signal 154 and/or the unwanted interference 350. In this exemplary embodiment, a front end module 600 includes an estimation module 602 that may be implemented using a substantially similar configuration and arrangement as the front end processor 304 to substantially replicate or generate any unwanted distortion introduced by the signal processing path of the front end processor 304. The front end module 600 includes the receiving module 302, the front end processor 304, the adjustment module 308, and the estimation module 602 to substantially compensate for the unwanted interference 350 and/or the unwanted distortion remaining within the observed sequence of data 356. The front end module 600 may represent an exemplary embodiment of the front end module 300. The front end module 600 shares many substantially similar features with the front end module 300; therefore, only differences between the front end module 300 and the front end module 600 are to be discussed in farther detail.

The estimation module 602 generates the estimate of residual noise 358 that corresponds to the unwanted interference and/or the unwanted distortion that is present within a signal processing path of the front end processor 304. As discussed above, the front end processor 304 may include one or more front end components 310.1 through 310.$k$ that are configured and arranged to form the signal processing path. Similarly, the estimation module 602 may include one or more replica components 604.1 through 604.$k$ that are configured and arranged to form a distortion generation path. The one or more replica components 604.1 through 604.$k$ are substantially similar to the one or more front end components 310.1 through 310.$k$. As discussed above, the front end components 310.1 through 310.$k$ may introduce unwanted distortion onto signals within the front end processor 304 during processing of their corresponding signals. The replica components 604.1 through 604.$k$ may introduce substantially similar distortion onto signals within the estimation module 602 during processing of their corresponding signals such that the unwanted interference 350 and/or the unwanted distortion remaining within the observed sequence of data 356 is substantially similar to the unwanted interference 350 and/or the unwanted distortion remaining within the estimate of residual noise 358.

In an exemplary embodiment, the front end module 600 may be used in situations when the unwanted interference 350 may be characterized as being much larger than the received communications signal 154 such that most of the unwanted distortion introduced by the front end processor 304 may be attributed to the unwanted interference 350. In this exemplary embodiment, any inter-modulation distortion may be characterized as being of such little significance that it may be considered negligible when compared to the unwanted distortion introduced that is attributed to the unwanted interference 350. For example, external electromagnetic radiation may be produced by another communications device that is sufficiently proximate to the front end module 600 transmitting a communications signal having a power level that is much greater than a power level of the received communications signal 154. In this example, most of the unwanted distortion introduced by the front end processor 304 may be attributed to the communication signal. However, this example is not limiting, those skilled in the relevant art(s) will recognize that the front end module 600 may also be used when the unwanted interference 350 is less than, greater than, and/or equal to the received communications signal 154 without departing from the spirit and scope of the present invention.

Figure 7A:
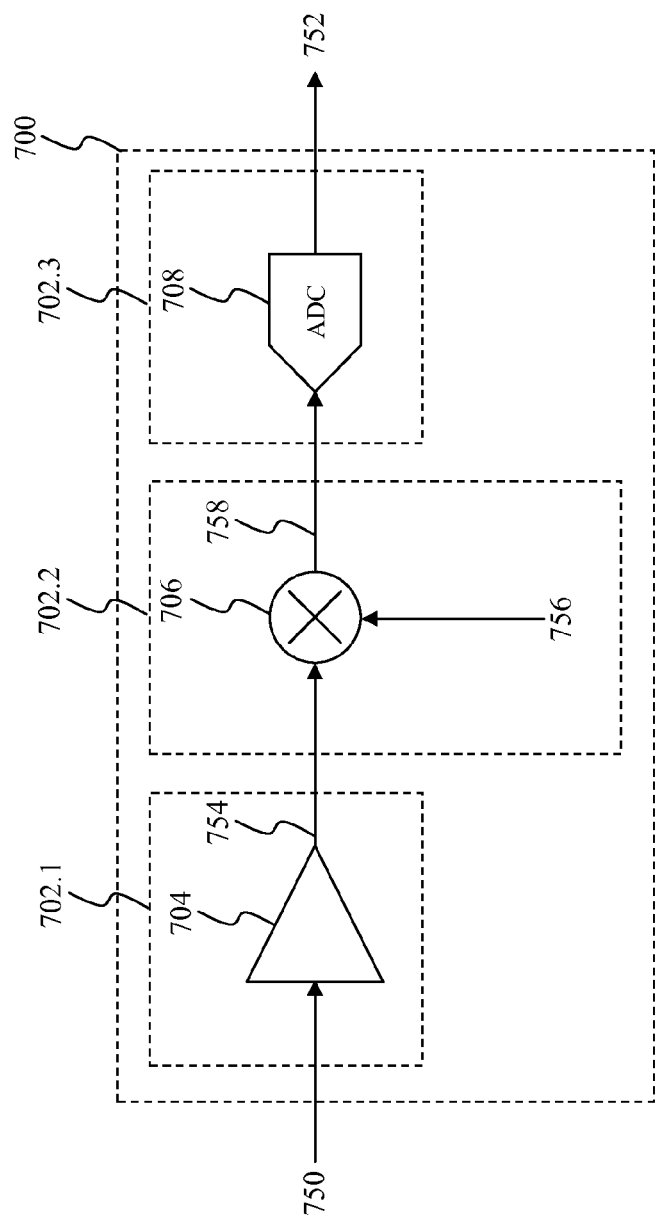
FIG. 7A illustrates a block diagram of a first configuration and arrangement of front end components that may be used in the second front end module according to an exemplary embodiment of the present invention.

Exemplary Configurations and Arrangements of Front End Components that May be Used in the Second Front End Module FIG. 7A illustrates a block diagram of a first configuration and arrangement of front end components that may be used in the second front end module according to an exemplary embodiment of the present invention. An exemplary configuration and arrangement 700 includes front end components 702.1 through 702.3. The exemplary configuration and arrangement 700 may represent an exemplary embodiment of the front end processor 304 and/or estimation module 602. As such, the front end components 702.1 through 702.3 may represent an exemplary configuration and arrangement of the front end components 310.1 through 310.*k* and/or the replica components 604.1 through 604.*k*.

The first front end component 702.1 includes an amplifier module 704 to amplify a communications signal 750, such as the primary received communications signal 352 and/or the secondary received communications signal 354 to provide some examples, to provide an amplified communications signal 754. The communications signal 750 may include the unwanted interference 350 and/or the received communications signal 154, the unwanted interference 350 being characterized as being much larger than the received communications signal 154 such that most of unwanted distortion introduced by the amplifier module 704 may be attributed to the unwanted interference 350. In this situation, the amplifier module 704 may introduce unwanted distortion by unintentionally altering or distorting the unwanted interference 350 during amplification.

The second front end component 702.2 includes a mixer module 706 to frequency translate the amplified communications signal 754 using a local oscillator signal 756 to provide a translated communications signal 758. The mixer module 706 may frequency translate the amplified communications signal 754 to approximately baseband or a suitable intermediate frequency (IF) that will be apparent to those skilled in the relevant art(s) without departing from the spirit and scope of the present invention. The mixer module 706 may introduce unwanted distortion by unintentionally altering or distorting the amplified communications signal 754 during frequency translation. Any inter-modulation distortion between the received communications signal 154, the unwanted interference 350, and/or the local oscillator signal 756 may be characterized as being of such little significance that it may be considered negligible when compared to the unwanted distortion introduced that is attributed to the amplified communications signal 754.

The third front end component 702.3 includes an analog to digital converter (ADC) 708 to convert the translated communications signal 758 from an analog representation to a digital representation to provide a sequence of data 752. The sequence of data 752 may represent an exemplary embodiment of the observed sequence of data 356 and/or the estimate of residual noise 358. The ADC 708 may introduce unwanted distortion by unintentionally altering or distorting the translated communications signal 758 during conversion.

Figure 7B:
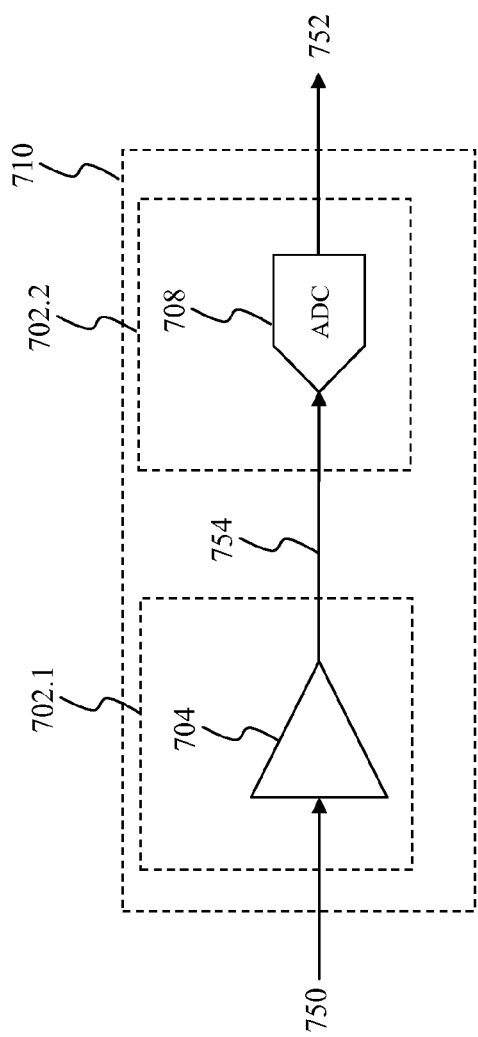
FIG. 7B illustrates a block diagram of a second configuration and arrangement of front end components that may be used in the second front end module according to an exemplary embodiment of the present invention.

FIG. 7B illustrates a block diagram of a second configuration and arrangement of front end components that may be used in the second front end module according to an exemplary embodiment of the present invention. An exemplary configuration and arrangement 710 includes front end components 712.1 through 712.2. The exemplary configuration and arrangement 710 may represent an exemplary embodiment of the front end processor 304 and/or estimation module 602. As such, the front end components 712.1 through 712.2 may represent an exemplary configuration and arrangement of the front end components 310.1 through 310.*k* and/or the replica components 604.1 through 604.*k*.

The first front end component 712.1 includes the amplifier module 704 to amplify the communications signal 750 to provide the amplified communications signal 754.

The second front end component 712.2 includes the ADC 708 to convert the amplified communications signal 754 from the analog representation to the digital representation to provide the sequence of data 752.

Figure 7C:
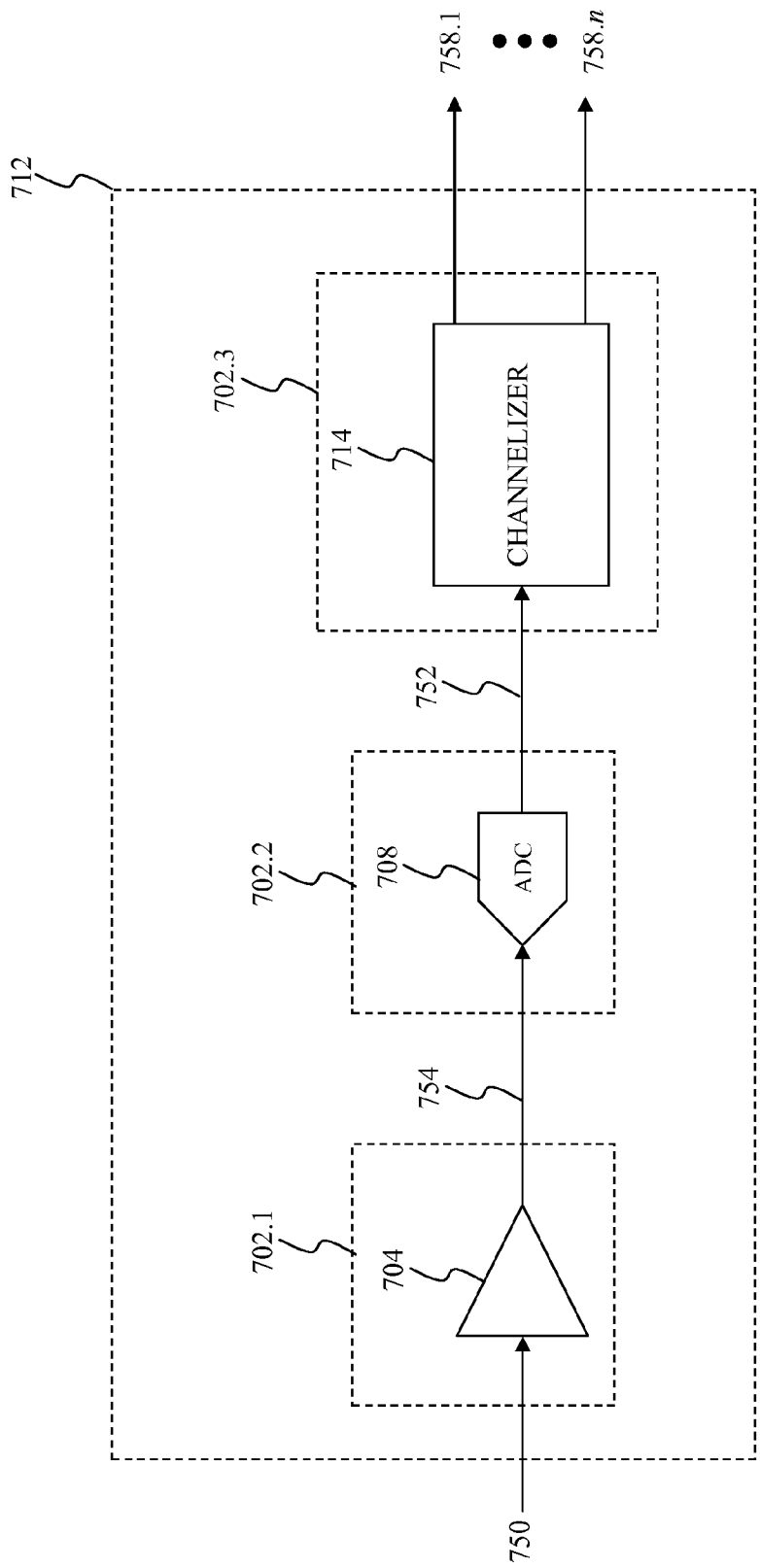
FIG. 7C illustrates a block diagram of a third configuration and arrangement of front end components that may be used in the second front end module according to an exemplary embodiment of the present invention.

FIG. 7C illustrates a block diagram of a third configuration and arrangement of front end components that may be used in the second front end module according to an exemplary embodiment of the present invention. An exemplary configuration and arrangement 712 includes front end components 716.1 through 716.3. The exemplary configuration and arrangement 712 may represent an exemplary embodiment of the front end processor 304 and/or estimation module 602. As such, the front end components 716.1 through 716.3 may represent an exemplary configuration and arrangement of the front end components 310.1 through 310.*k* and/or the replica components 604.1 through 604.*k*.

The first front end component 716.1 includes the amplifier module 704 to amplify the communications signal 750 to provide the amplified communications signal 754.

The second front end component 716.2 includes the ADC 708 to convert the amplified communications signal 754 from the analog representation to the digital representation to provide the sequence of data 752.

The third front end component 716.3 includes a channelizer module 714 to separate the observed sequence of data 752 into one or more sequences of data 758.1 through 758.*n*. Each of the one or more sequences of data 758.1 through 758.*n* corresponds to a portion of a frequency spectrum that is presently, or may be in the future, occupied by the received communications signal 154, the unwanted interference 350 and/or the unwanted distortion remaining within the observed sequence of data 356. The one or more sequences of data 758.1 through 758.*n* may represent an exemplary embodiment of the observed sequence of data 356 and/or the estimate of residual noise 358.

Although, the configuration and arrangement 700, the exemplary configuration and arrangement 710, and the exemplary configuration and arrangement 712 have been described as being possible exemplary implementations of the estimation module 602, those skilled in the relevant art(s) will recognize that these exemplary configurations and arrangements may also be used as possible exemplary implementations of the estimation module 306 without departing from the spirit and scope of the present invention.

Figure 8A:
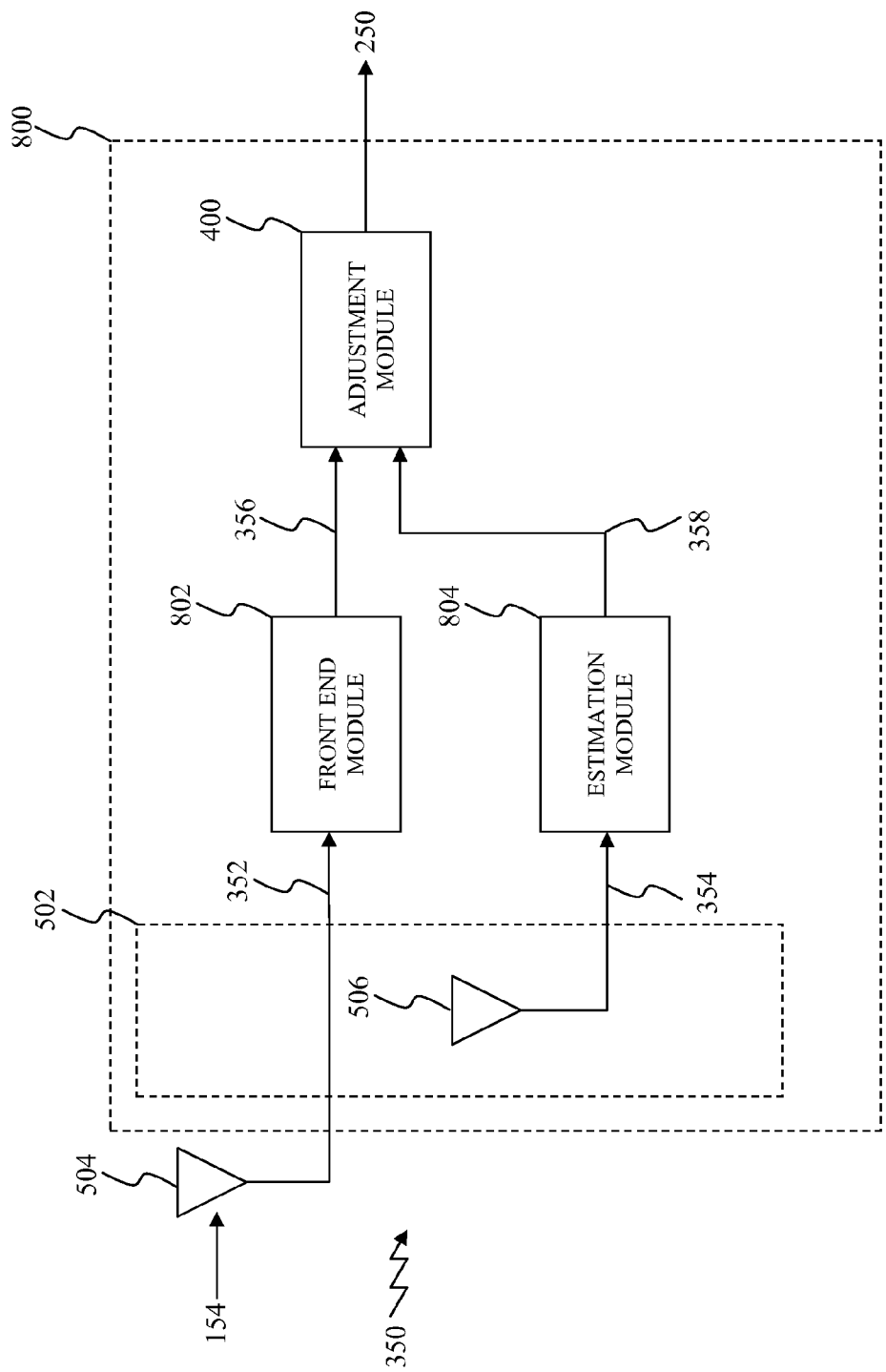
FIG. 8A illustrates a block diagram of a third front end module that may be implemented as part of the communications receiver according to an exemplary embodiment of the present invention.

Third Exemplary Embodiment of the Front End Module that May be Implemented as Part of the Communication Receiver FIG. 8A illustrates a block diagram of a third front end module that may be implemented as part of the communications receiver according to an exemplary embodiment of the present invention. A front end module 800 includes the receiving module 502, the adjustment module 400, a front end processor 802, and an estimation module 804. The front end module 800 may represent an exemplary embodiment of the front end module 300 and/or the front end module 600.

The receiving module 502 observes the received communications signal 154 and the unwanted interference 350 using the one or more desired signal receiving antennas 504 to provide the primary received communications signal 352. The receiving module 502 additionally observes the unwanted interference 350 using the one or more undesired signal receiving antennas 506 to provide the secondary received communications signal 354. Those skilled in the relevant art(s) will recognize that the front end module 800 may be similarly implemented using the receiving module 508 and the receiving module 514 without departing from the spirit and scope of the present invention.

The front end processor 802 processes the primary received communications signal 352 to provide the observed sequence of data 356. The front end processor 802 may be implemented using the configuration and arrangement 700 and/or the configuration and arrangement 710. The front end processor 802 may introduce unwanted distortion into the primary received communications signal 352 by unintentionally altering or distorting the primary received communications signal 352.

The estimation module 804 processes the secondary received communications signal 354 to provide the estimate of residual noise 358. The estimation module 804 estimates the unwanted interference 350 that remains within the observed sequence of data 356 and/or other unwanted components relating to the unwanted distortion within the observed sequence of data 356 that are introduced by the receiving module 502 and/or the front end processor 802. The estimation module 804 may be implemented using the configuration and arrangement 700 and/or the configuration and arrangement 710.

The adjustment module 400 substantially removes the estimate of residual noise 358 from the observed sequence of data 356 to provide the digital sequence of data 250.

Figure 8B:
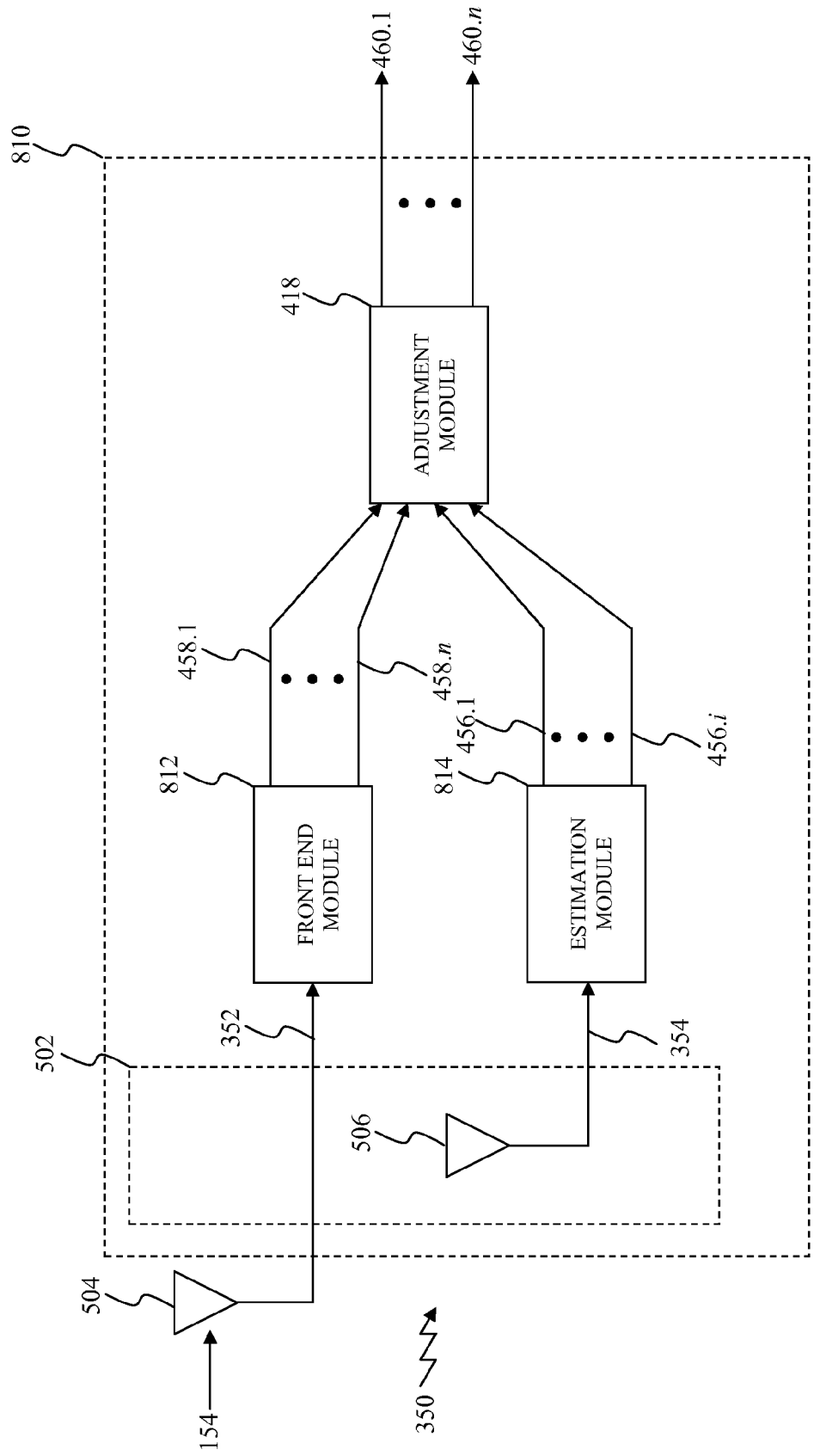
FIG. 8B illustrates a block diagram of a fourth front end module that may be implemented as part of the communications receiver according to an exemplary embodiment of the present invention.

Fourth Exemplary Embodiment of the Front End Module that May be Implemented as Part of the Communication Receiver FIG. 8B illustrates a block diagram of a fourth front end module that may be implemented as part of the communications receiver according to an exemplary embodiment of the present invention. A front end module 810 includes the receiving module 502, the adjustment module 418, a front end processor 812, and an estimation module 814. The front end module 810 may represent an exemplary embodiment of the front end module 300 and/or the front end module 600.

The receiving module 502 observes the received communications signal 154 and the unwanted interference 350 using the one or more desired signal receiving antennas 504 to provide the primary received communications signal 352. The receiving module 502 additionally observes the unwanted interference 350 using the one or more undesired signal receiving antennas 506 to provide the secondary received communications signal 354. Those skilled in the relevant art(s) will recognize that the front end module 810 may be similarly implemented using the receiving module 508 and the receiving module 514 without departing from the spirit and scope of the present invention.

The front end processor 812 processes the primary received communications signal 352 to provide the observed sequences of data 458.1 through 458.n. The front end processor 812 may be implemented using the configuration and arrangement 712.

The estimation module 814 processes the secondary received communications signal 354 to provide the estimates of residual noise 456.1 through 456.i. The estimation module 804 estimates the unwanted interference 350 that remains within the observed sequences of data 458.1 through 458.n and/or other unwanted components relating to the unwanted distortion within the observed sequences of data 458.1 through 458.n that is introduced by the receiving module 502 and/or the front end processor 812. The estimation module 814 may be implemented using the configuration and arrangement 712.

The adjustment module 400 substantially removes the estimates of residual noise 456.1 through 456.i from the observed sequences of data 458.1 through 458.n to provide the digital sequences of data 460.1 through 460.n.

Fifth Exemplary Embodiment of the Front End Module that May be Implemented as Part of the Communication Receiver Although FIG. 6 through FIG. 8B demonstrate some exemplary embodiments of the front end module 300 that are implemented as having their estimation modules being substantially similar to their corresponding front end modules, other exemplary embodiments of the front end module 300 may be implemented as having their estimation modules differ from their corresponding front end modules.

Figure 9:
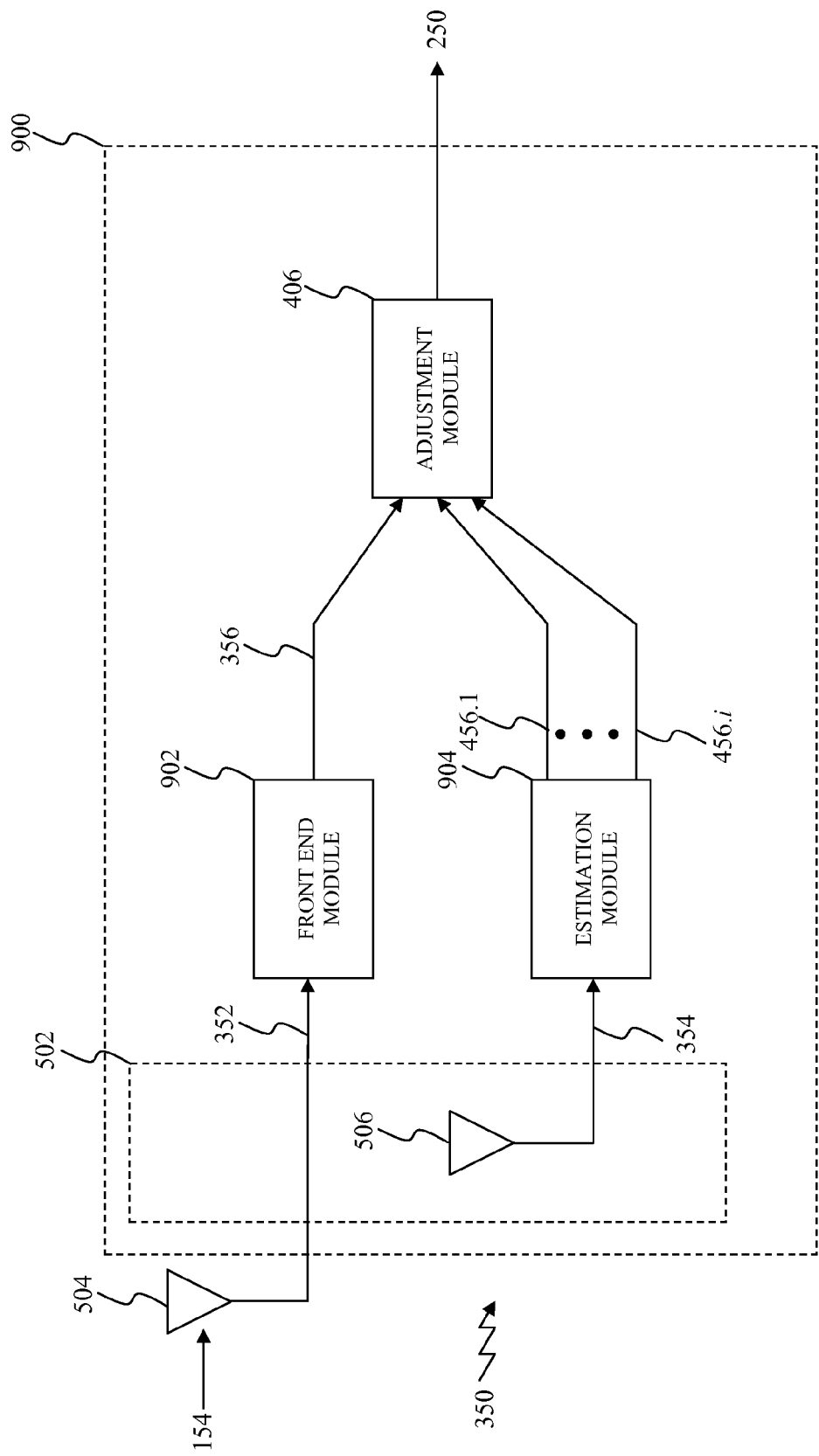
FIG. 9 illustrates a block diagram of a fifth front end module that may be implemented as part of the communications receiver according to an exemplary embodiment of the present invention.

FIG. 9 illustrates a block diagram of a fifth front end module that may be implemented as part of the communications receiver according to an exemplary embodiment of the present invention. A front end module 900 includes the receiving module 502, the adjustment module 406, a front end processor 902, and an estimation module 904. The front end module 900 may represent an exemplary embodiment of the front end module 300.

The receiving module 502 observes the received communications signal 154 and the unwanted interference 350 using the one or more desired signal receiving antennas 504 to provide the primary received communications signal 352. The receiving module 502 additionally observes the unwanted interference 350 using the one or more undesired signal receiving antennas 506 to provide the secondary received communications signal 354. Those skilled in the relevant art(s) will recognize that the front end module 900 may be similarly implemented using the receiving module 508 and the receiving module 514 without departing from the spirit and scope of the present invention.

The front end processor 902 processes the primary received communications signal 352 to provide the observed sequence of data 356. The front end processor 902 may be implemented using the configuration and arrangement 700 and/or the configuration and arrangement 710. The front end processor 902 may introduce unwanted distortion into the primary received communications signal 352 by unintentionally altering or distorting the primary received communications signal 352.

The estimation module 904 processes the secondary received communications signal 354 to provide the estimates of residual noise 456.1 through 456.i. The estimation module 904 estimates the unwanted interference 350 and/or the unwanted distortion remaining within the observed sequences of data 458.1 through 458.n. The estimation module 904 may be implemented using the configuration and arrangement 712.

The adjustment module 406 substantially removes the estimates of residual noise 456.1 through 456.i from the observed sequence of data 356 to provide the digital sequence of data 250. Those skilled in the relevant art(s) will recognize that the adjustment module 406 may be similarly implemented using the adjustment module 412 or the adjustment module 414 without departing from the spirit and scope of the present invention.

Figure 10:
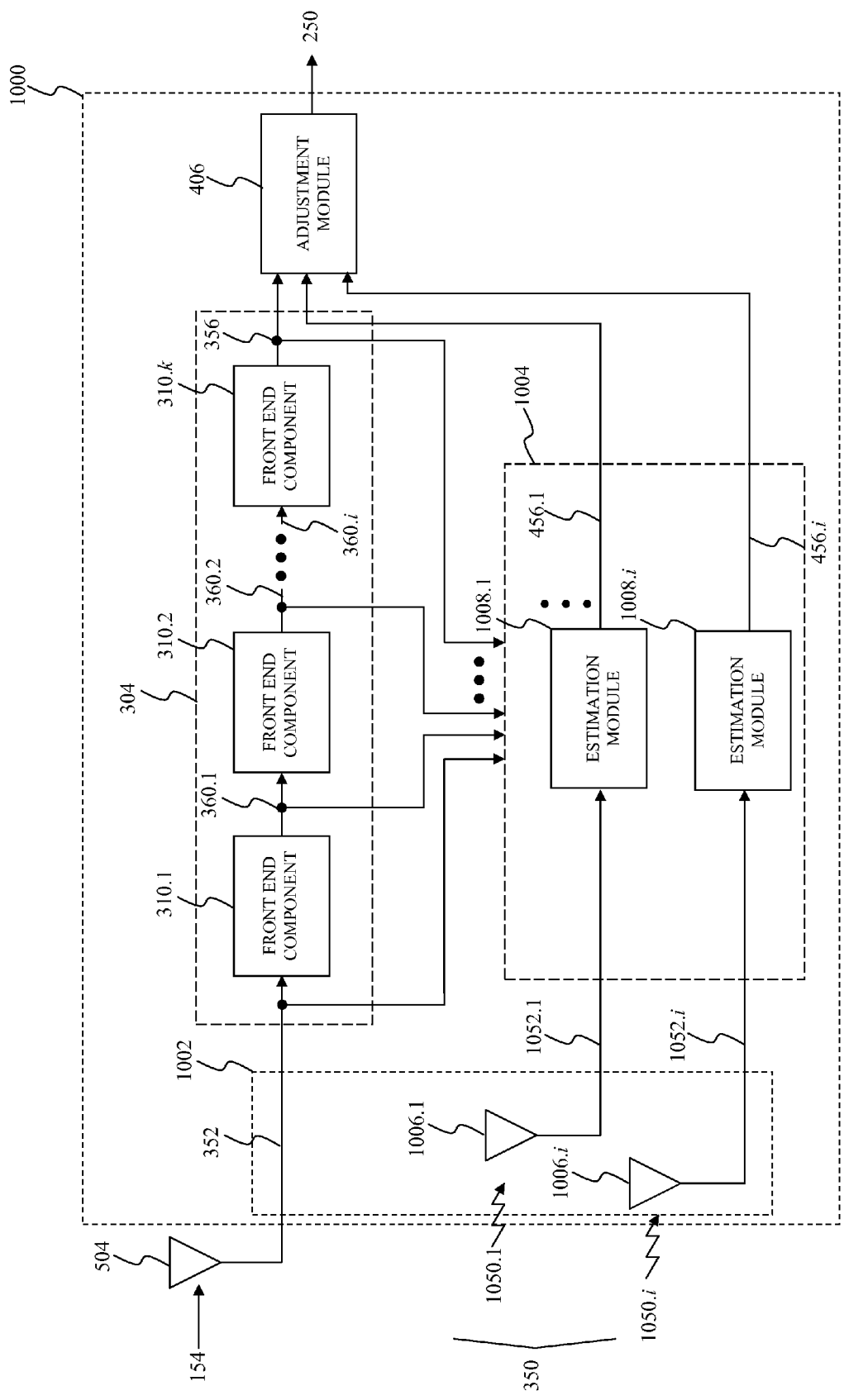
FIG. 10 illustrates a block diagram of a sixth front end module that may be implemented as part of the communications receiver according to an exemplary embodiment of the present invention.

Sixth Exemplary Embodiment of the Front End Module that May be Implemented as Part of the Communication Receiver FIG. 10 illustrates a block diagram of a sixth front end module that may be implemented as part of the communications receiver according to an exemplary embodiment of the present invention. In an exemplary embodiment, the unwanted interference 350 may include dominant electromagnetic radiation that may be characterized as being much larger than other non-dominant electromagnetic radiation within the unwanted interference 350. In this exemplary embodiment, the estimation module 306 may be able to estimate the unwanted interference 350 and/or the unwanted distortion remaining within the observed sequence of data 356 that is attributed to this dominant electromagnetic radiation. However, the estimation module 306 may not be able to estimate the unwanted interference 350 and/or the unwanted distortion remaining within the observed sequence of data 356 that is attributed to this non-dominant electromagnetic radiation. As a result, the adjustment module 406 may not be able to the unwanted interference 350 and/or the unwanted distortion remaining within the observed sequence of data 356 that is attributed to this non-dominant electromagnetic radiation by estimating the unwanted interference 350 and/or the unwanted distortion remaining within the observed sequence of data 356 as whole.

A front end module 1000 receives unwanted interferences 1050.1 through 1050.$i$ that may represent a portion of the unwanted interference 350. In an exemplary embodiment, one or more of the unwanted interferences 1050.1 through 1050.$i$ may correspond to unwanted electromagnetic radiation within the unwanted interference 350 that dominates other unwanted electromagnetic radiation within the unwanted interference 350. In another exemplary embodiment, one or more of the interferences 1050.1 through 1050.$i$ may correspond to unwanted electromagnetic radiation within the unwanted interference 350 that is dominated by other unwanted electromagnetic radiation with the unwanted interference 350. Although one or more of the unwanted interferences 1050.1 through 1050.$i$ may dominate other unwanted electromagnetic radiation from among the unwanted interferences 1050.1 through 1050.$i$, the front end module 1000 may remove other non-dominant unwanted electromagnetic radiation and/or unwanted distortion that is attributed to the non-dominant unwanted electromagnetic radiation remaining within the observed sequence of data by estimating the unwanted interference 350 in terms of the unwanted interference 1050.1 through 1050.$i$. The front end module 1000 includes the front end processor 304, the adjustment module 406, a receiving module 1002, and an estimation module 1004.

The receiving module 1002 observes the received communications signal 154 and the unwanted interference 350 using the one or more desired signal receiving antennas 504 to provide the primary received communications signal 352. The receiving module 302 observes the unwanted interference 1050.1 through 1050.$i$ using one or more undesired signal receiving antennas 1006.1 through 1006.$i$ to provide secondary received communication signals 1052.1 through 1052.$i$. For example, the receiving module 1002 observes a first unwanted interference 1050.1 using a first undesired signal receiving antenna 1006.1 to provide a first secondary received communications signal 1052.1 and an $i^{th}$ unwanted interference 1050.$i$ using an $i^{th}$ undesired signal receiving antenna 1006.$i$ to provide an $i^{th}$ secondary received communications signal 1052.$i$. Each of the one or more undesired signal receiving antennas 1006.1 through 1006.$i$ may be implemented in a substantially similar manner as the one or more undesired signal receiving antennas 506.

The front end processor 304 processes the primary received communications signal 352 to provide the observed sequence of data 356.

The estimation module 1004 includes estimation modules 1008.1 through 1008.$i$ to process the secondary received communication signals 1052.1 through 1052.$i$ to provide the estimates of the unwanted interference 456.1 through 456.$i$. Each of the estimation modules 1008.1 through 1008.$i$ may be implemented in a substantially similar manner as the estimation module 308. Additionally, some of the estimation modules 1008.1 through 1008.$i$ may be substantial similar to other estimation modules from among the estimation modules 1008.1 through 1008.$i$ and/or some of the estimation modules 1008.1 through 1008.$i$ may be different to other estimation modules from among the estimation modules 1008.1 through 1008.$i$. Further, the estimation modules 1008.1 through 1008.$i$ may process one or more of the primary received communications signal 352, a corresponding secondary received communications signal 1052.1 through 1052.$i$, the observed sequence of data 356, and the processed communication signals 360.1 through 360.$i$ to estimate the unwanted interferences 1050.1 through 1050.$i$ and/or the unwanted distortion remaining within the observed sequence of data 356.

The adjustment module 406 substantially removes the estimates of residual noise 456.1 through 456.$i$ from the observed sequence of data 356 to provide the digital sequence of data 250. Those skilled in the relevant art(s) will recognize that the adjustment module 406 may be similarly implemented using the adjustment module 412 or the adjustment module 414 without departing from the spirit and scope of the present invention.

Figure 11:
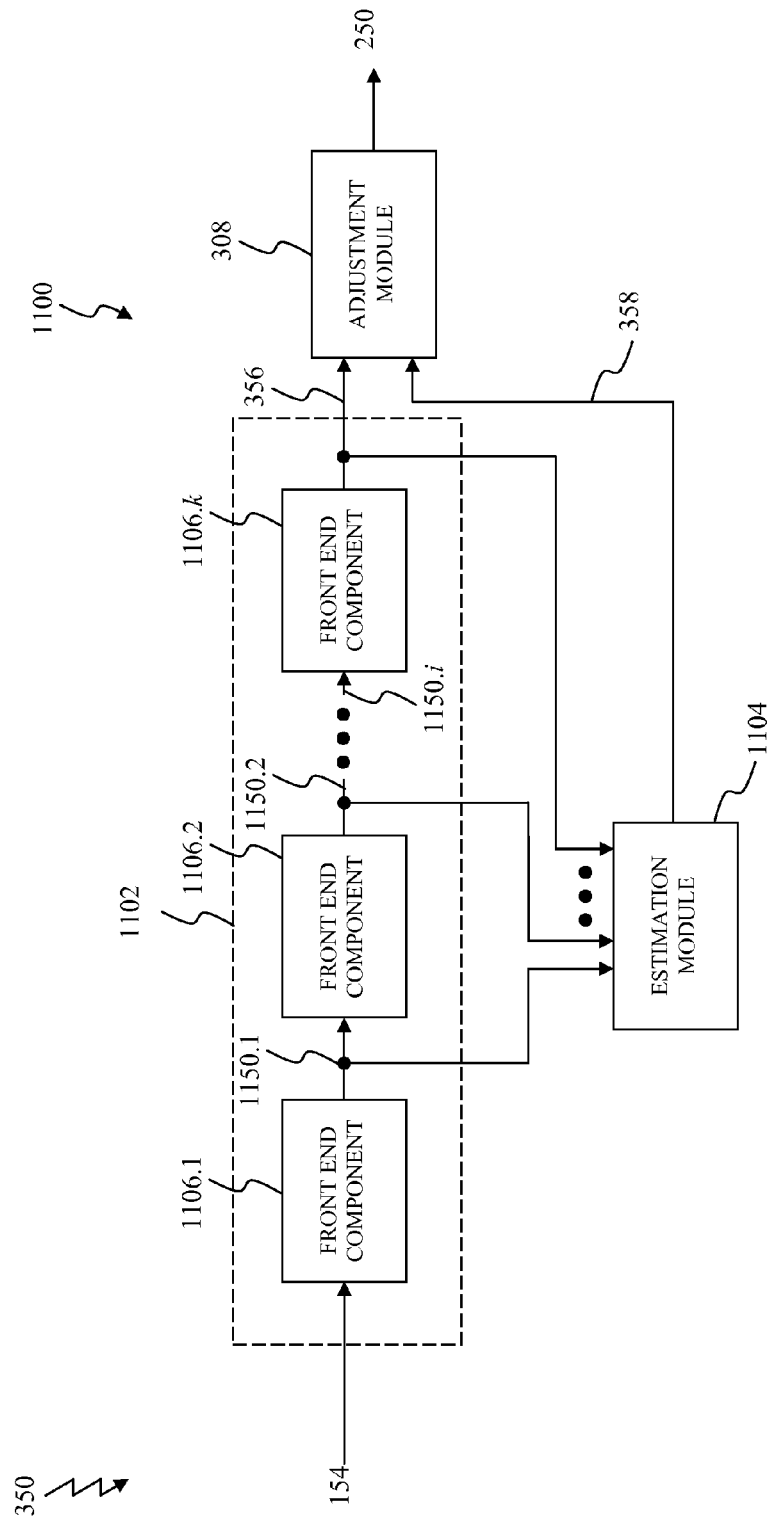
FIG. 11 illustrates a block diagram of a seventh front end module that may be implemented as part of the communications receiver according to an exemplary embodiment of the present invention.

Seventh Exemplary Embodiment of the Front End Module that May be Implemented as Part of the Communication Receiver FIG. 11 illustrates a block diagram of a seventh front end module that may be implemented as part of the communications receiver according to an exemplary embodiment of the present invention. A front end module 1100 estimates the unwanted interference 350 based upon one or more signals within the signal processing path of a front end processor 1102. The front end module 1100 includes the adjustment module 308, the front end processor 1102, and the estimation module 1104. The front end module 1100 may represent an exemplary embodiment of the front end module 202.

The front end processor 1102 processes the received communications signal 154 and/or the unwanted interference 350 to provide the observed sequence of data 356. The front end processor 1102 may process the received communications signal 154 and/or the unwanted interference 350 in a substantially similar manner as the front end processor 304 processes the primary received communications signal 352. The front end processor 1102 may include one or more front end components 1106.1 through 1106.$k$ that are configured and arranged to form a signal processing path to process the received communications signal 154 and/or the unwanted interference 350.

The estimation module 1104 generates the estimate of residual noise 358 that corresponds to the unwanted interference 350 and/or the unwanted distortion that is present within the signal processing path. Specifically, the estimation module 1104 processes one or more of the observed sequence of data 356 and/or the processed communication signals 1150.1 through 1150.*i* to estimate the unwanted interference 350 and/or the unwanted distortion remaining within the observed sequence of data 356 to provide the estimate of residual noise 358. The estimation module 1104 operates in a substantially similar manner as the estimation module 306.

The adjustment module 308 substantially removes the estimate of residual noise 358 from the observed sequence of data 356 to provide the digital sequence of data 250.

Other exemplary embodiments of the front end module 1100 are to be discussed in further detail below. These other exemplary embodiments demonstrate exemplary configurations and arrangements of the adjustment module 308, the front end processor 1102, and the estimation module 1104 that may be used to form other exemplary front end modules. However, the embodiments to be discussed in further detail below are not limiting, other embodiments are possible that will be apparent to those skilled in the relevant art(s) without departing from the spirit and scope of the present invention.

Figure 12A:
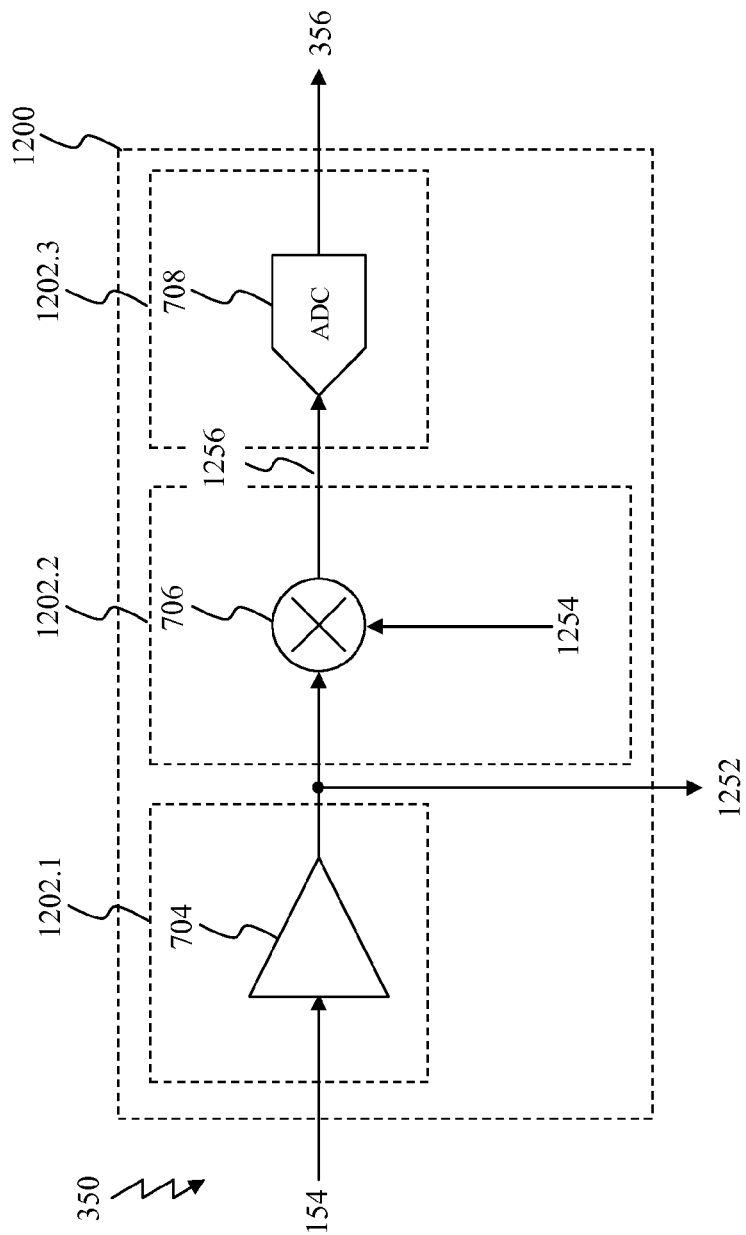
FIG. 12A illustrates a block diagram of a first configuration and arrangement of front end components that may be used in the seventh front end module according to an exemplary embodiment of the present invention.

Exemplary Configurations and Arrangements of Front End Components that May be Used in the Seventh Front End Module FIG. 12A illustrates a block diagram of a first configuration and arrangement of front end components that may be used in the seventh front end module according to an exemplary embodiment of the present invention. An exemplary configuration and arrangement 1200 includes front end components 1202.1 through 1202.3. An exemplary configuration and arrangement 1200 may represent an exemplary embodiment of the front end processor 1102. As such, the front end components 1202.1 and 1202.2 may represent an exemplary configuration and arrangement of the front end components 1106.1 through 1106.*k*.

The first front end component 1202.1 includes the amplifier module 704 to amplify the received communications signal 154 and/or the unwanted interference 350 to provide an amplified communications signal 1252.

The second front end component 1202.2 includes the mixer module 706 to frequency translate the amplified communications signal 1252 using a local oscillator signal 1254 to provide a translated communications signal 1256.

The third front end component 1202.3 includes the ADC 708 to convert the translated communications signal 1256 from the analog representation to the digital representation to provide the observed sequence of data 356.

Figure 12B:
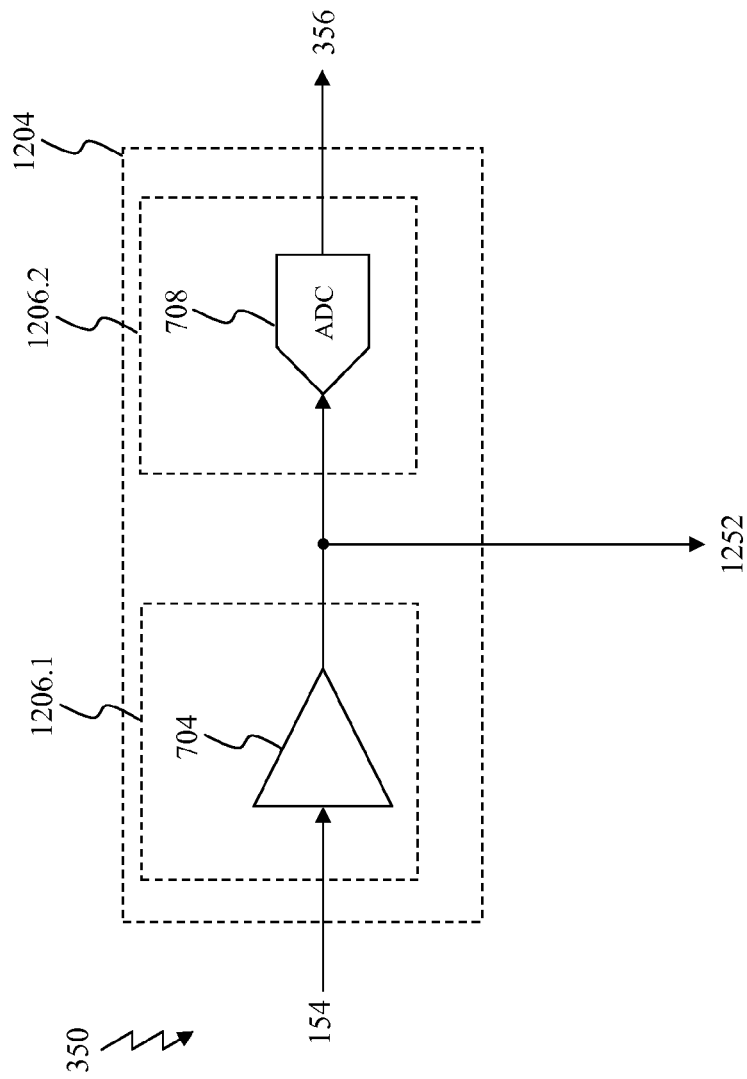
FIG. 12B illustrates a block diagram of a second configuration and arrangement of front end components that may be used in the seventh front end module according to an exemplary embodiment of the present invention.

FIG. 12B illustrates a block diagram of a second configuration and arrangement of front end components that may be used in the seventh front end module according to an exemplary embodiment of the present invention. An exemplary configuration and arrangement 1204 includes front end components 1206.1 and 1206.2. The exemplary configuration and arrangement 1204 may represent an exemplary embodiment of the front end processor 1102. As such, the front end components 1206.1 and 1206.2 may represent an exemplary configuration and arrangement of the front end components 1106.1 through 1106.*k*.

The first front end component 1206.1 includes the amplifier module 704 to amplify the received communications signal 154 and/or the unwanted interference 350 to provide the amplified communications signal 1252.

The second front end component 1206.2 includes the ADC 708 to convert the amplified communications signal 1252 from the analog representation to the digital representation to provide the observed sequence of data 356.

Figure 12C:
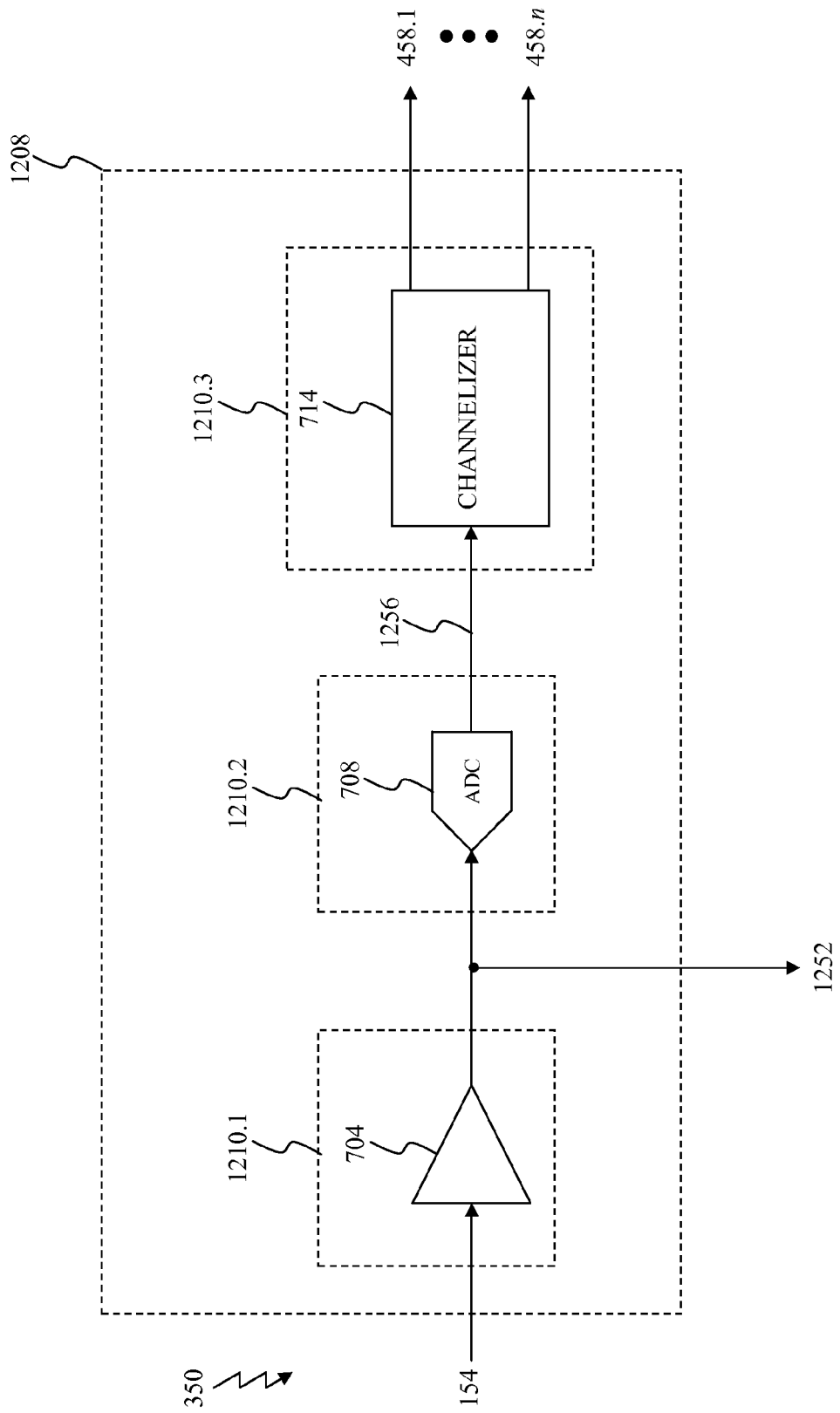
FIG. 12C illustrates a block diagram of a third configuration and arrangement of front end components that may be used in the seventh front end module according to an exemplary embodiment of the present invention.

FIG. 12C illustrates a block diagram of a third configuration and arrangement of front end components that may be used in the seventh front end module according to an exemplary embodiment of the present invention. An exemplary configuration and arrangement 1208 includes front end components 1210.1 through 1210.3. The exemplary configuration and arrangement 1208 may represent an exemplary embodiment of the front end processor 1102. As such, the front end components 1210.1 through 1210.3 may represent an exemplary configuration and arrangement of the front end components 1106.1 through 1106.*k*.

The first front end component 1210.1 includes the amplifier module 704 to amplify the received communications signal 154 and/or the unwanted interference 350 to provide the amplified communications signal 1252.

The second front end component 1210.2 includes the ADC 708 to convert the amplified communications signal 1252 from the analog representation to the digital representation to provide an estimate of residual noise 1256.

The third front end component 1210.3 includes the channelizer module 714 to separate the estimate of residual noise 1256 into the one or more sequences of data 458.1 through 458.*n*.

Although, the configuration and arrangement 1200, the exemplary configuration and arrangement 1204, and the exemplary configuration and arrangement 1208 have been described as being possible exemplary implementations of the front end processor 1102, those skilled in the relevant art(s) will recognize that these exemplary configurations and arrangements may also be used as possible exemplary implementations of the front end processor 304 without departing from the spirit and scope of the present invention.

Figure 13A:
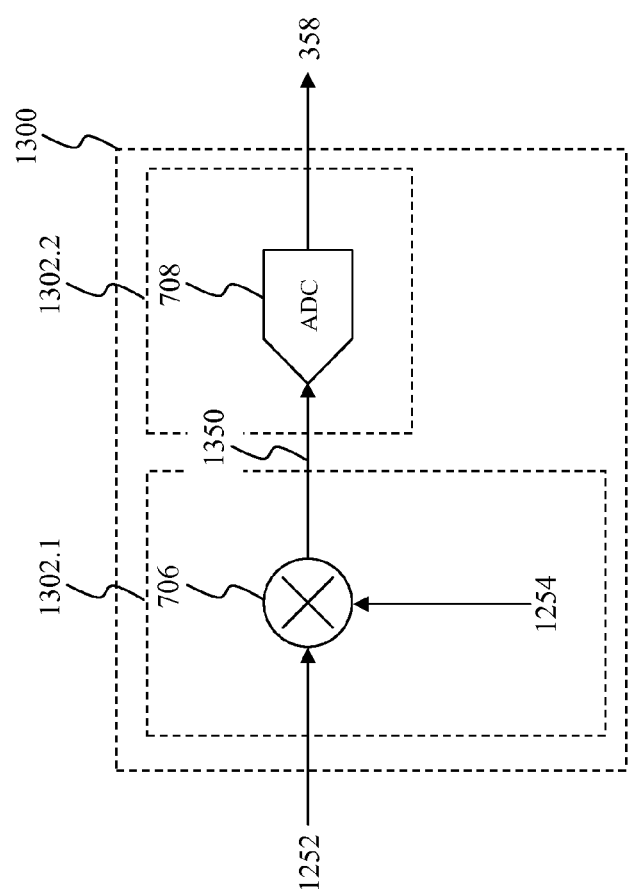
FIG. 13A illustrates a block diagram of a first configuration and arrangement of replica components that may be used in the seventh front end module according to an exemplary embodiment of the present invention.

Exemplary Configurations and Arrangements of Replica Components that May be Used in the Seventh Front End Module FIG. 13A illustrates a block diagram of a first configuration and arrangement of replica components that may be used in the seventh front end module according to an exemplary embodiment of the present invention. An exemplary configuration and arrangement 1300 includes replica components 1302.1 and 1302.2. The exemplary configuration and arrangement 1300 may represent an exemplary embodiment of the estimation module 1104.

The first replica component 1302.1 includes the mixer module 706 to frequency translate the amplified communications signal 1252 using the local oscillator signal 1254 to provide a translated communications signal 1350.

The second replica component 1302.2 includes the ADC 708 to convert the translated communications signal 1350 from the analog representation to the digital representation to provide the estimate of residual noise 358.

Figure 13B:
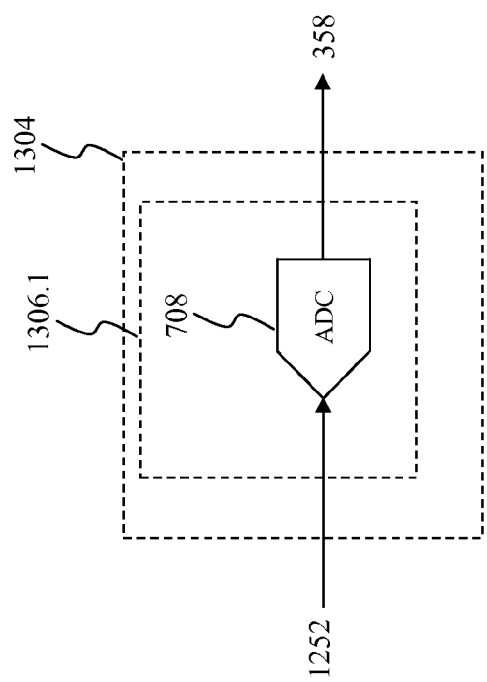
FIG. 13B illustrates a block diagram of a configuration and arrangement of replica components that may be used in the seventh front end module according to an exemplary embodiment of the present invention.

FIG. 13B illustrates a block diagram of a configuration and arrangement of replica components that may be used in the seventh front end module according to an exemplary embodiment of the present invention. An exemplary configuration and arrangement 1304 includes a replica component 1306.1. The exemplary configuration and arrangement 1304 may represent an exemplary embodiment of the estimation module 1104.

The first replica component 1306.1 includes the ADC 708 to convert the amplified communications signal 1252 from the analog representation to the digital representation to provide the estimate of residual noise 358.

Figure 13C:
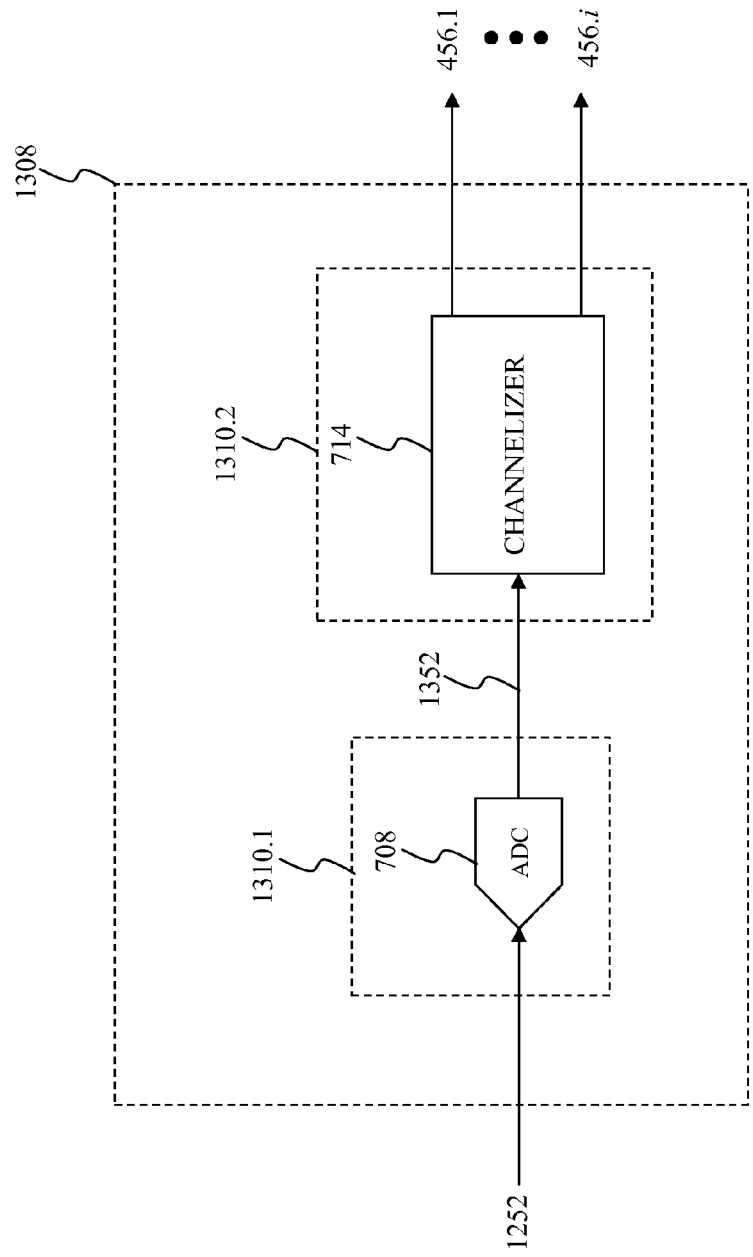
FIG. 13C illustrates a block diagram of a third configuration and arrangement of replica components that may be used in the seventh front end module according to an exemplary embodiment of the present invention.

FIG. 13C illustrates a block diagram of a third configuration and arrangement of replica components that may be used in the seventh front end module according to an exemplary embodiment of the present invention. An exemplary configuration and arrangement 1308 includes replica components 1310.1 and 1310.2. The exemplary configuration and arrangement 1308 may represent an exemplary embodiment of the estimation module 1104.

The first replica component 1310.1 includes the ADC 708 to convert the amplified communications signal 1252 from the analog representation to the digital representation to provide an observed sequence of data 1352.

The second replica component 1310.2 includes the channelizer module 714 to separate the observed sequence of data 1352 into the one or more estimates of residual noise 456.1 through 456.*i*.

Figure 13D:
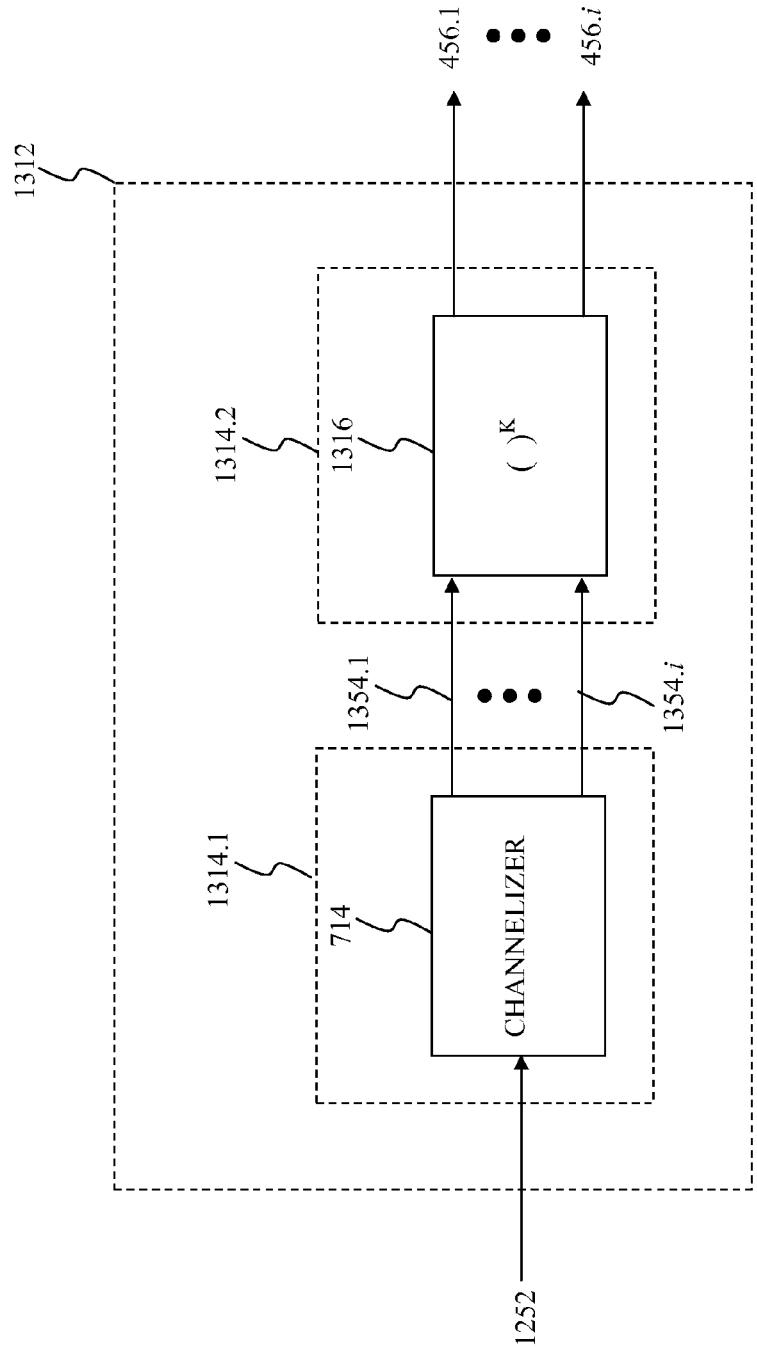
FIG. 13D illustrates a block diagram of a fourth configuration and arrangement of replica components that may be used in the seventh front end module according to an exemplary embodiment of the present invention.

FIG. 13D illustrates a block diagram of a fourth configuration and arrangement of replica components that may be used in the seventh front end module according to an exemplary embodiment of the present invention. An exemplary configuration and arrangement 1312 includes replica components 1314.1 and 1314.2. The exemplary configuration and arrangement 1312 may represent an exemplary embodiment of the estimation module 1104.

The first replica component 1314.1 includes the channelizer module 714 to separate the amplified communications signal 1252 into one or more amplified communications signals 1354.1 through 1354.*i*.

The second replica component 1314.1 includes a non-linearity module 1316 to raise the one or more amplified communications signals 1354.1 through 1354.*i* to a power of one or more integers K to provide the one or more estimates of residual noise 456.1 through 456.*i*. The one or more integers K may be substantially similar for at least two of the one or more amplified communications signals 1354.1 through 1354.*i*, may be dissimilar for at least two of the one or more amplified communications signals 1354.1 through 1354.*i*, or any combination thereof.

Figure 13E:
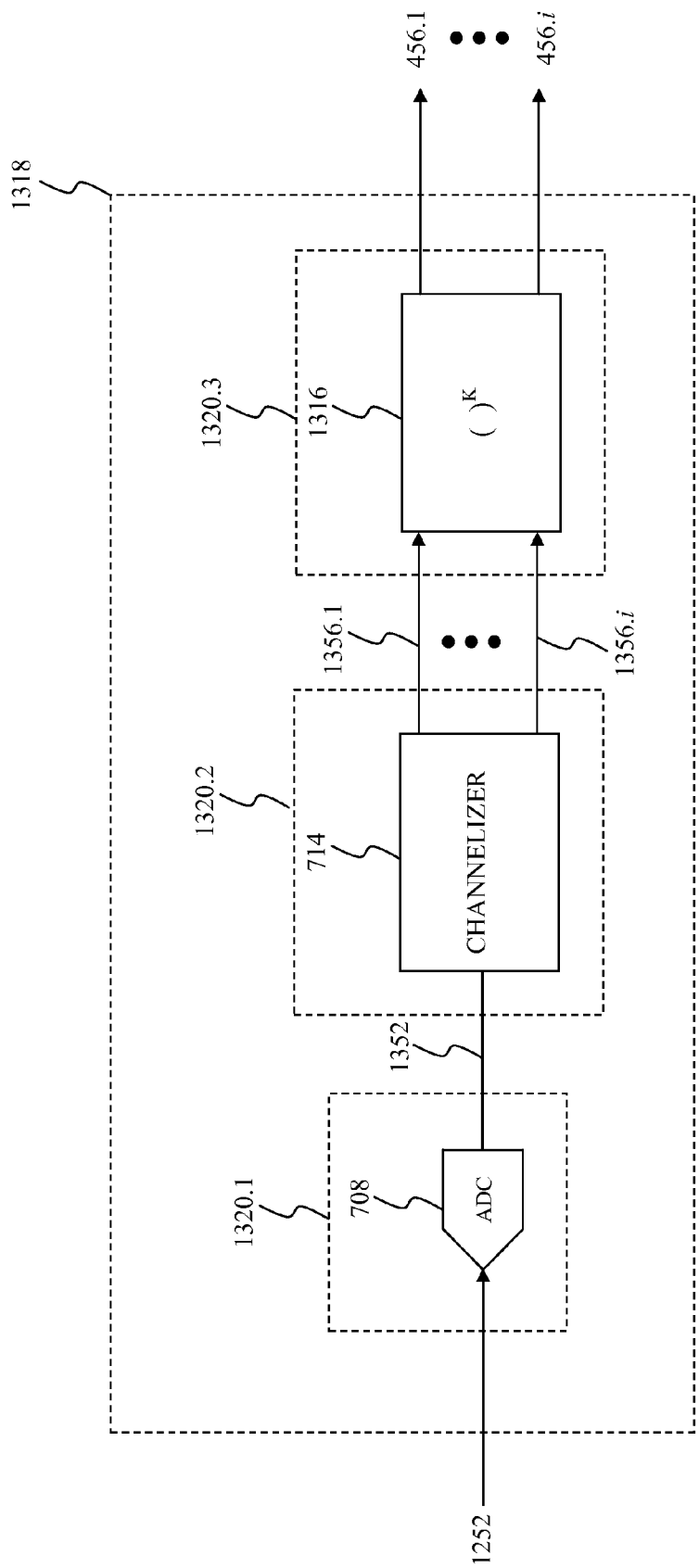
FIG. 13E illustrates a block diagram of a fifth configuration and arrangement of replica components that may be used in the seventh front end module according to an exemplary embodiment of the present invention.

FIG. 13E illustrates a block diagram of a fifth configuration and arrangement of replica components that may be used in the seventh front end module according to an exemplary embodiment of the present invention. An exemplary configuration and arrangement 1318 includes replica components 1320.1 and 1320.2. The exemplary configuration and arrangement 1318 may represent an exemplary embodiment of the estimation module 1104.

The first replica component 1320.1 includes the ADC 708 to convert the amplified communications signal 1252 from the analog representation to the digital representation to provide the observed sequence of data 1352.

The second replica component 1320.2 includes the channelizer module 714 to separate the observed sequence of data 1352 into the one or more observed sequences of data 1356.1 through 1356.*i*.

The third replica component 1320.3 includes the non-linearity module 1316 to raise the observed sequences of data 1356.1 through 1356.*i* to the power of the one or more integers K to provide the one or more estimates of residual noise 456.1 through 456.*i*.

Figure 13F:
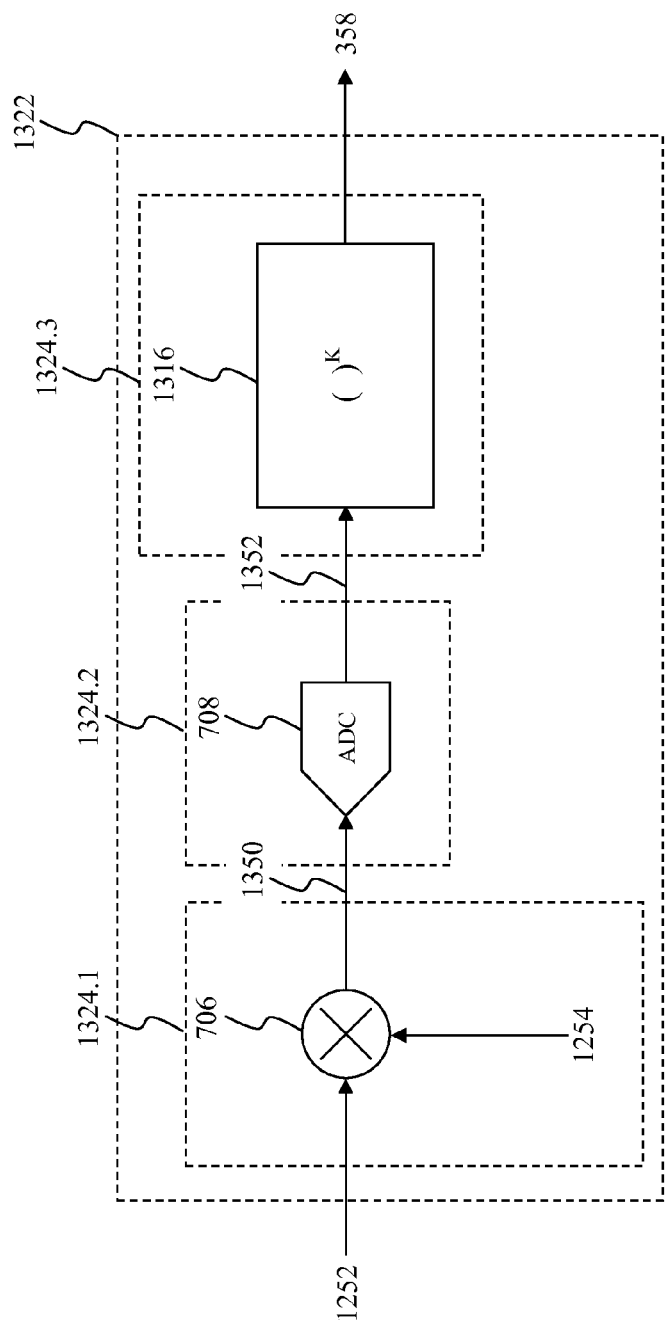
FIG. 13F illustrates a block diagram of a sixth configuration and arrangement of replica components that may be used in the seventh front end module according to an exemplary embodiment of the present invention.

FIG. 13F illustrates a block diagram of a sixth configuration and arrangement of replica components that may be used in the seventh front end module according to an exemplary embodiment of the present invention. An exemplary configuration and arrangement 1322 includes replica components 1324.1 and 1324.2. The exemplary configuration and arrangement 1322 may represent an exemplary embodiment of the estimation module 1104.

The first replica component 1324.1 includes the mixer module 706 to frequency translate the amplified communications signal 1252 using the local oscillator signal 1254 to provide the translated communications signal 1350.

The second replica component 1324.2 includes the ADC 708 to convert the translated communications signal 1350 from the analog representation to the digital representation to provide the observed sequence of data 1352.

The third replica component 1324.1 includes the non-linearity module 1316 to raise the observed sequence of data 1352 to the power of the one or more integers K to provide the estimate of residual noise 358.

Although, the configuration and arrangement 1300, the exemplary configuration and arrangement 1304, the exemplary configuration and arrangement 1308, the exemplary configuration and arrangement 1318, and the exemplary configuration and arrangement 1322 have been described as being possible exemplary implementations of the estimation module 1104, those skilled in the relevant art(s) will recognize that these exemplary configurations and arrangements may also be used as possible exemplary implementations of the estimation module 304 without departing from the spirit and scope of the present invention.

Figure 14A:
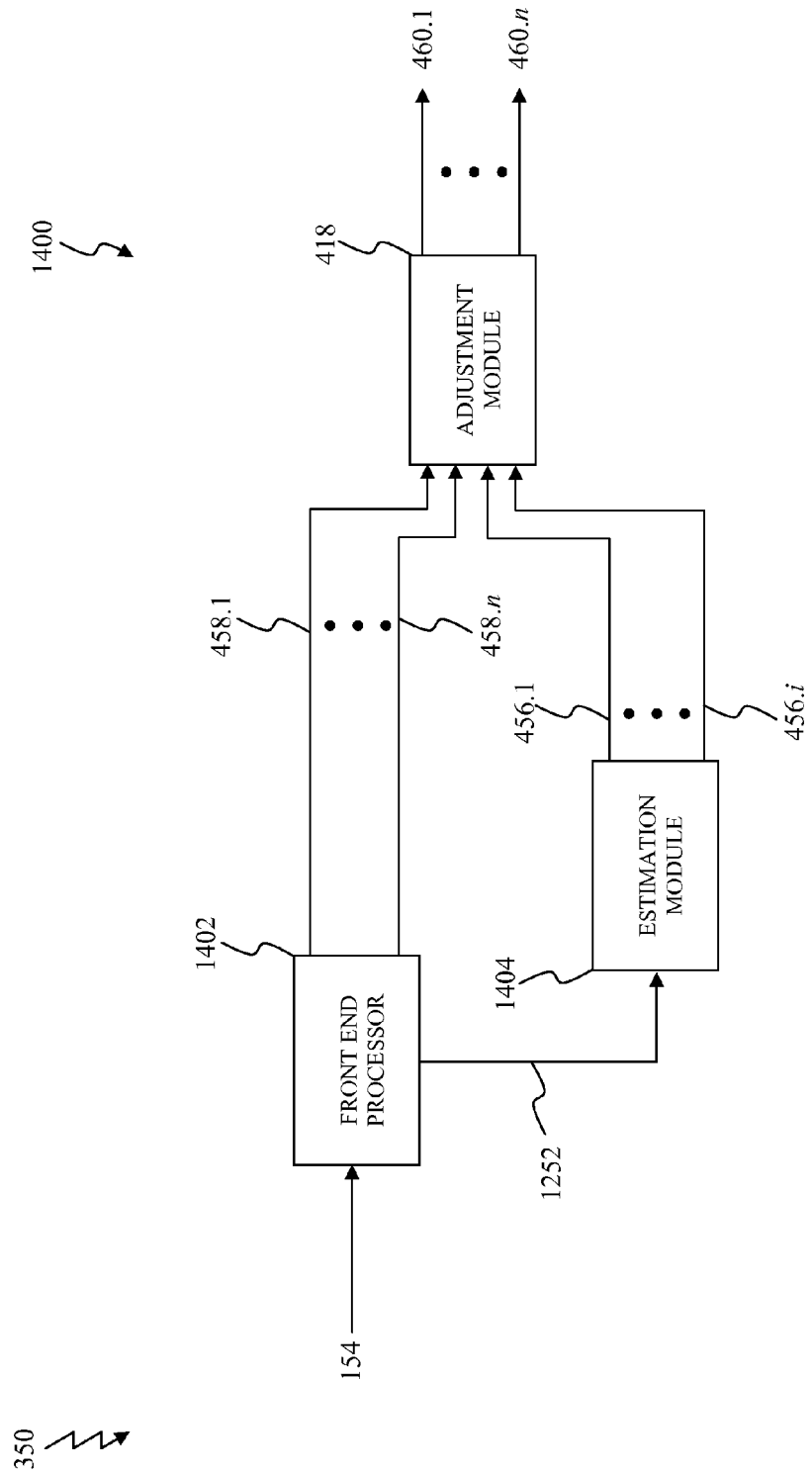
FIG. 14A illustrates a block diagram of an eighth front end module that may be implemented as part of the communications receiver according to an exemplary embodiment of the present invention.

Eighth Exemplary Embodiment of the Front End Module that May be Implemented as Part of the Communication Receiver FIG. 14A illustrates a block diagram of an eighth front end module that may be implemented as part of the communications receiver according to an exemplary embodiment of the present invention. A front end module 1400 includes the adjustment module 418, a front end processor 1402, and an estimation module 1404. The front end module 1400 may represent an exemplary embodiment of the front end module 1100.

The front end processor 1402 processes the received communications signal 154 and/or the unwanted interference 350 to provide the observed sequences of data 458.1 through 458.*n*. The front end processor 1402 may be implemented using the configuration and arrangement 1208.

The estimation module 1404 processes the amplified communications signal 1252 to provide the estimates of residual noise 456.1 through 456.*i*. The estimation module 1404 estimates the unwanted interference 350 and/or the unwanted distortion remaining within the observed sequences of data 458.1 through 458.*n* based upon the amplified communications signal 1252. The estimation module 1404 may be implemented using the configuration and arrangement 1308, the configuration and arrangement 1312, and/or the configuration and arrangement 1318.

The adjustment module 418 substantially removes the estimates of residual noise 456.1 through 456.*i* from the observed sequences of data 458.1 through 458.*n* to provide the digital sequences of data 460.1 through 460.*n*.

Figure 14B:
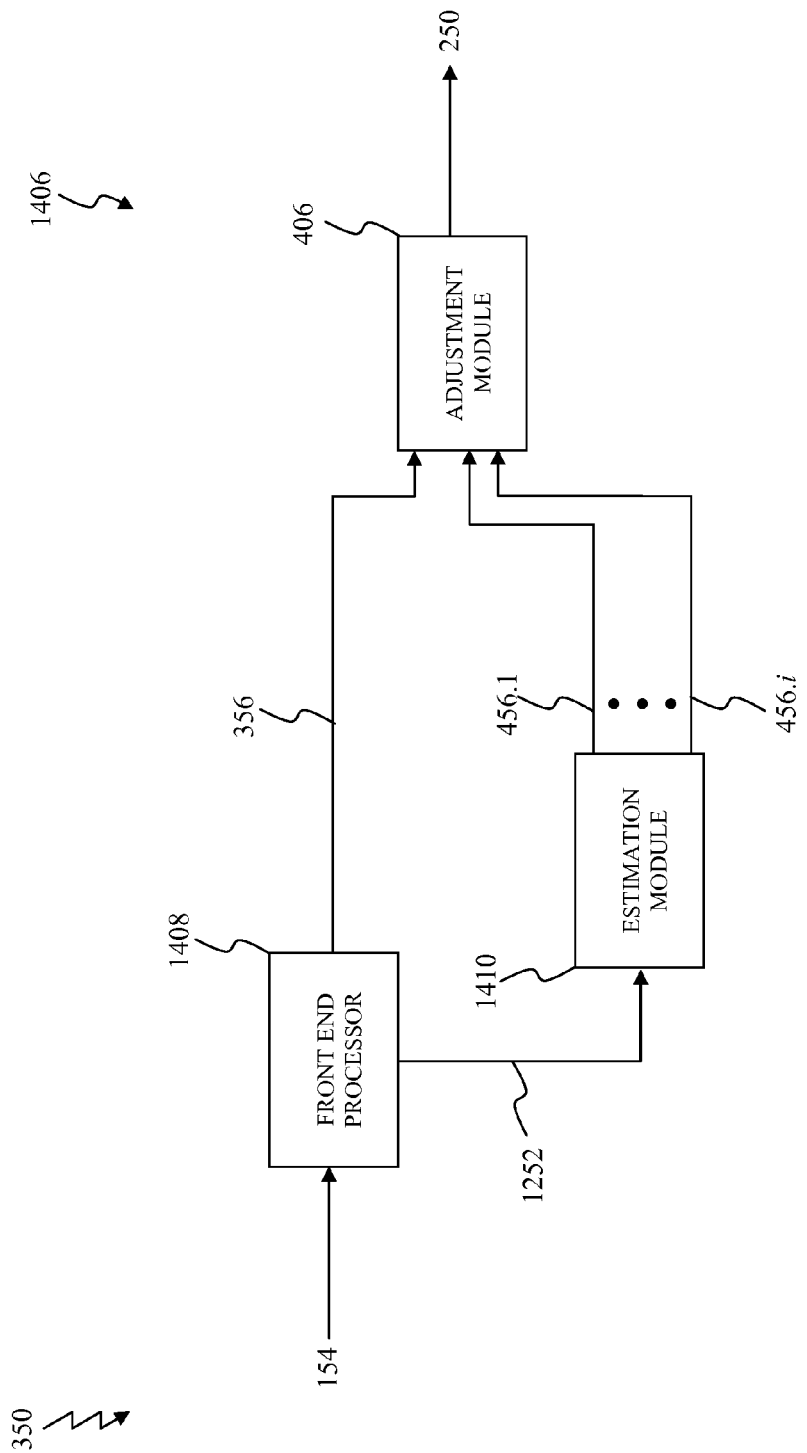
FIG. 14B illustrates a block diagram of a ninth front end module that may be implemented as part of the communications receiver according to an exemplary embodiment of the present invention.

Ninth Exemplary Embodiment of the Front End Module that May be Implemented as Part of the Communication Receiver FIG. 14B illustrates a block diagram of a ninth front end module that may be implemented as part of the communications receiver according to an exemplary embodiment of the present invention. A front end module 1406 includes the adjustment module 406, a front end processor 1408, and an estimation module 1410. The front end module 1406 may represent an exemplary embodiment of the front end module 1100.

The front end processor 1408 processes the received communications signal 154 and/or the unwanted interference 350 to provide the observed sequence of data 356. The front end processor 1408 may be implemented using the configuration and arrangement 1200 and/or the configuration and arrangement 1204.

The estimation module 1410 processes the amplified communications signal 1252 to provide the estimates of residual noise 456.1 through 456.*i*. The estimation module 1410 estimates the unwanted interference 350 and/or the unwanted distortion remaining within the observed sequences of data 458.1 through 458.n based upon the amplified communications signal 1252. The estimation module 1410 may be implemented using the configuration and arrangement 1308, the configuration and arrangement 1312 and/or the configuration and arrangement 1318.

The adjustment module 406 substantially removes the estimates of residual noise 456.1 through 456.i from the observed sequence of data 356 to provide the digital sequence of data 250. Those skilled in the relevant art(s) will recognize that the front end module 1406 may be similarly implemented using the adjustment module 412 and the adjustment module 414 without departing from the spirit and scope of the present invention.

Figure 14C:
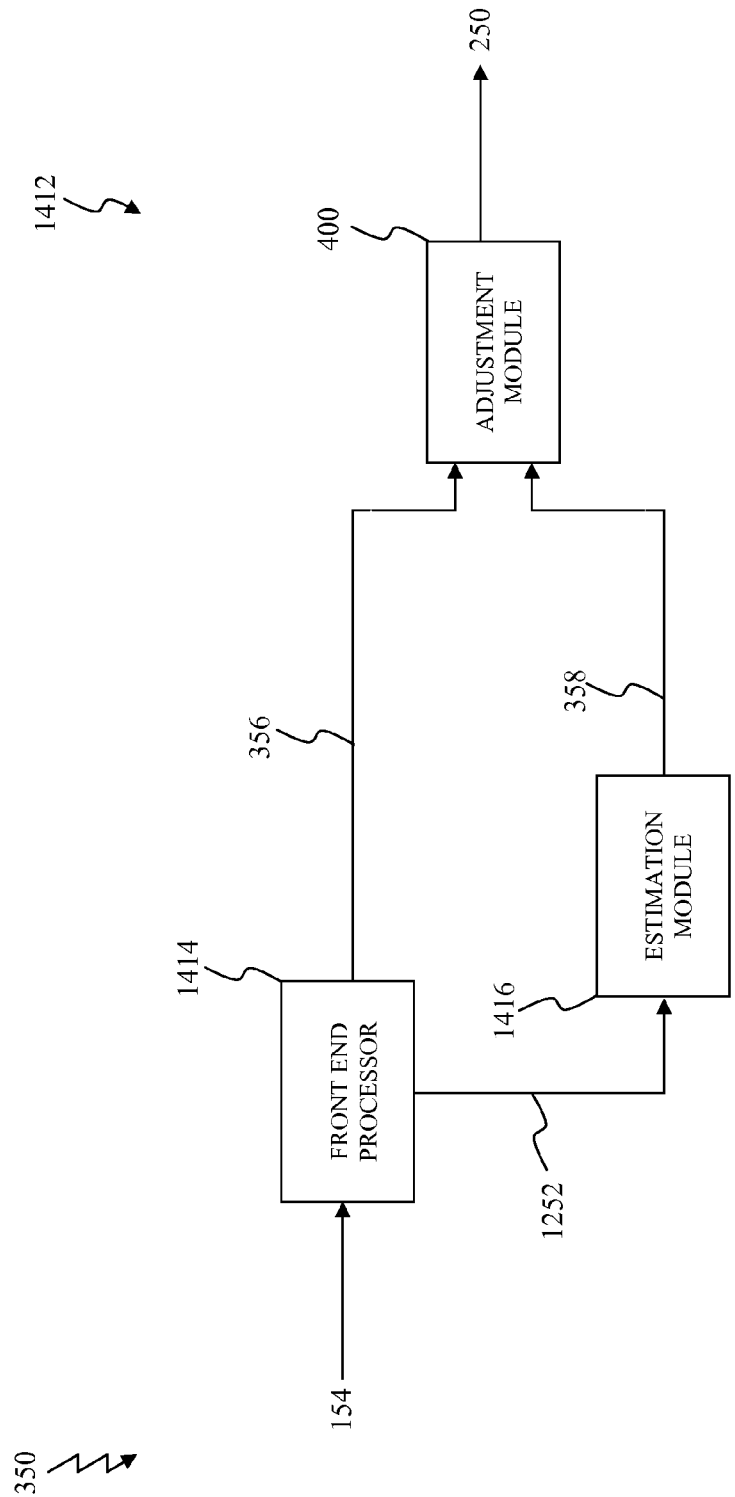
FIG. 14C illustrates a block diagram of a tenth front end module that may be implemented as part of the communications receiver according to an exemplary embodiment of the present invention.

Tenth Exemplary Embodiment of the Front End Module that May be Implemented as Part of the Communication Receiver FIG. 14C illustrates a block diagram of a tenth front end module that may be implemented as part of the communications receiver according to an exemplary embodiment of the present invention. A front end module 1412 includes the adjustment module 400, a front end processor 1414, and an estimation module 1416. The front end module 1412 may represent an exemplary embodiment of the front end module 1100.

The front end processor 1414 processes the received communications signal 154 and/or the unwanted interference 350 to provide the observed sequence of data 356. The front end processor 1414 may be implemented using the configuration and arrangement 1200 and/or the configuration and arrangement 1204.

The estimation module 1416 processes the amplified communications signal 1252 to provide the estimate of residual noise 358. The estimation module 1416 estimates the unwanted interference 350 and/or the unwanted distortion remaining within the observed sequences of data 356 based upon the amplified communications signal 1252. The estimation module 1416 module may be implemented using the configuration and arrangement 1300, the configuration and arrangement 1304 and/or the configuration and arrangement 1322.

The adjustment module 400 substantially removes the estimate of residual noise 358 from the observed sequence of data 356 to provide the digital sequence of data 250.

Other Exemplary Embodiments of the Front End Module that May be Implemented as Part of the Communication Receiver Other exemplary embodiments of the front end module 300 and/or the front end module 1100 are to be discussed in further detail below. These other exemplary embodiments demonstrate exemplary configurations and arrangements of the front end module 300 and/or the front end module 1100 that may be used to compensate for exemplary types of unwanted electromagnetic radiation and/or unwanted distortion. However, the embodiments to be discussed in further detail below are not limiting, other embodiments are possible that will be apparent to those skilled in the relevant art(s) without departing from the spirit and scope of the present invention.

Figure 15:
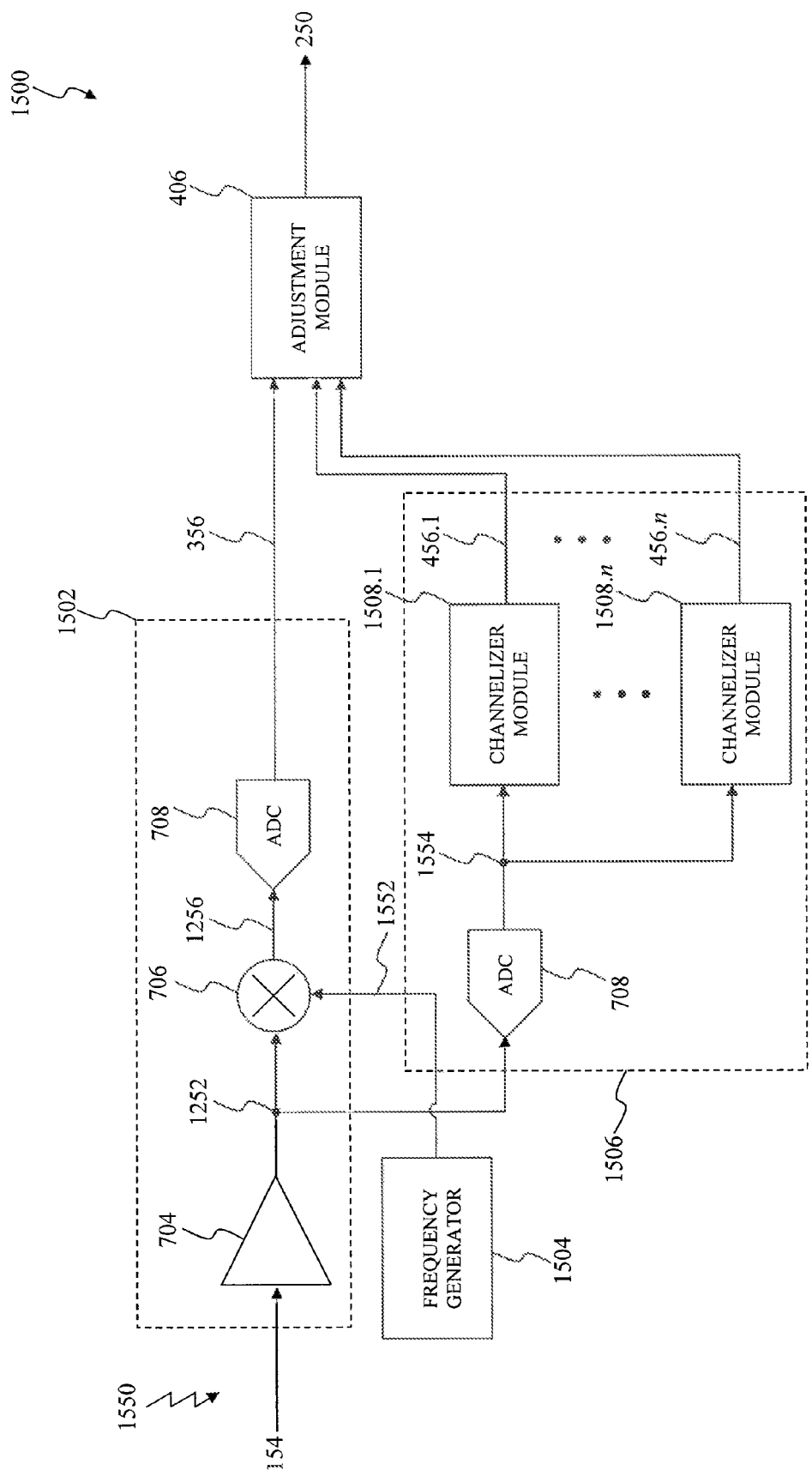
FIG. 15 illustrates a block diagram of an eleventh front end module that may be implemented as part of the communications receiver according to an exemplary embodiment of the present invention.

Eleventh Exemplary Embodiment of the Front End Module that May be Implemented as Part of the Communication Receiver FIG. 15 illustrates a block diagram of an eleventh front end module that may be implemented as part of the communications receiver according to an exemplary embodiment of the present invention. A frequency generator, such as a local oscillator to provide an example, may generate unwanted electromagnetic radiation 1550 that may be imposed onto signals within a front end module 1500. The unwanted interference 1550 may represent an exemplary embodiment of the unwanted interference 350. Additionally, the unwanted interference 1550 may also cause the front end module 1500 to introduce unwanted distortion by unintentionally altering or distorting these signals. The front end module 1500 includes the adjustment module 406, a front end processor 1502, and an estimation module 1506. The front end module 1500 may represent an exemplary embodiment of the front end module 1100.

The front end processor 1502 processes the received communications signal 154 and/or the unwanted interference 1550 to provide the observed sequence of data 356. The front end processor 1502 includes the amplifier module 704, the mixer module 706, and the ADC 708. The amplifier module 704 amplifies the received communications signal 154 and/cm the unwanted interference 1550 to provide the amplified communications signal 1252. The mixer module 706 frequency translates the amplified communications signal 1252 using a local oscillator signal 1552 to provide the translated communications signal 1256. The ADC 708 converts the translated communications signal 1256 from the analog representation to the digital representation to provide the observed sequence of data 356.

The frequency generator 1504 generates the unwanted interference 1550 and/or the local oscillator signal 1552. The unwanted interference 1550 may radiate from the frequency generator 1504 and/or be imposed onto the local oscillator signal 1552. Additionally, the unwanted interference 1550 may also cause the amplifier module 704, the mixer module 706, and/or the ADC 708 to introduce unwanted distortion by unintentionally altering or distorting the amplified communications signal 1252, the translated communications signal 1256, and the observed sequence of data 356, respectively. For example, the unwanted interference 1550 may cause the amplifier module 704, the mixer module 706, and/or the ADC 708 to introduce linear distortion such as amplitude, phase, and/or group delay, and/or nonlinear distortion, including harmonic distortion and inter-modulation distortion, into the amplified communications signal 1252, the translated communications signal 1256, and the observed sequence of data 356, respectively The estimation module 1506 generates the estimates of residual noise 456.1 through 456.i that correspond to the unwanted interference 1550 and/or the unwanted distortion remaining within the observed sequence of data 356. The estimation module 1506 includes the ADC 708 and channelizer modules 1508.1 through 1508.n. The ADC 708 converts the amplified communications signal 1252 from the analog representation to the digital representation to provide a sequence of data 1554. The channelizer modules 1508.1 through 1508.n separate the sequence of data 1554 into the estimates of residual noise 456.1 through 456.i. Each of the channelizer modules 1508.1 through 1508.n may be implemented in a substantially similar manner as the channelizer module 714.

The adjustment module 406 substantially removes the estimates of residual noise 456.1 through 456.i from the observed sequence of data 356 to provide the digital sequence of data 250. Those skilled in the relevant art(s) will recognize that the front end module 1406 may be similarly implemented using the adjustment module 412 and the adjustment module 414 without departing from the spirit and scope of the present invention.

Figure 16:
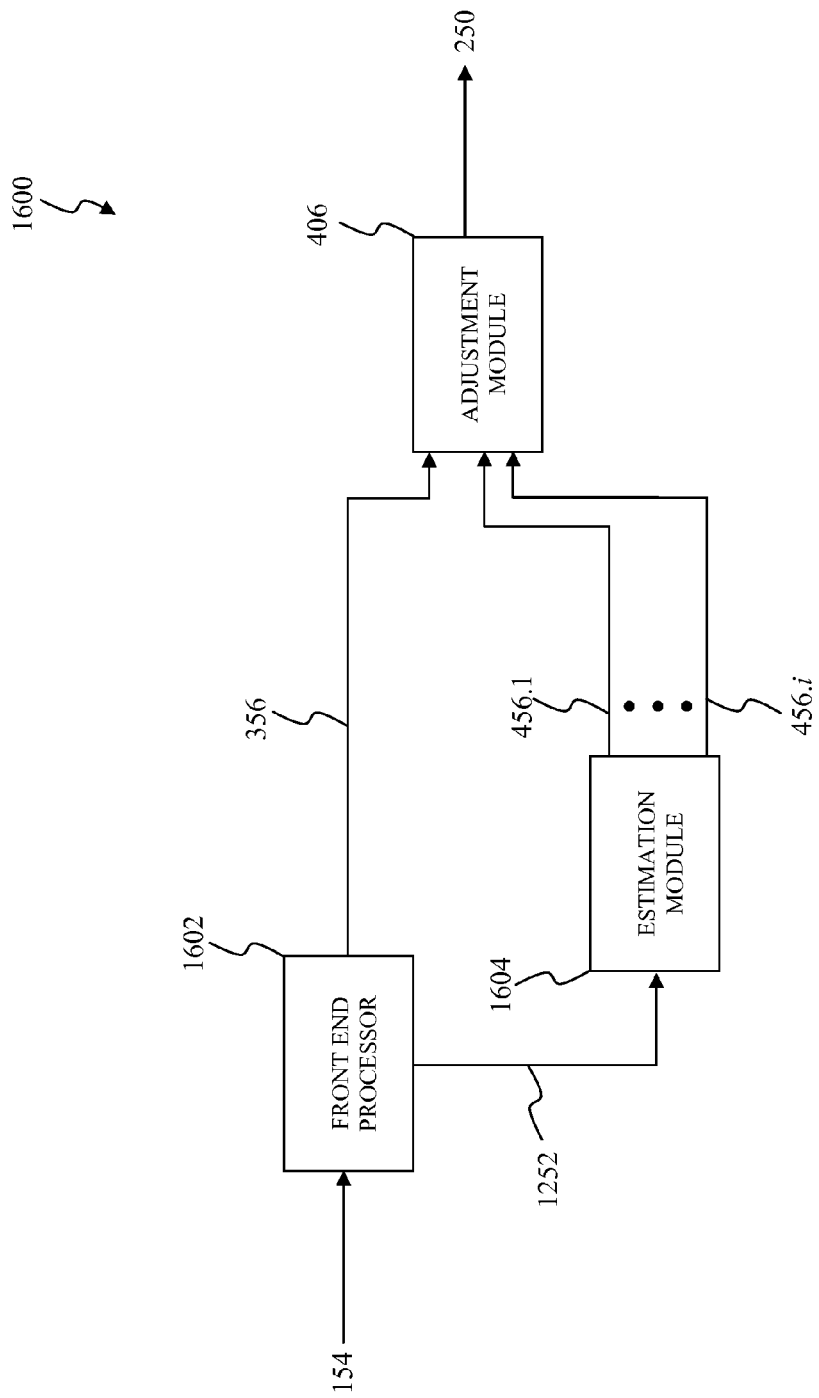
FIG. 16 illustrates a block diagram of a twelfth front end module that may be implemented as part of the communications receiver according to an exemplary embodiment of the present invention.

Twelfth Exemplary Embodiment of the Front End Module that May be Implemented as Part of the Communication Receiver FIG. 16 illustrates a block diagram of a twelfth front end module that may be implemented as part of the communications receiver according to an exemplary embodiment of the present invention. The received communications signal 154 may include one or more desired communications signals and one or more undesired communications signals. For example, the one or more desired communications signals may correspond to one or more channels in a cable television signal. In this example, the one or more undesired communications signals may represent one or more other channels in the cable television signal and/or other communications signals relating to other services such as data services to provide an example. A front end module 1600 may introduce unwanted distortion its signal by frequency translating and/or aliasing the one or more undesired communications signals onto the one or more desired communications signals. The front end module 1600 includes the adjustment module 406, a front end processor 1602, and an estimation module 1604. The front end module 1600 may represent an exemplary embodiment of the front end module 1100.

The front end processor 1602 processes the received communications signal 154 to provide the observed sequence of data 356. The front end processor 1602 may be implemented using the configuration and arrangement 1200 and/or the configuration and arrangement 1204. The front end processor 1602 may unintentionally frequency translate and/or alias the one or more undesired communications signals onto the one or more desired communications signals.

The estimation module 1604 processes the amplified communications signal 1252 to provide the estimates of residual noise 456.1 through 456.i. The estimation module 1604 estimates the unwanted interference 350 and/or the unwanted distortion remaining within the observed sequences of data 458.1 through 458.n based upon the amplified communications signal 1252. The estimation module 1604 may be implemented using the configuration and arrangement 1308, the configuration and arrangement 1312 and/or the configuration and arrangement 1318.

The adjustment module 406 substantially removes the estimates of residual noise 456.1 through 456.i from the observed sequence of data 356 to provide the digital sequence of data 250. Those skilled in the relevant art(s) will recognize that the front end module 1406 may be similarly implemented using the adjustment module 412 and the adjustment module 414 without departing from the spirit and scope of the present invention.

Figure 17:
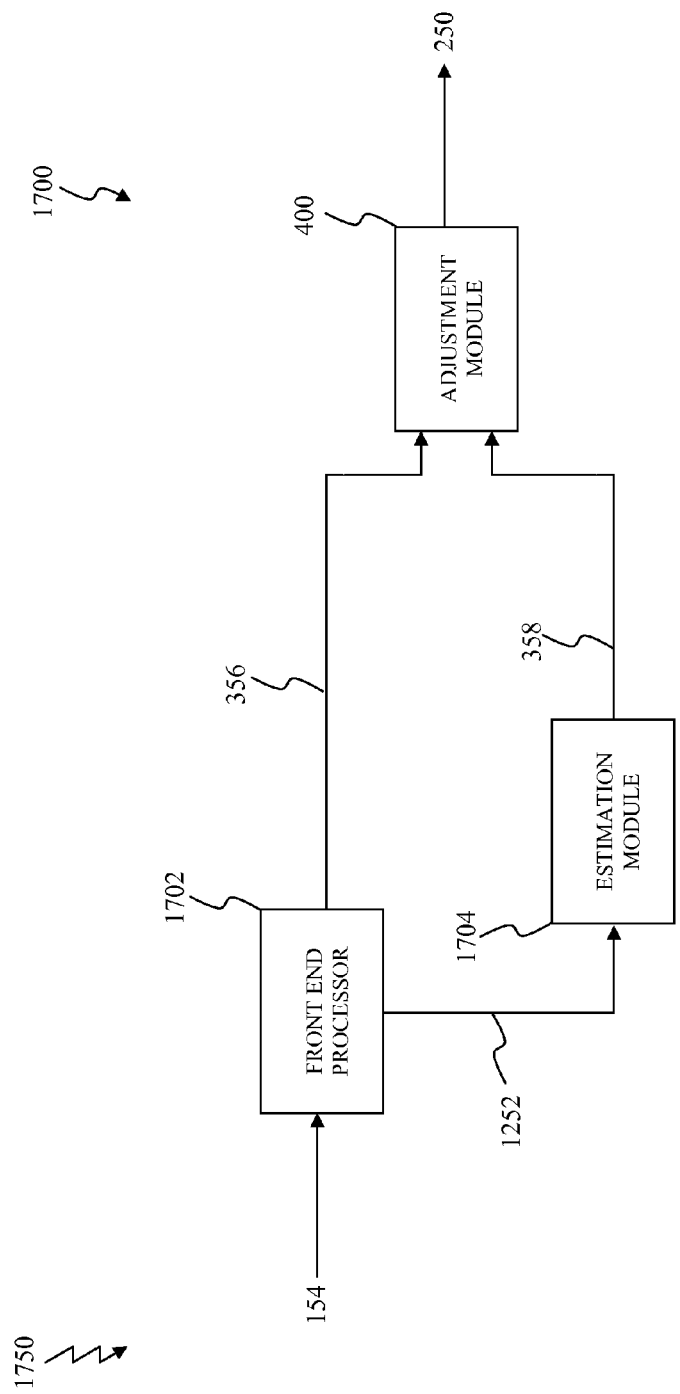
FIG. 17 illustrates a block diagram of a thirteenth front end module that may be implemented as part of the communications receiver according to an exemplary embodiment of the present invention.

Thirteenth Exemplary Embodiment of the Front End Module that May be Implemented as Part of the Communication Receiver FIG. 17 illustrates a block diagram of a thirteenth front end module that may be implemented as part of the communications receiver according to an exemplary embodiment of the present invention. Another communications device that is sufficiently proximate to a front end module 1700 may generate unwanted interference 1750 by transmitting its own communications signal. The unwanted interference 1750 may be characterized as being much larger than the received communications signal 154 and/or as occupying a frequency spectrum that is greater than a frequency spectrum that is occupied by the received communications signal 154, commonly referred to as out-of-band. The front end module 1700 may alias or fold the unwanted interference 1750 onto its signals. The front end module 1700 includes the adjustment module 400, a front end processor 1702, and an estimation module 1704. The front end module 1700 may represent an exemplary embodiment of the front end module 1100.

The front end processor 1702 processes the received communications signal 154 and/or the unwanted interference 1750 to provide the observed sequence of data 356. The front end processor 1702 may be implemented using the configuration and arrangement 1200 and/or the configuration and arrangement 1204.

The estimation module 1704 processes the amplified communications signal 1252 to provide the estimate of residual noise 358. The estimation module 1704 estimates the unwanted interference 1750 and/or the unwanted distortion remaining within the observed sequences of data 458.1 through 458.n based upon the amplified communications signal 1252. The estimation module 1704 module may be implemented using the configuration and arrangement 1300, the configuration and arrangement 1304 and/or the configuration and arrangement 1322.

The adjustment module 400 substantially removes the estimate of residual noise 358 from the observed sequence of data 356 to provide the digital sequence of data 250.

Figure 18:
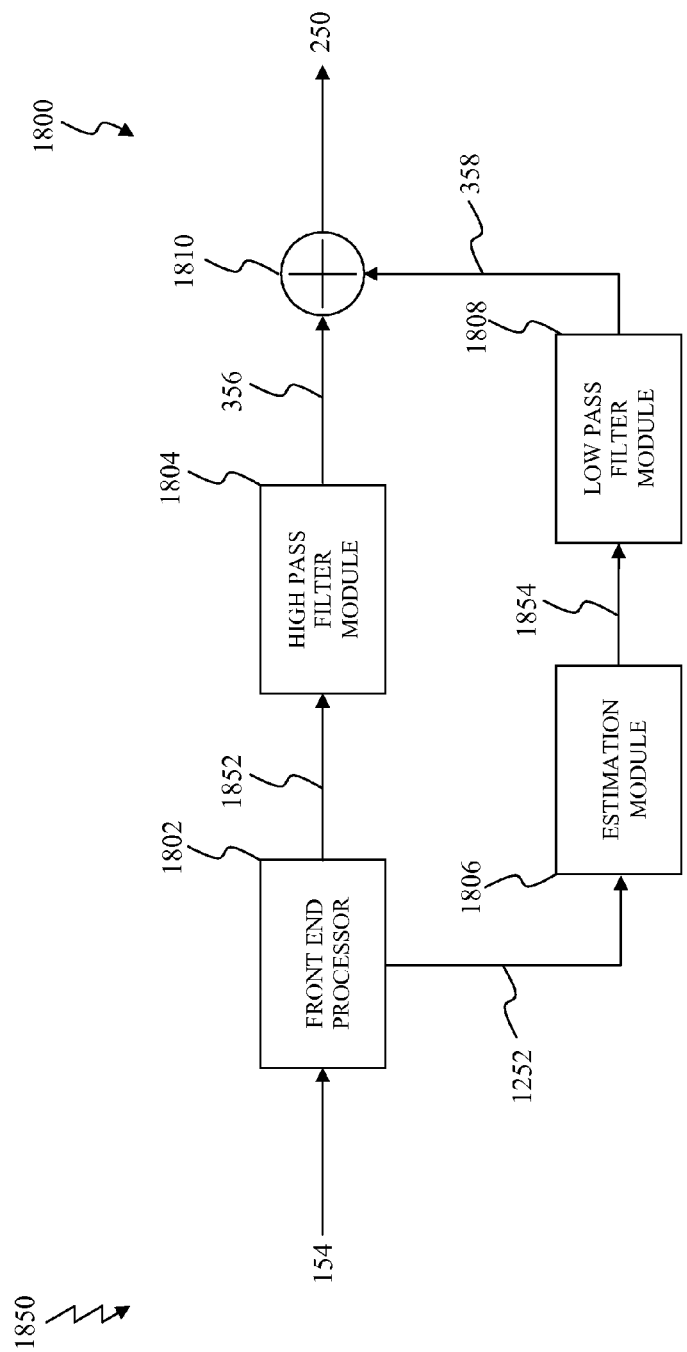
FIG. 18 illustrates a block diagram of a fourteenth front end module that may be implemented as part of the communications receiver according to an exemplary embodiment of the present invention.

Fourteenth Exemplary Embodiment of the Front End Module that May be Implemented as Part of the Communication Receiver FIG. 18 illustrates a block diagram of a fourteenth front end module that may be implemented as part of the communications receiver according to an exemplary embodiment of the present invention. Flicker noise, commonly referred to as 1/f noise, may represent a type of electronic noise that is characterized by a frequency spectrum that is inversely proportional to its frequency. A communications channel, such as the communications channel 104, may impose unwanted interference 1850 in the form of flicker noise onto the received communications signal 154. Additionally, a front end module 1800 may introduce the unwanted interference 1850 onto its signals as it is processing the received communications signal 154. A front end module 1800 includes a front end processor 1802, a high pass filter module 1804, an estimation module 1806, a low pass filter module 1808, and an adjustment module 1810 The front end module 1800 may represent an exemplary embodiment of the front end module 1100.

The front end processor 1802 processes the received communications signal 154 and/or the unwanted interference 350 to provide an observed sequence of data 1852. The front end processor 1802 may be implemented using the configuration and arrangement 1200 and/or the configuration and arrangement 1204.

The high pass filter module 1804 filters the observed sequence of data 1852 to provide the observed sequence of data 356. In particular, the high pass filter module 1804 passes those components of the observed sequence of data 1852 that are greater than a high pass cut off frequency and attenuates those components of the observed sequence of data 1852 that are less than the high pass cut off frequency. Typically, the unwanted interference 1850 may be characterized as being negligible at frequencies greater than or approximately equal to the high pass cut off frequency.

The estimation module 1806 processes the amplified communications signal 1252 to provide an estimate of residual noise 1854. The estimation module 1806 estimates the unwanted interference 1850 remaining within the observed sequence of data 1852 based upon the amplified communications signal 1252. The estimation module 1416 module may be implemented using the configuration and arrangement 1300, the configuration and arrangement 1304 and/or the configuration and arrangement 1322.

The low pass filter module 1808 filters the estimate of residual noise 1854 to provide the estimate of residual noise 358. In particular, the low pass filter module 1808 passes those components of the estimate of residual noise 1854 that are less than a low pass cut off frequency and attenuates those components of the estimate of residual noise 1854 that are greater than the low pass cut off frequency. In an exemplary embodiment, the low pass cut off frequency is approximately equal to the high pass cut off frequency. In this exemplary embodiment, those components of the estimate of residual noise 1854 that are less than the low pass cut off frequency may be characterized as having lesser flicker noise when compared to those components of the observed sequence of data 1852 that are less than the high pass cut off frequency.

The adjustment module 1810 combines the estimate of residual noise 358 and the observed sequence of data 356 to provide the digital sequence of data 250.

Figure 19:
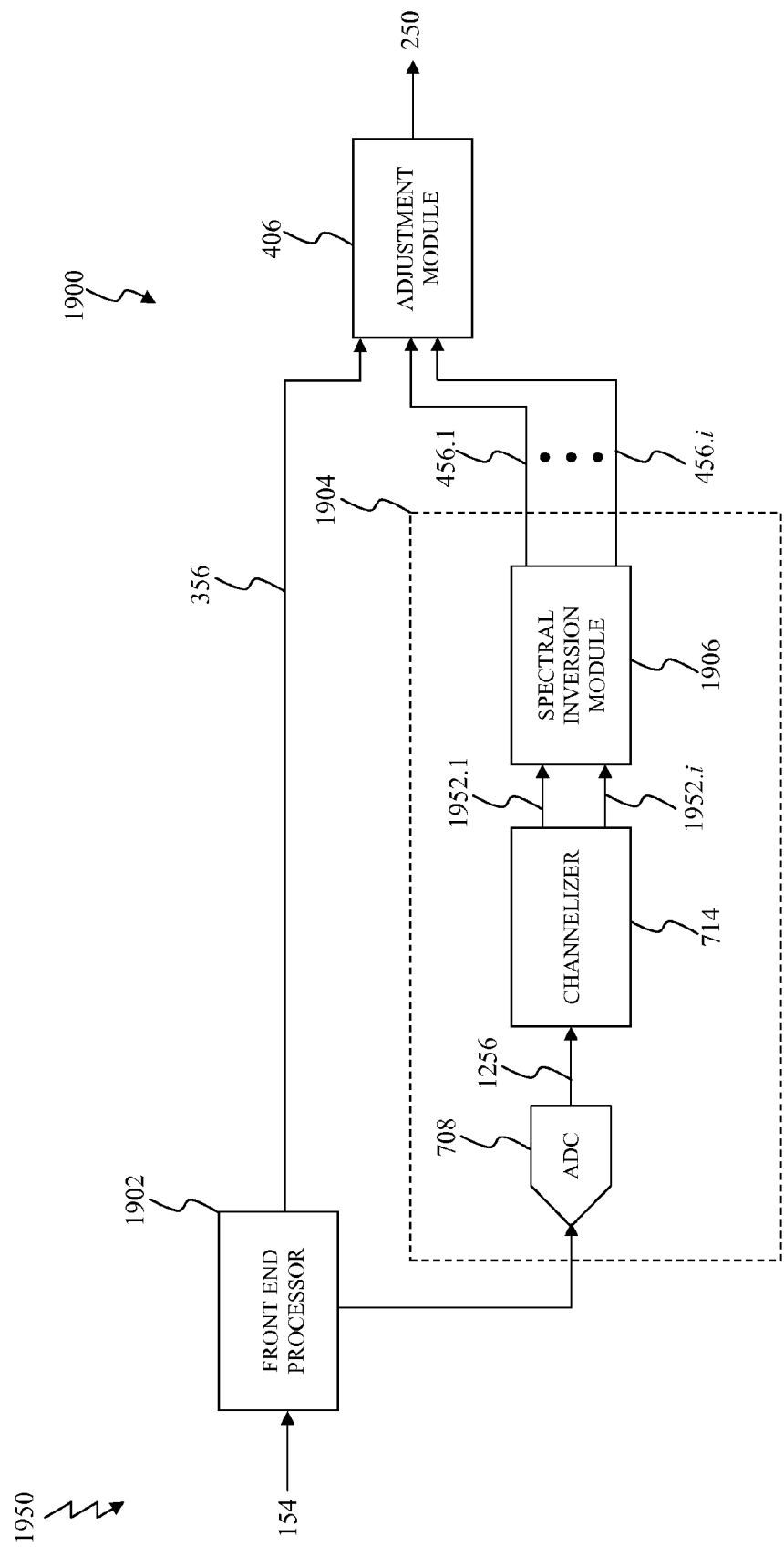
FIG. 19 illustrates a block diagram of a fifteenth front end module that may be implemented as part of the communications receiver according to an exemplary embodiment of the present invention.

Fifteenth Exemplary Embodiment of the Front End Module that May be Implemented as Part of the Communication Receiver FIG. 19 illustrates a block diagram of a fifteenth front end module that may be implemented as part of the communications receiver according to an exemplary embodiment of the present invention. The received communications signal 154 may include one or more desired communications signals. Imperfections within a communications transmitter, such as the communications transmitter 102 to provide an example, may impose unwanted interference 1950 in the form of one or more unwanted images of the one or more desired communications signals onto the transmitted communications signal 152. The unwanted interference 1950 may cause the front end module 1900 to introduce unwanted distortion onto its signals by unintentionally altering or distorting its signals during processing of the received communications signal 154. The front end module 1900 includes the adjustment module 406, a front end processor 1902, and an estimation module 1904. The front end module 1900 may represent an exemplary embodiment of the front end module 1100.

The front end processor 1902 processes the received communications signal 154 and/or the unwanted interference 350 to provide the observed sequence of data 356. The front end processor 1902 may be implemented using the configuration and arrangement 1200 and/or the configuration and arrangement 1204.

The estimation module 1904 processes the amplified communications signal 1252 to provide the estimates of residual noise 456.1 through 456.$i$. The estimation module 1904 includes the ADC 708, the channelizer module 714, and a spectral inversion module 1906.

The ADC 708 converts the amplified communications signal 1252 from the analog representation to the digital representation to provide the estimate of residual noise 1256.

The channelizer module 714 separates the estimate of residual noise 1256 into estimates of residual noise 1952.1 through 1952.$i$.

The spectral inversion module 1906 inverts the estimates of residual noise 1952.1 through 1952.$i$ to provide the estimates of residual noise 456.1 through 456.$i$.

The adjustment module 406 substantially removes the estimates of residual noise 456.1 through 456.$i$ from the observed sequence of data 356 to provide the digital sequence of data 250. Those skilled in the relevant art(s) will recognize that the front end module 1406 may be similarly implemented using the adjustment module 412 and the adjustment module 414 without departing from the spirit and scope of the present invention.

Figure 20:
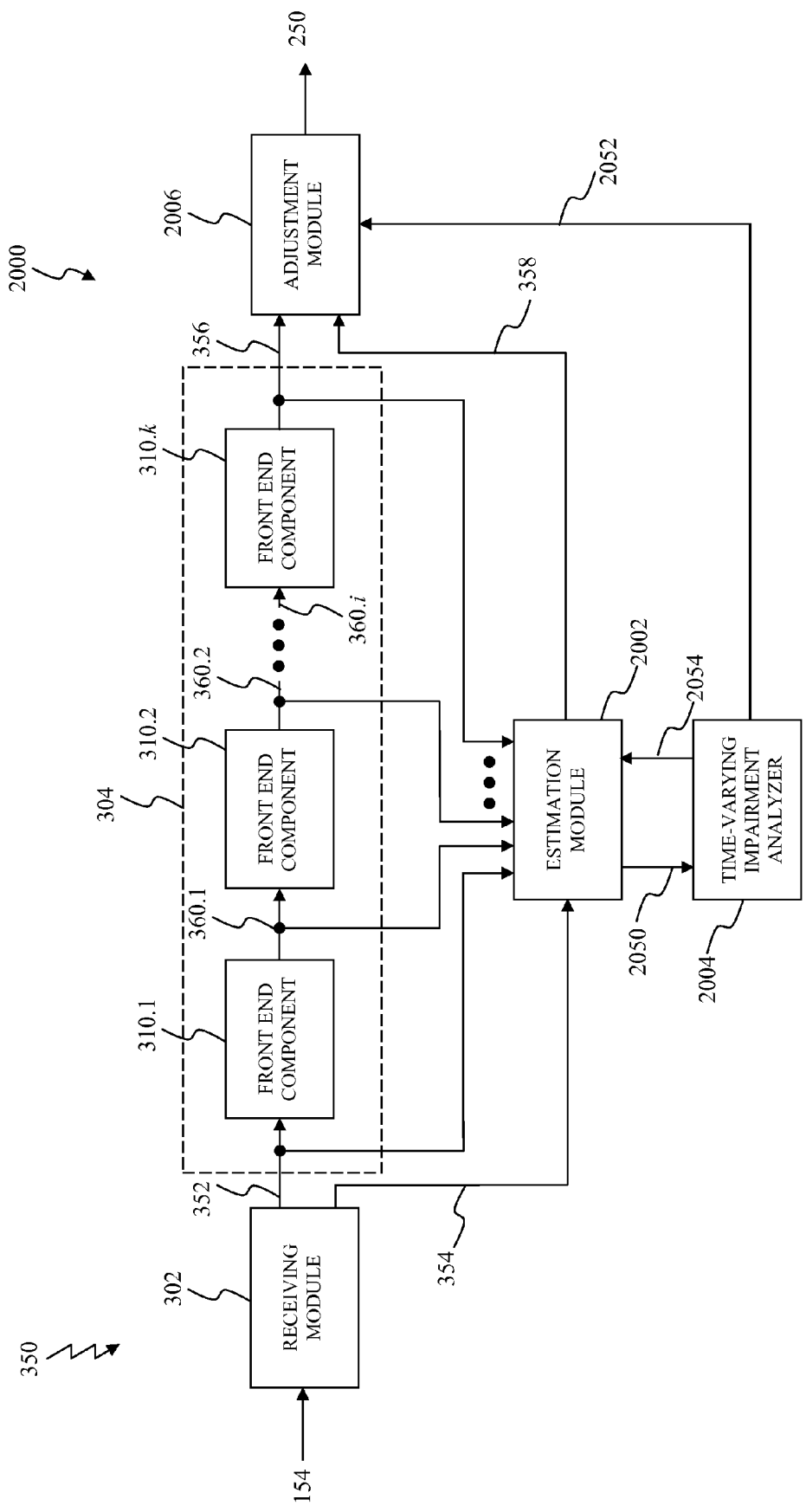
FIG. 20 illustrates a block diagram of a sixteenth front end module that may be implemented as part of the communications receiver according to an exemplary embodiment of the present invention.

Sixteenth Exemplary Embodiment of the Front End Module that May be Implemented as Part of the Communication Receiver FIG. 20 illustrates a block diagram of a sixteenth front end module that may be implemented as part of the communications receiver according to an exemplary embodiment of the present invention. The unwanted interference 350 and/or the unwanted distortion remaining within the observed sequence of data 356 may represent a time-varying interference and/or distortion. In this situation, the interference and/or distortion is not stationary, rather statistics of the interference and/or distortion vary with time. A front end module 2000 includes the receiving module 302, the front end processor 304, an estimation module 2002, a time-varying impairment analyzer, and an adjustment module 2006 to compensate for the time-varying interference and/or distortion.

The receiving module 302 observes the received communications signal 154 and the unwanted interference 350 to provide the primary received communications signal 352 and the secondary received communications signal 354.

The front end processor 304 processes the primary received communications signal 352 to provide the observed sequence of data 356.

The estimation module 2002 provides the estimate of residual noise 358 that corresponds to the unwanted interference 350 and/or the unwanted distortion remaining within the observed sequence of data 356. The estimation module 2002 may provide a second estimate of residual noise 2050 that corresponds to the unwanted interference 350 and/or the unwanted distortion remaining within the observed sequence of data 356.

The time-varying impairment analyzer 2004 analyzes the second estimate of residual noise 2050 to provide one or more sets of filter weighting coefficients 2052 for use by the adjustment module 2006. The time-varying impairment analyzer 2004 includes one or more sets of filter weighting coefficients for use by the adjustment module 2006. The time-varying impairment analyzer 2004 determines which one of the one or more sets of filter weighting coefficients corresponds to the composition of the unwanted interference 350 and/or the unwanted distortion remaining within the observed sequence of data 356. The time-varying impairment analyzer 2004 may provide a respective set of filter weighting coefficients that corresponds with the composition of the interference and/or distortion as the filter weighting coefficients 2052. The time-varying impairment analyzer 2004 may additionally train or update the respective set of filter weighting coefficients in accordance with a weight computation algorithm. The time-varying impairment analyzer 2004 may additionally receive information, for example demodulator loop lock status, total power, error power and/or decoder error statistics and metrics, from the demodulator module 204 and the decoder module 206 to detect a change in impairments and determine the relative effectiveness of one or more sets of filter weighting coefficients. The time-varying analyzer 2004 may send control signals 2054 to the estimation module 2002, such as configuring the estimation module 2002 for various possible impairment scenarios in embodiments where the estimation module 2002 is operating to estimate only a portion of all possible impairment scenarios at least some of the time. The time-varying impairment analyzer 2004 is further described in U.S. patent application Ser. No. 12/078,923, filed Apr. 8, 2008, and/or in U.S. patent application Ser. No. 12/899,997, filed Oct. 7, 2010, each of which is incorporated by reference herein in its entirety.

The adjustment module 308 substantially removes the estimate of residual noise 358 from the observed sequence of data 356 in accordance with the filter weighting coefficients 2052 to provide the digital sequence of data 250.

Figure 21:
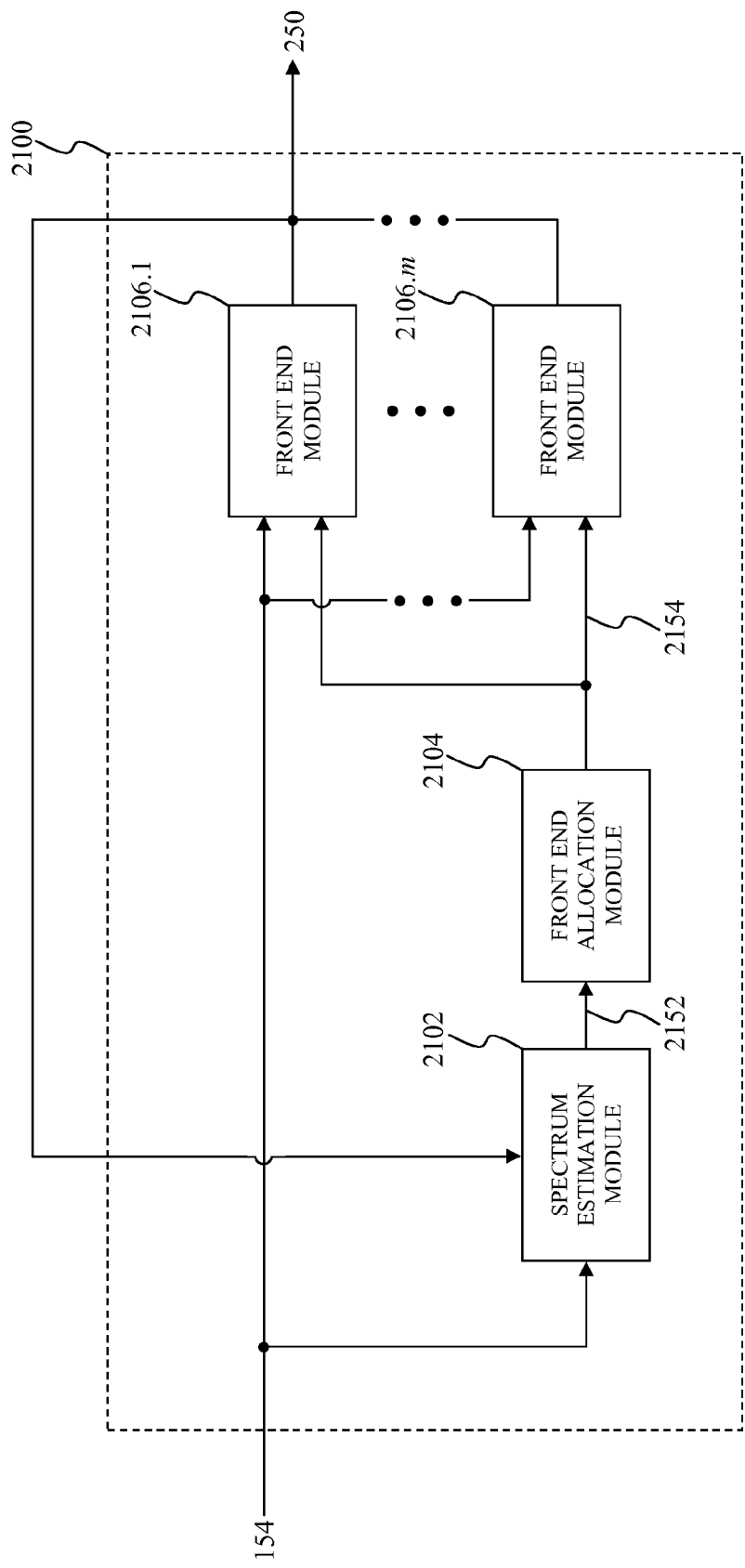
FIG. 21 illustrates a block diagram of a seventeenth front end module that may be implemented as part of the communications receiver according to an exemplary embodiment of the present invention.

Seventeenth Exemplary Embodiment of the Front End Module that May be Implemented as Part of the Communication Receiver FIG. 21 illustrates a block diagram of a seventeenth front end module that may be implemented as part of the communications receiver according to an exemplary embodiment of the present invention. A front end module 2100 compensates for multiple unwanted interferences and/or unwanted distortions. The front end module 2100 may include a spectrum estimation module 2102, a front end allocation module 2104, and front end modules 2106.1 through 2106.$m$.

The spectrum estimation module 2102 classifies the unwanted interferences imposed onto the received communications signal 154 and/or the unwanted interference and/or the unwanted distortion remaining within the digital sequence of data 250 to provide a spectrum estimate 2152. The spectrum estimation module 2102 estimates whether the unwanted interferences imposed onto the received communications signal 154 and/or the unwanted interference and/or the unwanted distortion remaining within the digital sequence of data 250 correspond to any of the unwanted interferences and/or distortions as described in FIG. 1 through FIG. 20 and/or any other unwanted interference that will be apparent to those skilled in the relevant art(s) without departing from the spirit and scope of the present invention.

The front end allocation module 2104 provides a front end module enable command signal 2154 based upon the spectrum estimate 2152. The front end allocation module 2104 determines which one or more of the front end modules 2106.1 through 2106.$m$ is optimized to substantially compensate for the unwanted interferences imposed onto the received communications signal 154 and/or the unwanted interference and/or the unwanted distortion remaining within the digital sequence of data 250. The front end allocation module 2104 provides a corresponding control signal, as the front end module enable command signal 2154, to activate one or more of the front end modules 2106.1 through 2106.$m$ that are optimized to substantially compensate for the unwanted interferences imposed onto the received communications signal 154 and/or the unwanted interference and/or the unwanted distortion remaining within the digital sequence of data 250. The front end allocation module 2104 monitors the spectrum estimate 2152 and may provide a first control signal as the front end module enable command signal 2154 to activate a first front end module from among the front end modules 2106.1 through 2106.$m$ and may provide a second control signal as the front end module enable command signal 2154 to activate a second front end module from among the front end modules 2106.1 through 2106.$m$ when the second front module is more suited to substantially compensate for the unwanted interferences imposed onto the received communications signal 154 and/or the unwanted interference and/or the unwanted distortion remaining within the digital sequence of data 250. In this situation, the second control signal may deactivate the first front end module.

The front end modules 2106.1 through 2106.$m$ compensate for the unwanted interferences imposed onto the received communications signal 154 and/or unwanted distortion introduce by the front end modules 2106.1 through 2106.$m$ to provide the digital sequence of data 250 when selected in accordance with the front end module enable command signal 2154. Each of the front end modules 2106.1 through 2106.$m$ may implemented as any of the front end modules as described in FIG. 1 through FIG. 20 and/or any other suitable front end module that will be apparent to those skilled in the relevant art(s) without departing from the spirit and scope of the present invention.

For example, the front end modules 2106.1 through 2106.$m$ may include a first front end module 2106.1 that is implemented with the adjustment module 406, the adjustment module 412, and/or the adjustment module 412 and a second adjustment module 2106.2 that is implemented with the adjustment module 418. The front end modules 2106.1 through 2106.$m$ may additionally include a third front end module 2106.3 that is substantially similar to the front end module 1500 and a fourth front end module 2106.4 that is substantially similar to the front end module 1600. The front end modules 2106.1 through 2106.$m$ may further include a fifth front end module 2106.5 that is substantially similar to the front end module 1700 and a sixth front end module 2106.6 that is substantially similar to the front end module 1800. The front end modules 2106.1 through 2106.$m$ may yet further include a seventh front end module 2106.7 that is substantially similar to the front end module 1900.

In this example, the front end allocation module 2104 may provide the enable command signal 2154 to enable the first front end module 2106.1 when the spectrum estimation module 2102 estimates the unwanted interference and/or the unwanted distortion remaining within the digital sequence of data 250 may be characterized as being much larger than other non-dominant interference and/or distortion. The front end allocation module 2104 may provide the enable command signal 2154 to enable the second front end module 2106.2 when the spectrum estimation module 2102 estimates the one of the one or more desired communications signals may dominate other desired communications signals.

Also, in this example, the front end allocation module 2104 may provide the enable command signal 2154 to enable the third front end module 2106.3 when the spectrum estimation module 2102 estimates the unwanted interferences imposed onto the received communications signal 154 and/or the unwanted interference and/or the unwanted distortion remaining within the digital sequence of data 250 may be attributable to a frequency generator. The front end allocation module 2104 may provide the enable command signal 2154 to enable the fourth front end module 2106.4 when the spectrum estimation module 2102 estimates the unwanted interferences imposed onto the received communications signal 154 and/or the unwanted interference and/or the unwanted distortion remaining within the digital sequence of data 250 may be attributable aliasing of one or more undesired communications signals onto the one or more desired communications signals.

Further, in this example, the front end allocation module 2104 may provide the enable command signal 2154 to enable the fifth front end module 2106.5 when the spectrum estimation module 2102 estimates the unwanted interferences imposed onto the received communications signal 154 and/or the unwanted interference and/or the unwanted distortion remaining within the digital sequence of data 250 may be attributable to another communications device. The front end allocation module 2104 may provide the enable command signal 2154 to enable the sixth front end module 2106.6 when the spectrum estimation module 2102 estimates the unwanted interferences imposed onto the received communications signal 154 and/or the unwanted interference and/or the unwanted distortion remaining within the digital sequence of data 250 may be attributable to flicker noise. The front end allocation module 2104 may provide the enable command signal 2154 to enable the seventh front end module 2106.7 when the spectrum estimation module 2102 estimates the unwanted interferences imposed onto the received communications signal 154 and/or the unwanted interference and/or the unwanted distortion remaining within the digital sequence of data 250 may be attributable to images of the one or more desired communications signals.

However, this example is not limiting, those skilled in the relevant art(s) will recognize that the front end modules 2106.1 through 2106.m may include more or less front end modules that are configured to compensate for other unwanted interference and/or the unwanted distortion remaining within the digital sequence of data 250 without departing from the spirit and scope of the present invention.

Figure 22:
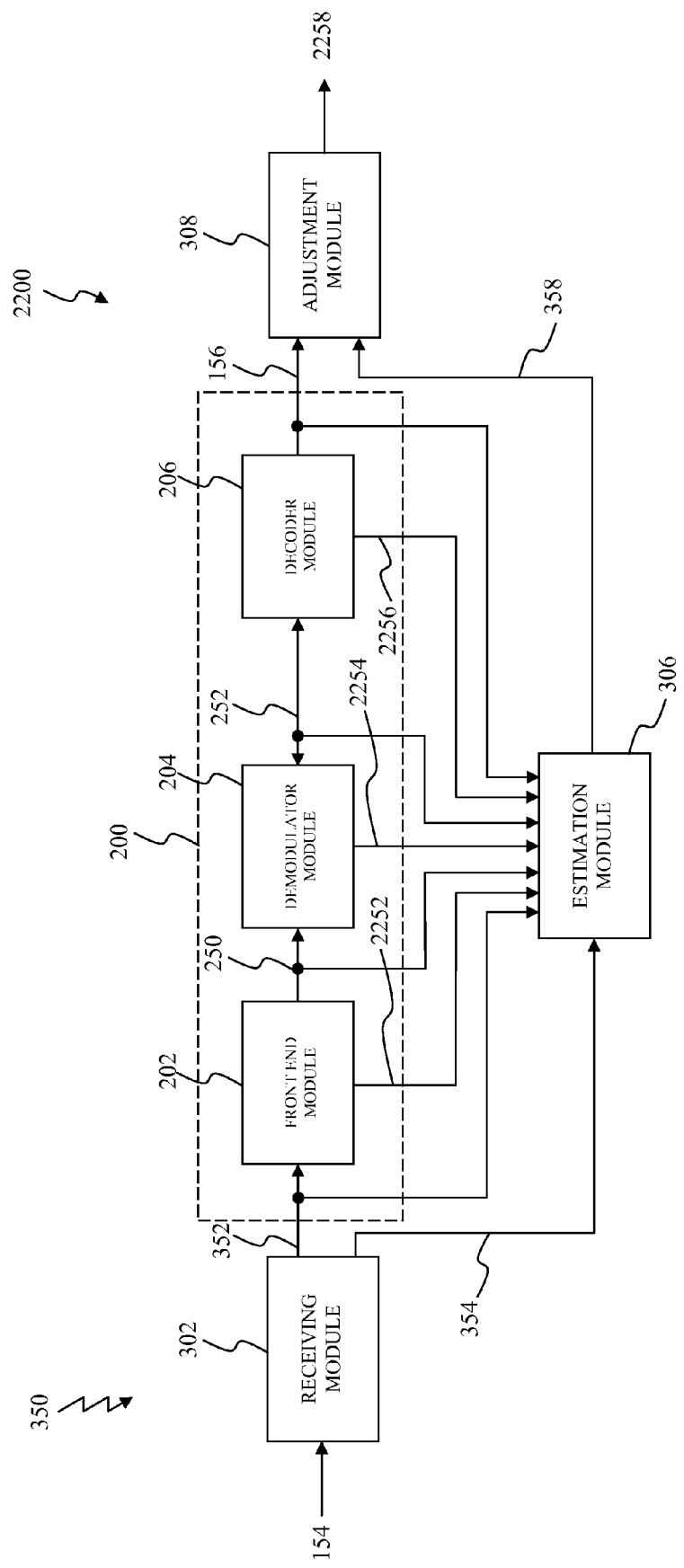
FIG. 22 illustrates a block diagram of a second communications receiver implemented as part of the communications environment according to an exemplary embodiment of the present invention.

Second Exemplary Communications Receiver that May be Implemented as Part of the Communications Environment FIG. 22 illustrates a block diagram of a second communications receiver implemented as part of the communications environment according to an exemplary embodiment of the present invention. A communications receiver 2200 includes the receiving module 302, the communications receiver 200, the estimation module 306, and the adjustment module 308 to substantially compensate for unwanted interference 350. The communications receiver 2200 may represent an exemplary embodiment of the communications receiver 106.

The receiving module 302 observes the received communications signal 154 and the unwanted interference 350 to provide the primary received communications signal 352 and the secondary received communications signal 354. In an exemplary embodiment, the receiving module 302 may observe the received communications signal 154 using one or more desired signal receiving ports to directly receive the received communications signal 154 from a communications cable. In this exemplary embodiment, another communications device that is sufficiently proximate to the communications receiver 2200, and/or physical elements of the communications channel 104, may transmit a communications signal having a power level that is much greater than a power level of the received communications signal 154. In this situation, although a communications cable is typically shielded, and trunk and line amplifiers are typically enclosed in housings providing shielding, to name just two physical elements of communications channel 104, the communications signal from this other communications device is of sufficient energy to penetrate through the shielding and/or imperfections of the communications cable and its connectors, and/or penetrate through the housings of various other physical elements of communications channel 104.

The communications receiver 200 processes the primary received communications signal 352 to provide the one or more recovered information signals 156. The communications receiver 200 includes the front end module 202 to provide the digital sequence of data 250 based upon the primary received communications signal 352, the demodulator module 204 to demodulate the digital sequence of data 250 to provide the recovered sequence of data 252, and the decoder module 206 to perform error correction decoding upon the recovered sequence of data 252 to provide the one or more recovered information signals 156. Additionally, the front end module 202, the demodulator module 204, and/or the demodulator module 204 may provide a front-end processed signal 2252, a demodulator processed signal 2254, and/or a decoder processed signal 2256, respectively. The front-end processed signal 2252, the demodulator processed signal 2254, and/or the decoder processed signal 2256 represent one or more signals within processing paths of these modules that may provided to the estimation module 306.

The estimation module 306 generates the estimate of residual noise 358 that corresponds to the unwanted interference 350 and/or the unwanted distortion remaining within the one or more recovered information signals 156. As discussed above, the estimation module 306 includes one or more replica components. In an exemplary embodiment, the one or more replica components include the front end module 202, the demodulator module 204, and the decoder module 206.

The estimation module 306 processes one or more of the one or more recovered information signals 156, the digital sequence of data 250, the recovered sequence of data 252, the primary received communications signal 352, the secondary received communications signal 354, the front-end processed signal 2252, the demodulator processed signal 2254, and/or the decoder processed signal 2256 to provide the estimate of residual noise 358.

The adjustment module 308 substantially removes the estimate of residual noise 358 from the one or more recovered information signals 156 to provide one or more recovered information signals 2258.

Figure 23:
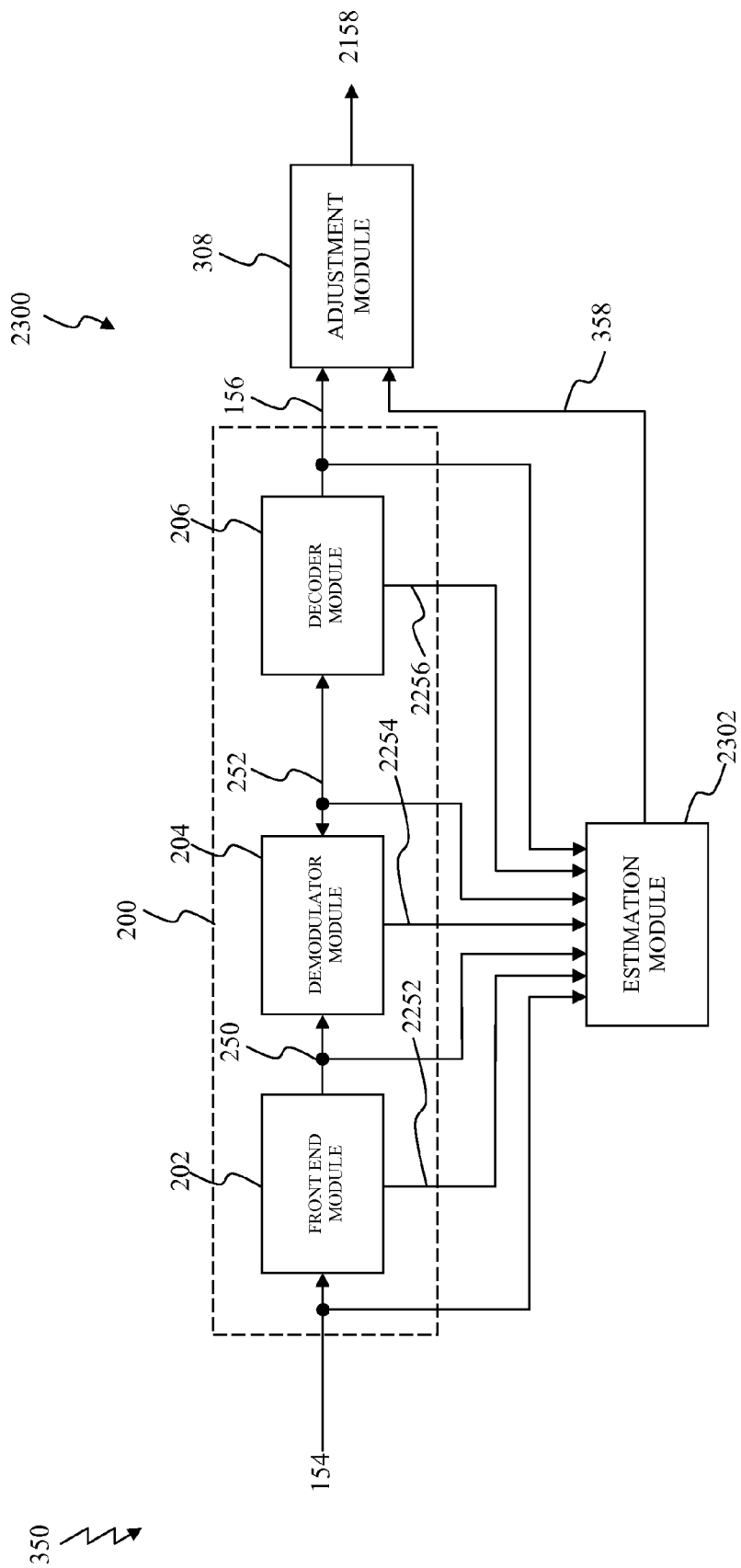
FIG. 23 illustrates a block diagram of a third communications receiver implemented as part of the communications environment according to an exemplary embodiment of the present invention.

Third Exemplary Communications Receiver that May be Implemented as Part of the Communications Environment FIG. 23 illustrates a block diagram of a third communications receiver implemented as part of the communications environment according to an exemplary embodiment of the present invention. A communications receiver 2300 estimates the unwanted interference 350 based upon one or more signals within the signal processing path of the communications receiver 200. The communications receiver 2300 includes the communications receiver 200, the adjustment module 308, and an estimation module 2302. The communications receiver 2300 may represent an exemplary embodiment of the communications receiver 106.

The communications receiver 200 processes the primary received communications signal 352 to provide the one or more recovered information signals 156. The communications receiver 200 includes the front end module 202 to provide the digital sequence of data 250 based upon the received communications signal 154, the demodulator module 204 to demodulate the digital sequence of data 250 to provide the recovered sequence of data 252, and the decoder module 206 to perform error correction decoding upon the recovered sequence of data 252 to provide the one or more recovered information signals 156. Additionally, the front end module 202, the demodulator module 204, and/or the demodulator module 204 may provide the front-end processed signal 2252, the demodulator processed signal 2254, and/or the decoder processed signal 2256, respectively.

The estimation module 2302 generates the estimate of residual noise 358 that corresponds to the unwanted interference 350 and/or the unwanted distortion remaining within the one or more recovered information signals 156. Specifically, the estimation module 1104 processes one or more of the one or more recovered information signals 156, the digital sequence of data 250, the recovered sequence of data 252, the front-end processed signal 2252, the demodulator processed signal 2254, and/or the decoder processed signal 2256 to provide the estimate of residual noise 358.

The adjustment module 308 substantially removes the estimate of residual noise 358 from the observed sequence of data 356 to provide the digital sequence of data 250.

CONCLUSION

It is to be appreciated that the Detailed Description section, and not the Abstract section, is intended to be used to interpret the claims. The Abstract section may set forth one or more, but not all exemplary embodiments, of the present invention, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A front end module for cancelling distortion introduced onto a signal processing path of a communications receiver, comprising:
a front end processor, including the signal processing path, configured to process a received communications signal to provide an observed sequence of data, the front end processor including an amplifier module configured to amplify the received communications signal to generate an amplified communications signal and configured to introduce the distortion onto the signal processing path, wherein the observed sequence of data is provided based on the amplified communications signal;
an estimation module configured to estimate the distortion within the observed sequence of data to provide an estimate of residual noise;
an adaptive filter module configured to adjust a phase and an amplitude of the estimate of residual noise to substantially align the estimate of residual noise with the distortion within the observed sequence of data to provide a replica of residual noise; and
a combination module configured to combine the replica of residual noise and the observed sequence of data to substantially remove the replica of residual noise from the observed sequence of data to provide a digital sequence of data.

2. The front end module of claim 1, wherein the front end processor comprises:
one or more front end components configured and arranged to form the signal processing path for processing the received communications signal.

3. The front end module of claim 2, wherein the one or more front end components comprise one or more of:
a mixer module;
an analog to digital converter; or
a channelizer module.

4. The front end module of claim 1, wherein the estimation module comprises:
one or more replica components configured and arranged to form a second signal processing path, the one or more replica components comprising one or more of:
a mixer module;
an analog to digital converter;
a channelizer module; or
a non-linearity module.

5. The front end module of claim 1, wherein the front end processor further comprises:
an analog to digital converter configured to convert the amplified communications signal from an analog representation to a digital representation to provide the observed sequence of data.

6. The front end module of claim 1, wherein the front end processor further comprises:
a mixer module configured to frequency translate the amplified communications signal to provide a translated communications signal; and
an analog to digital converter configured to convert the translated communications signal from an analog representation to a digital representation to provide the observed sequence of data.

7. The front end module of claim 1, wherein the estimation module comprises:
a second signal processing path, the second signal processing path being configured and arranged to be substantially similar to the signal processing path.

8. A front end module for cancelling distortion introduced onto a first signal processing path of a communications receiver, comprising:
a front end processor configured to process a received communications signal to provide an observed sequence of data, the front end processor including an amplifier module configured to amplify the received communications signal to generate an amplified communications signal, and configured to introduce the distortion onto the first signal processing path, wherein the observed sequence of data is provided based on the amplified communications signal;
an estimation module configured to estimate the distortion within the observed sequence of data to provide an estimate of residual noise, the estimation module including one or more replica components configured and arranged to form a second signal processing path, the second signal processing path being configured and arranged to be substantially similar to the first signal processing path; and
an adjustment module configured to substantially remove the estimate of residual noise from the observed sequence of data to provide a digital sequence of data.

9. The front end module of claim 8, wherein the adjustment module is further configured to substantially align the estimate of residual noise with the distortion within the observed sequence of data to provide a replica of residual noise and to substantially remove the replica of residual noise from the observed sequence of data to provide the digital sequence of data.

10. The front end module of claim 8, wherein the one or more front end components comprise one or more of:
a mixer module;
an analog to digital converter; or
a channelizer module.

11. The front end module of claim 8, wherein the one or more replica components comprise one or more of:
a mixer module;
an analog to digital converter;
a channelizer module; or
a non-linearity module.

12. A method for cancelling distortion introduced onto a signal processing path of a communications receiver, comprising:
processing, by a communications receiver, a received communications signal to provide an observed sequence of data, wherein the processing includes amplifying, by an amplifier module, the received communications signal to generate an amplified communications signal, that introduces the distortion onto the signal processing path, and wherein the observed sequence of data is provided based on the amplified communications signal;

estimating, by the communications receiver, the distortion within the observed sequence of data to provide an estimate of residual noise;

adjusting, by the communications receiver, a phase and an amplitude of the estimate of residual noise to substantially align the estimate of residual noise with the distortion within the observed sequence of data to provide a replica of residual noise; and removing, by the communications receiver, the replica of residual noise from the observed sequence of data to provide a digital sequence of data.

13. The method of claim 12, wherein the processing comprises:

processing, by one or more front end components configured and arranged to form the signal processing path, the received communications signal to provide the observed sequence of data.

14. The method of claim 13, wherein the one or more front end components comprise one or more of:

a mixer module;

an analog to digital converter; or channelizer module.

15. The method of claim 13, wherein the estimating comprises:

estimating, by one or more replica components configured and arranged to form a second signal processing path, the distortion within the observed sequence of data to provide the estimate of residual noise, the second signal processing path being configured and arranged to be substantially similar to the signal processing path.

16. The method of claim 15, wherein the one or more replica components comprise one or more of:

a mixer module;

an analog to digital converter;

a channelizer module; or a non-linearity module.

17. The method of claim 12, wherein the processing further comprises:

converting, by the communications receiver, the amplified communications signal from an analog representation to a digital representation to provide the observed sequence of data.

18. The method of claim 12, wherein the processing further comprises:

frequency translating, by the communications receiver, the amplified communications signal to provide a translated communications signal; and converting, by the communications receiver, the translated communications signal from an analog representation to a digital representation to provide the observed sequence of data.

* * * * *

UNITED STATES PATENT AND TRADEMARK OFFICE
CERTIFICATE OF CORRECTION

| | | |
|---|---|---|
| PATENT NO. | : 8,718,589 B2 | Page 1 of 1 |
| APPLICATION NO. | : 13/174471 | |
| DATED | : May 6, 2014 | |
| INVENTOR(S) | : Gomez et al. | |

It is certified that error appears in the above-identified patent and that said Letters Patent is hereby corrected as shown below:

In the Claims

Column 43, line 28, claim 14, please insert --a-- before --channelizer--.

Signed and Sealed this
Eighth Day of July, 2014

Michelle K. Lee
*Deputy Director of the United States Patent and Trademark Office*